Dec. 2, 1952    H. E. CARNAGUA    2,619,848
TRANSMISSION AND CONTROL MECHANISM THEREFOR
Filed May 10, 1943    20 Sheets-Sheet 1

Inventor:
Harold E. Carnagua
By Edward C. Fitzbaugh
Atty.

Dec. 2, 1952     H. E. CARNAGUA     2,619,848
TRANSMISSION AND CONTROL MECHANISM THEREFOR

Filed May 10, 1943     20 Sheets-Sheet 3

Inventor:
Harold E. Carnagua
By: Edward C. Fitzbaugh
Atty

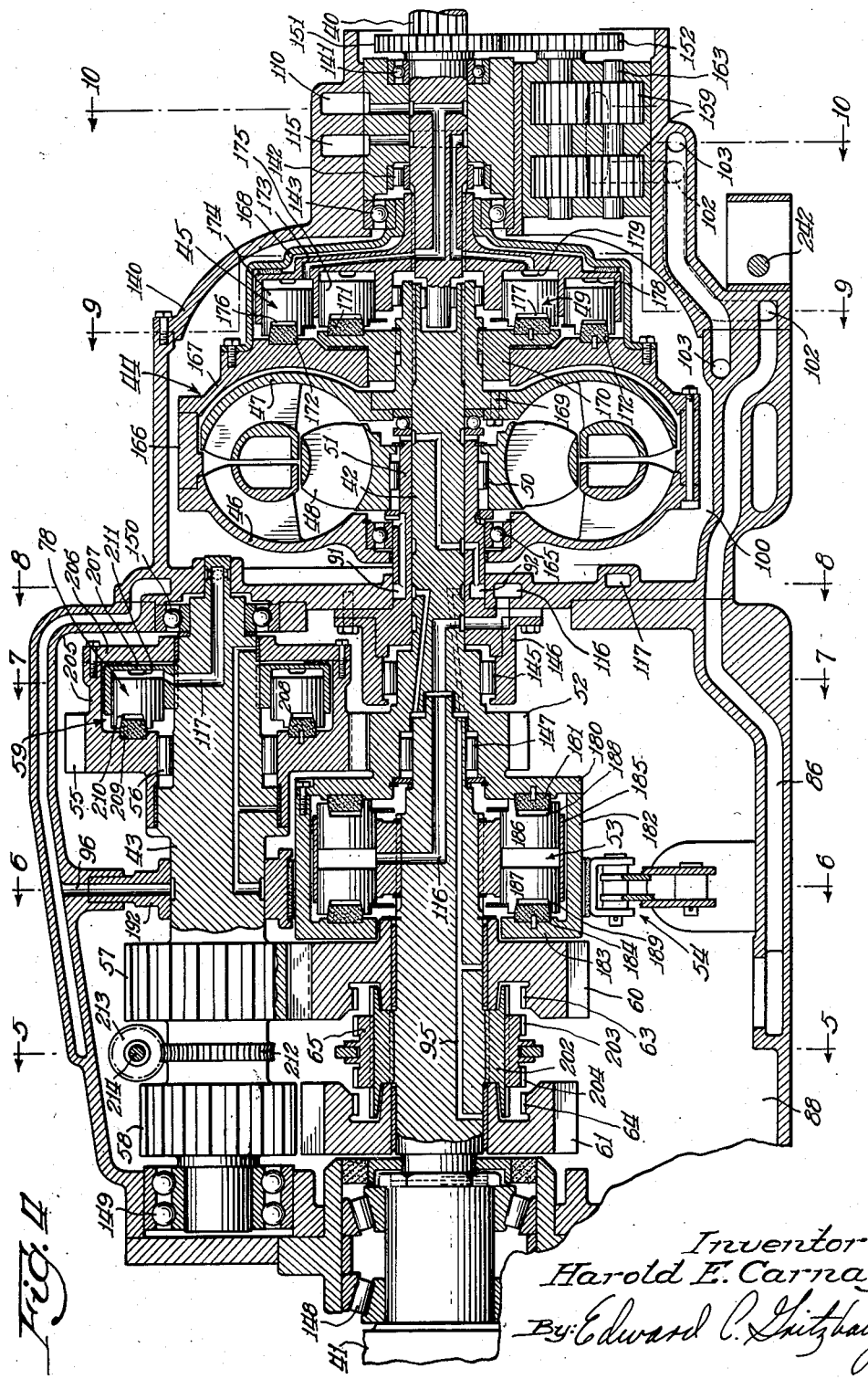

Dec. 2, 1952  H. E. CARNAGUA  2,619,848
TRANSMISSION AND CONTROL MECHANISM THEREFOR
Filed May 10, 1943  20 Sheets-Sheet 5
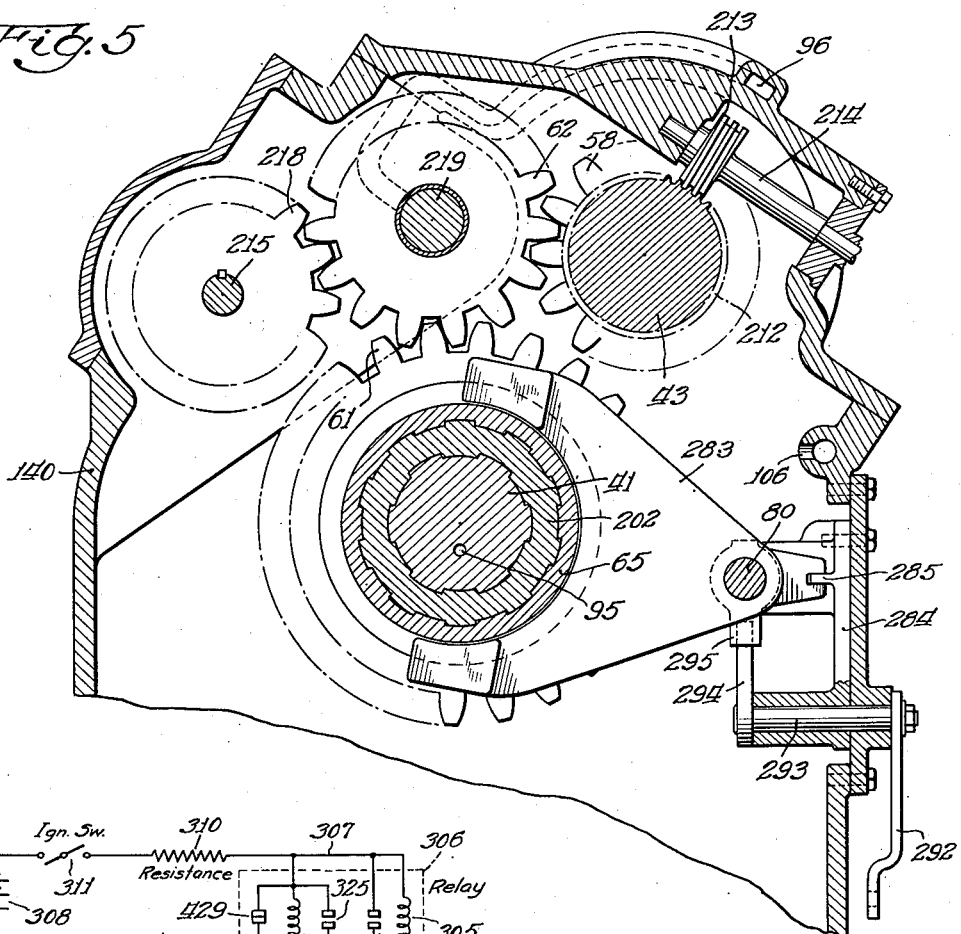
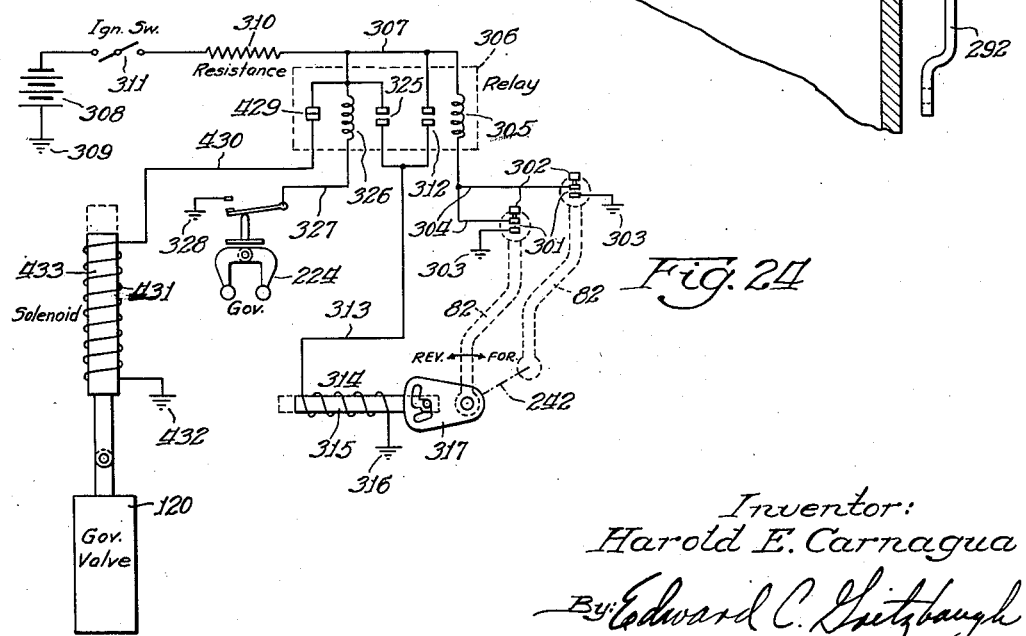
Inventor:
Harold E. Carnagua
By: Edward C. Gritzbaugh
Atty

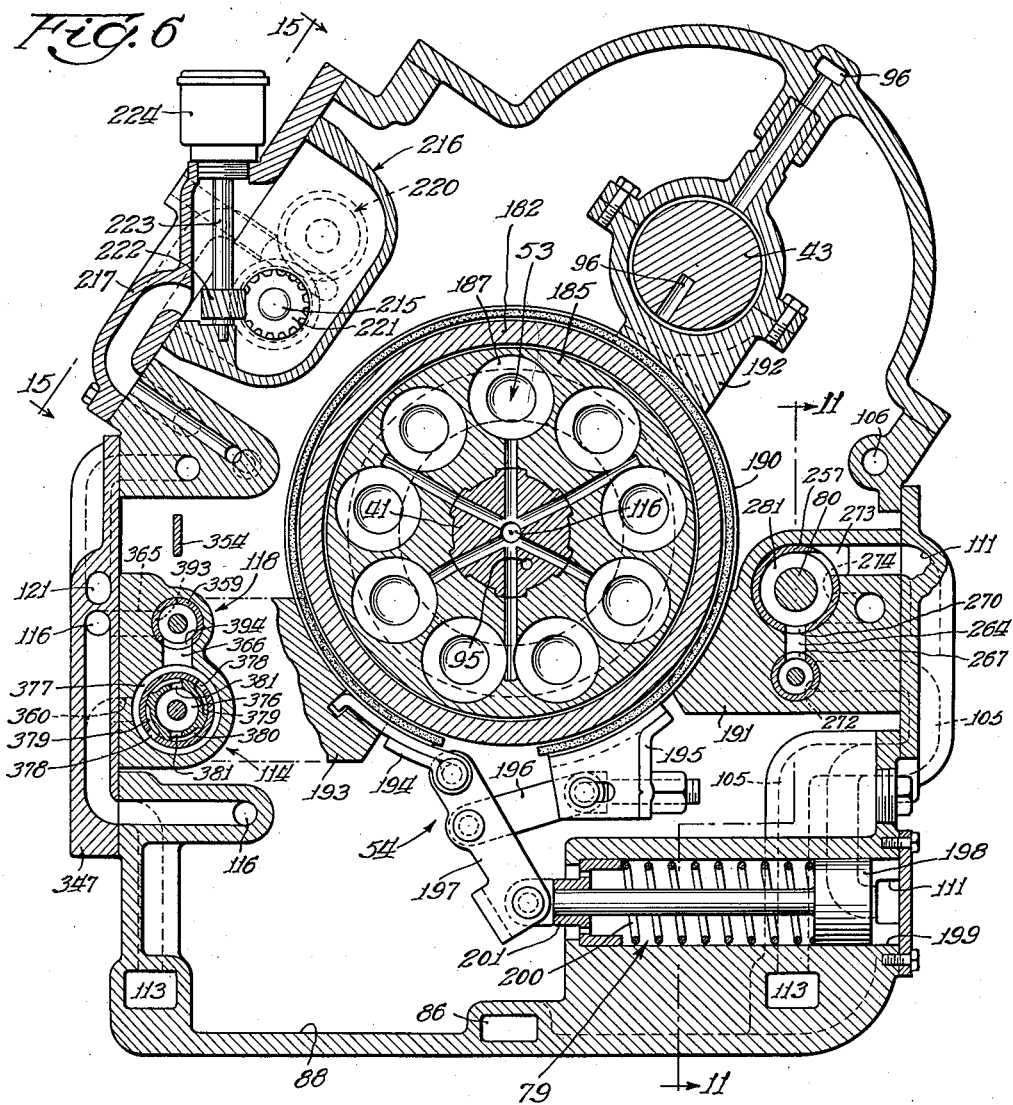

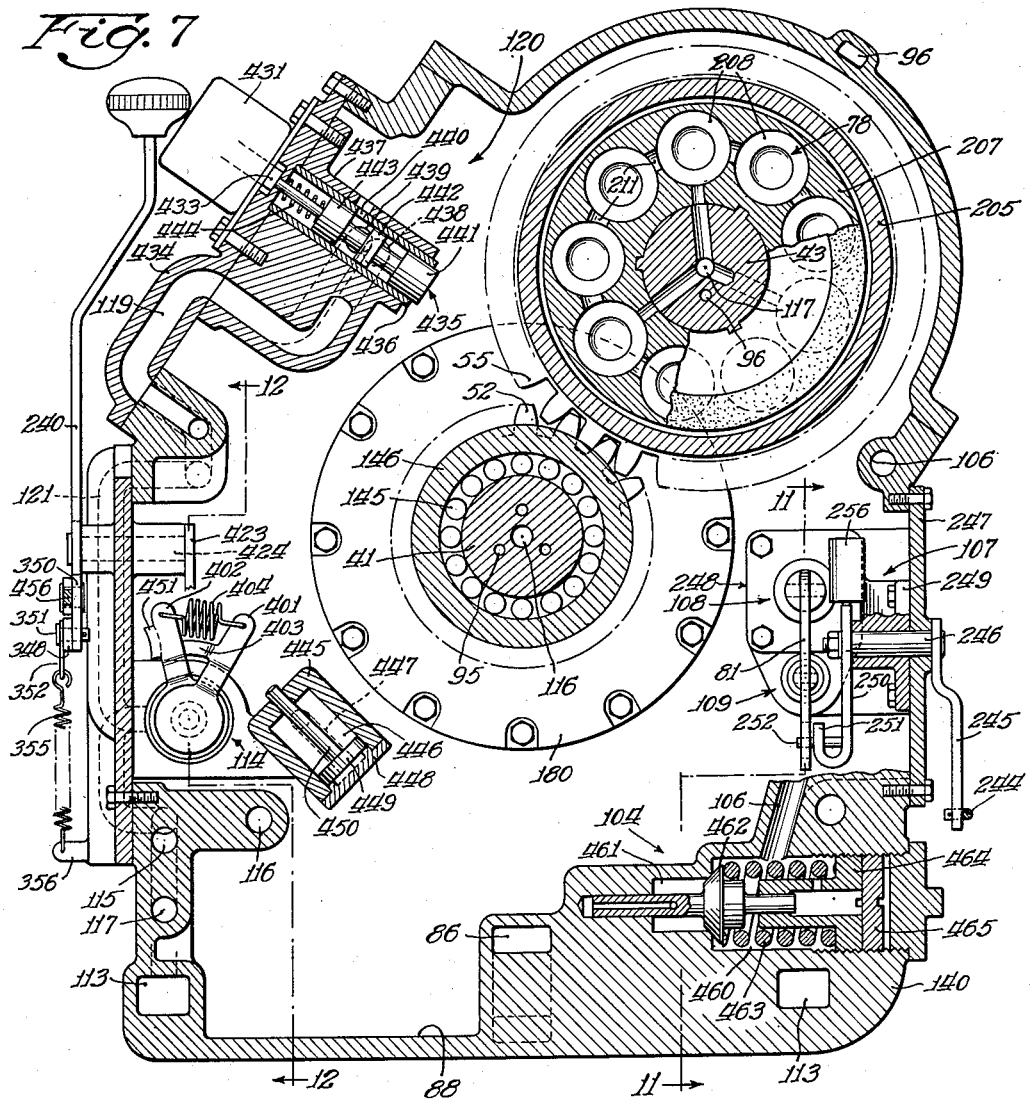

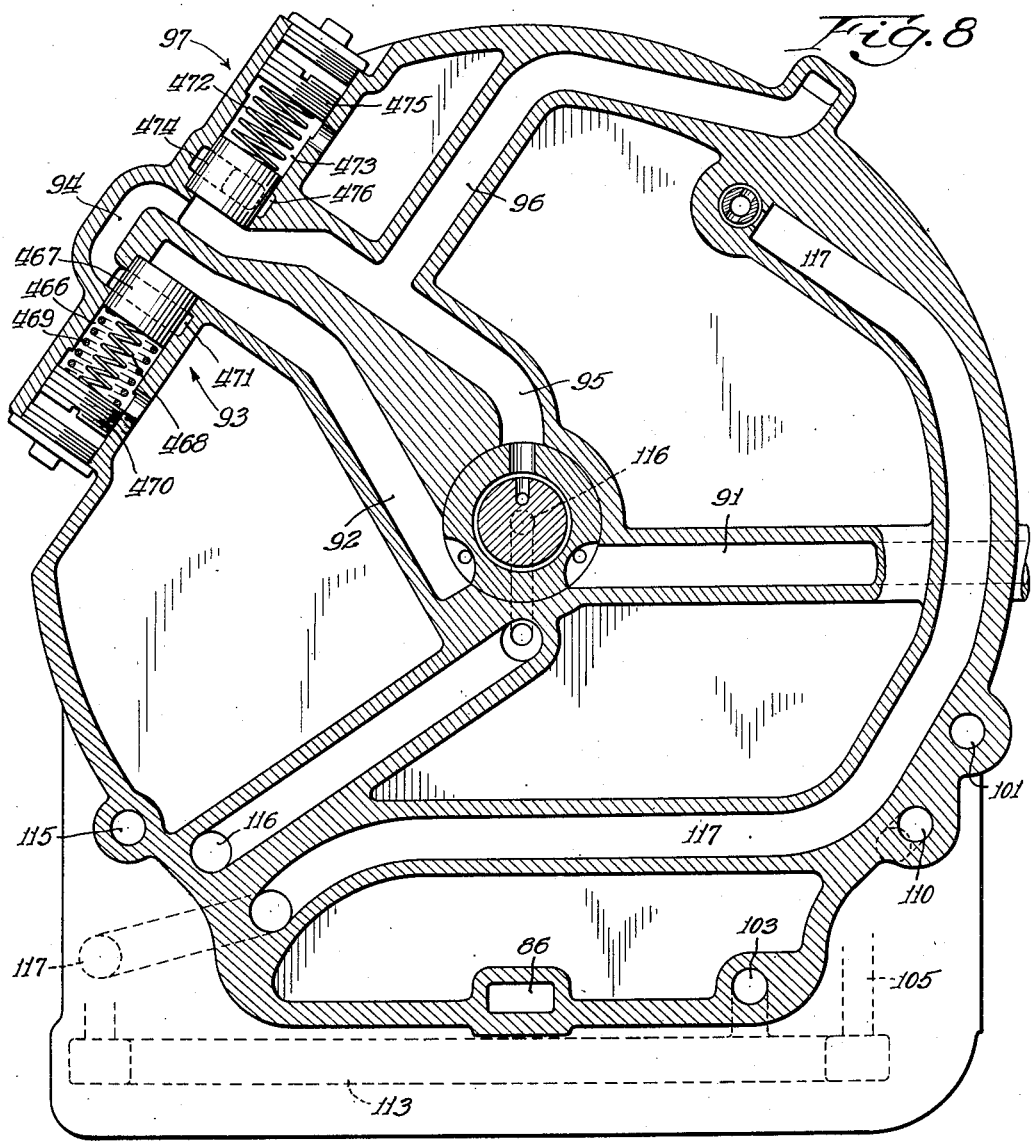

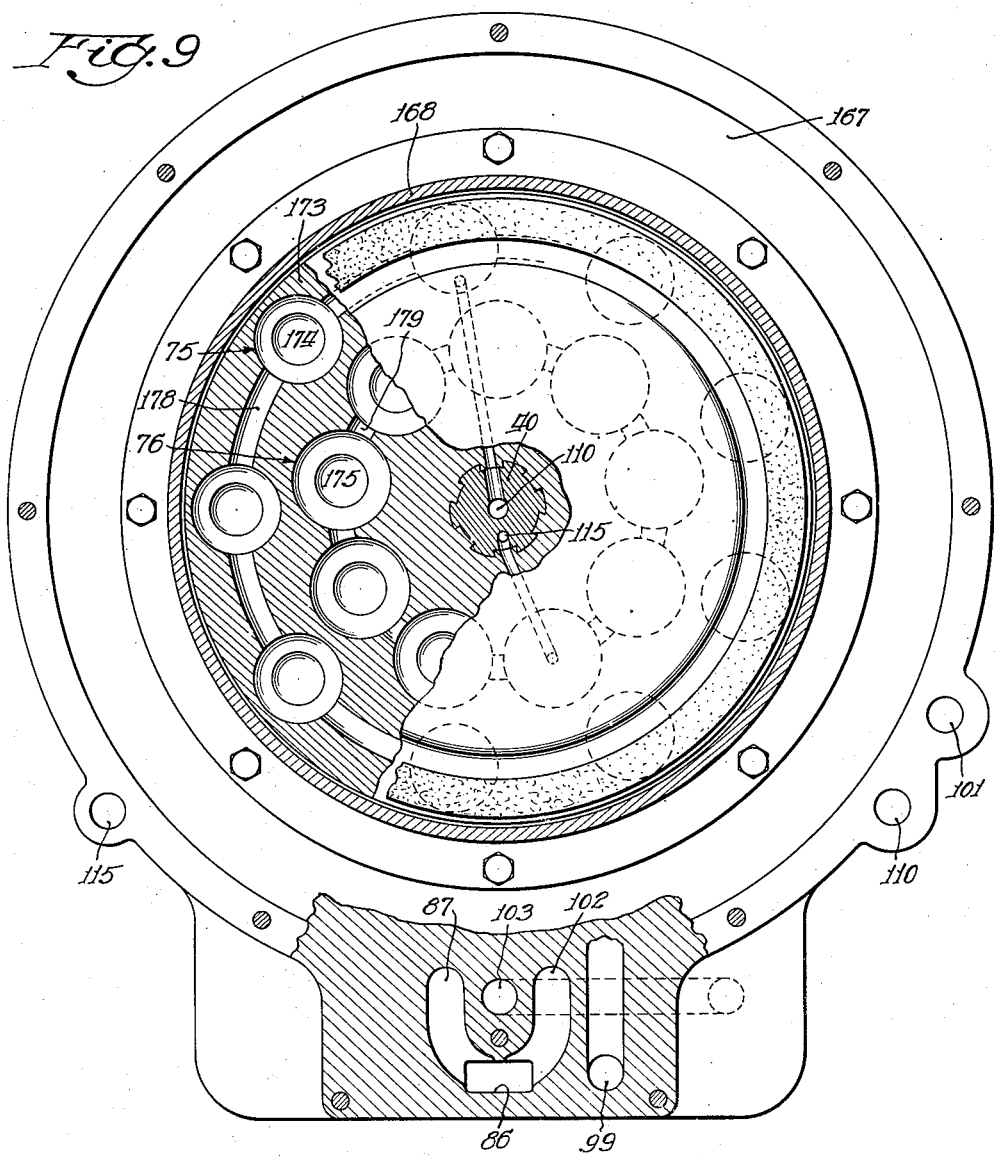

Fig. 10

Dec. 2, 1952  H. E. CARNAGUA  2,619,848
TRANSMISSION AND CONTROL MECHANISM THEREFOR
Filed May 10, 1943  20 Sheets-Sheet 12

Inventor:
Harold E. Carnagua
By: Edward C. Gritzbaugh
Atty

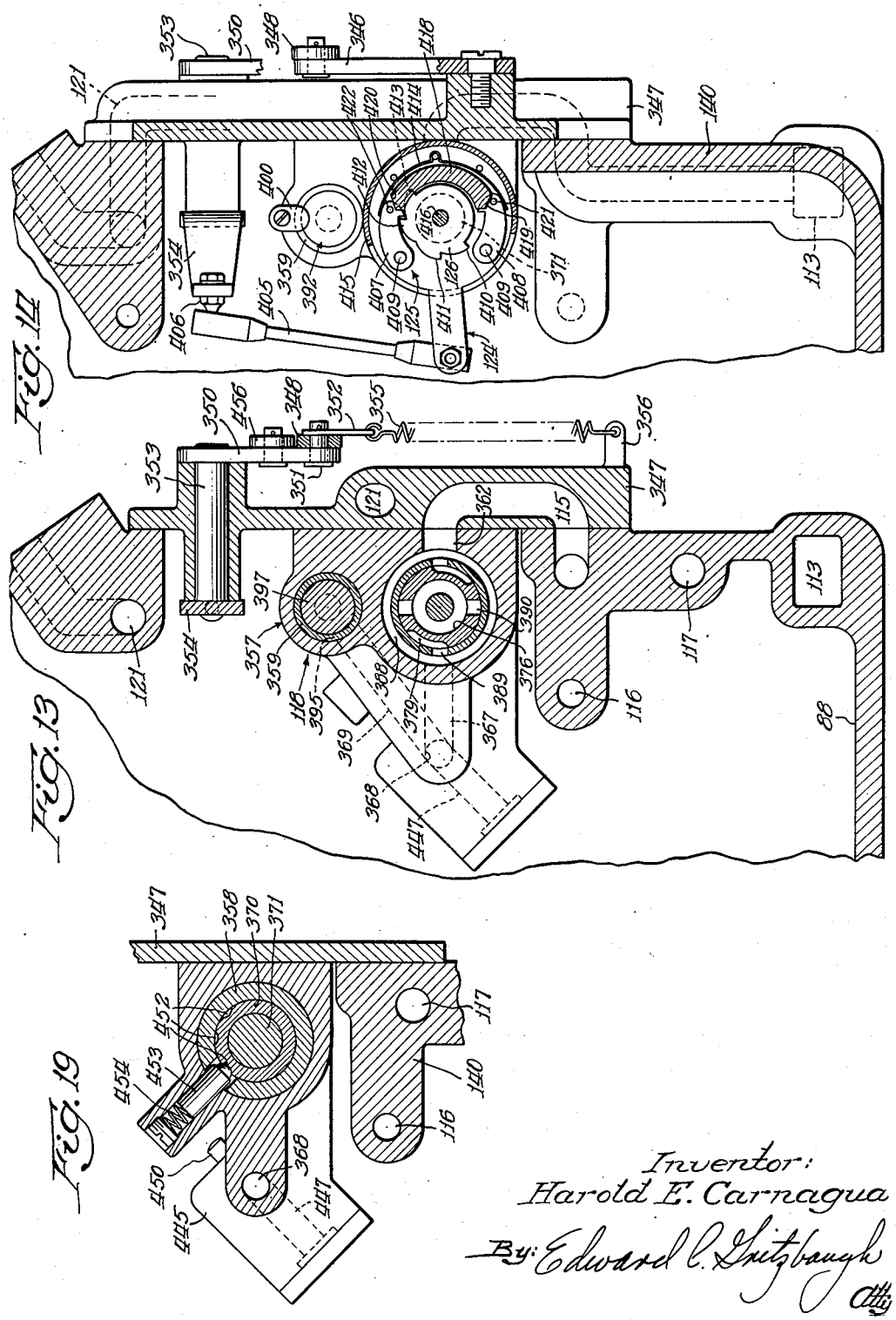

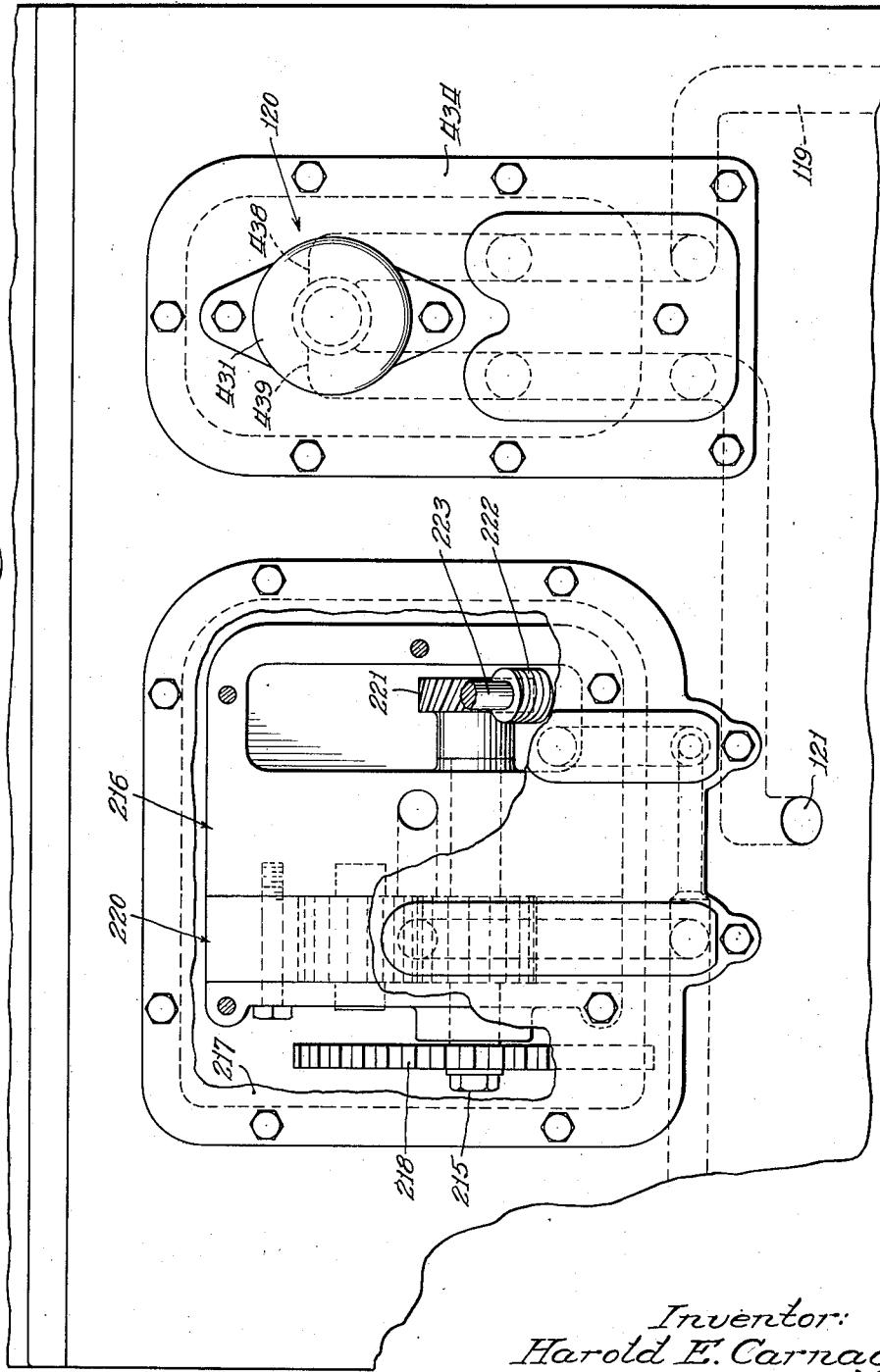

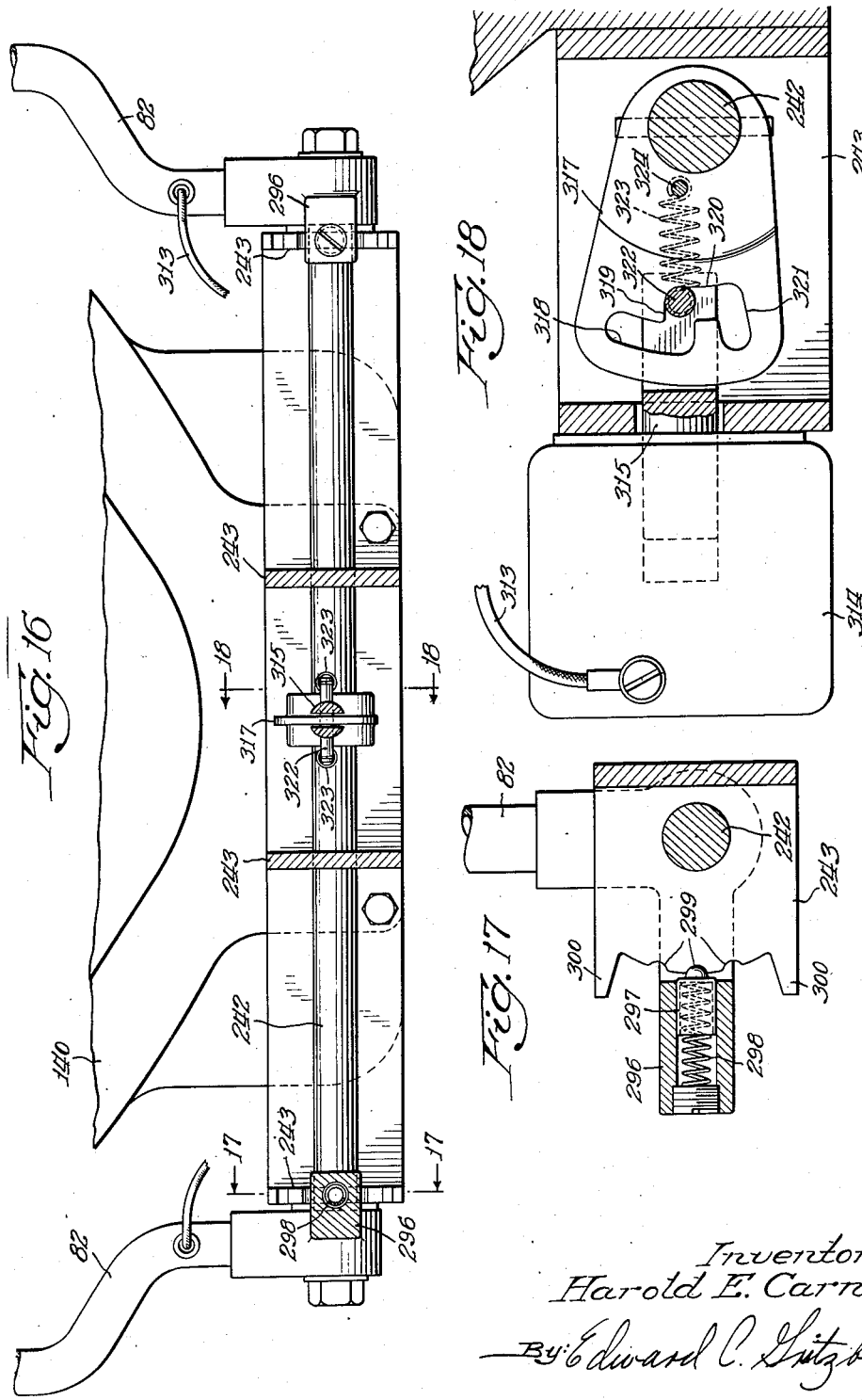

Dec. 2, 1952 H. E. CARNAGUA 2,619,848
TRANSMISSION AND CONTROL MECHANISM THEREFOR
Filed May 10, 1943 20 Sheets-Sheet 16
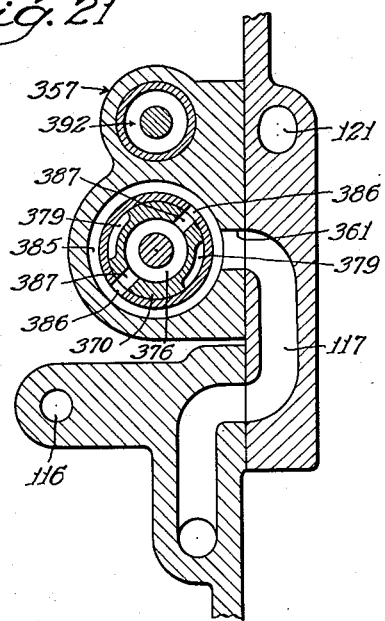
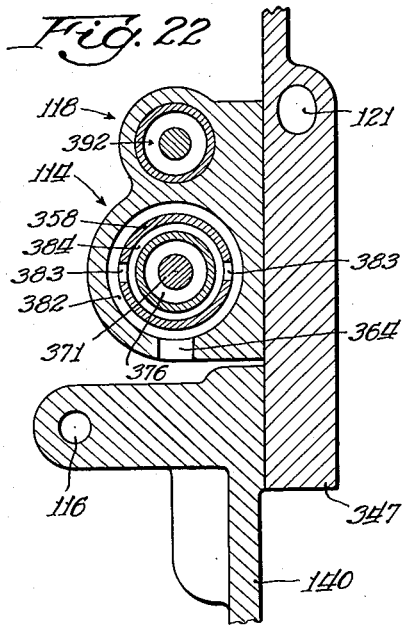
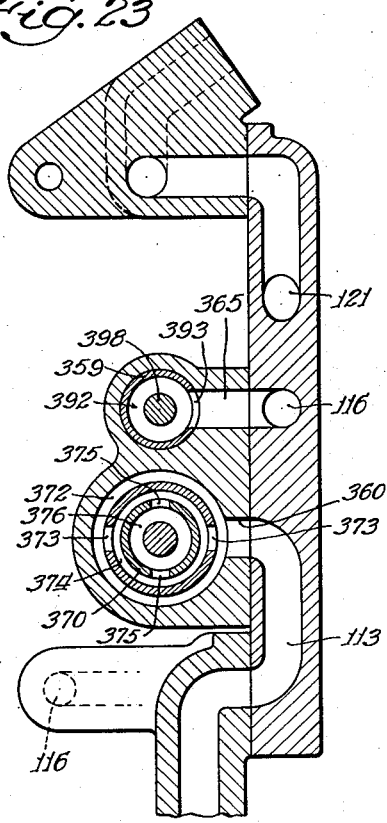
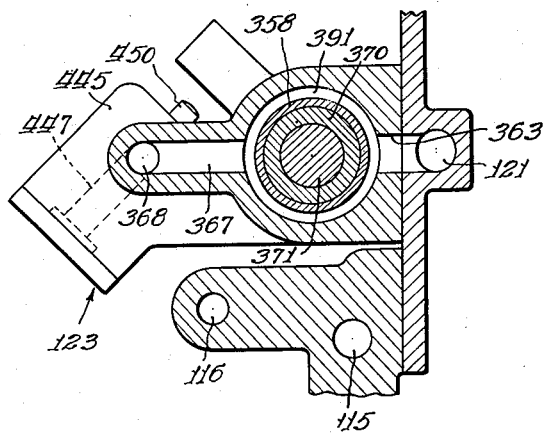
Inventor:
Harold E. Carnagua
By: Edward C. Gritzbaugh
Atty.

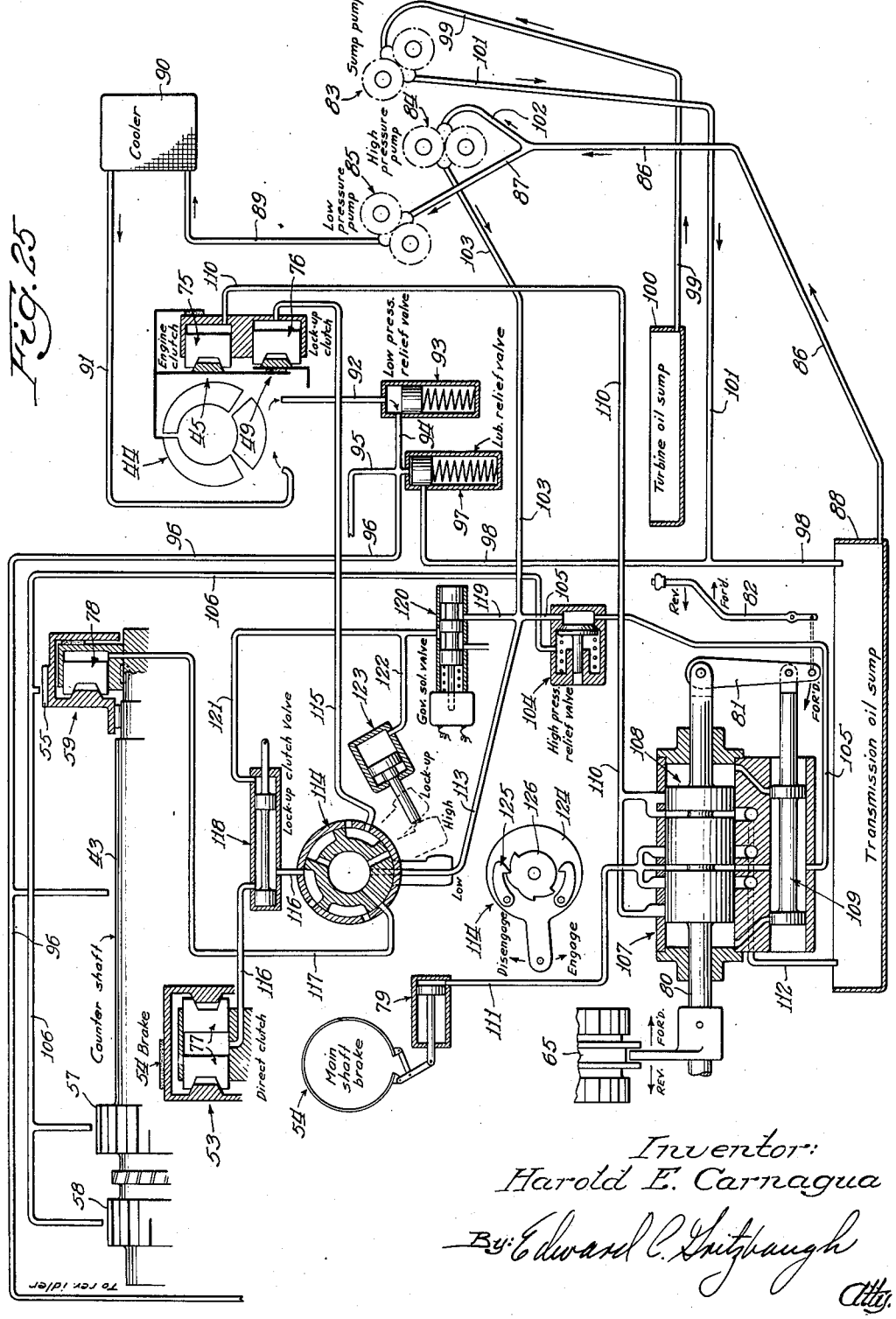

Dec. 2, 1952  H. E. CARNAGUA  2,619,848
TRANSMISSION AND CONTROL MECHANISM THEREFOR
Filed May 10, 1943  20 Sheets-Sheet 18
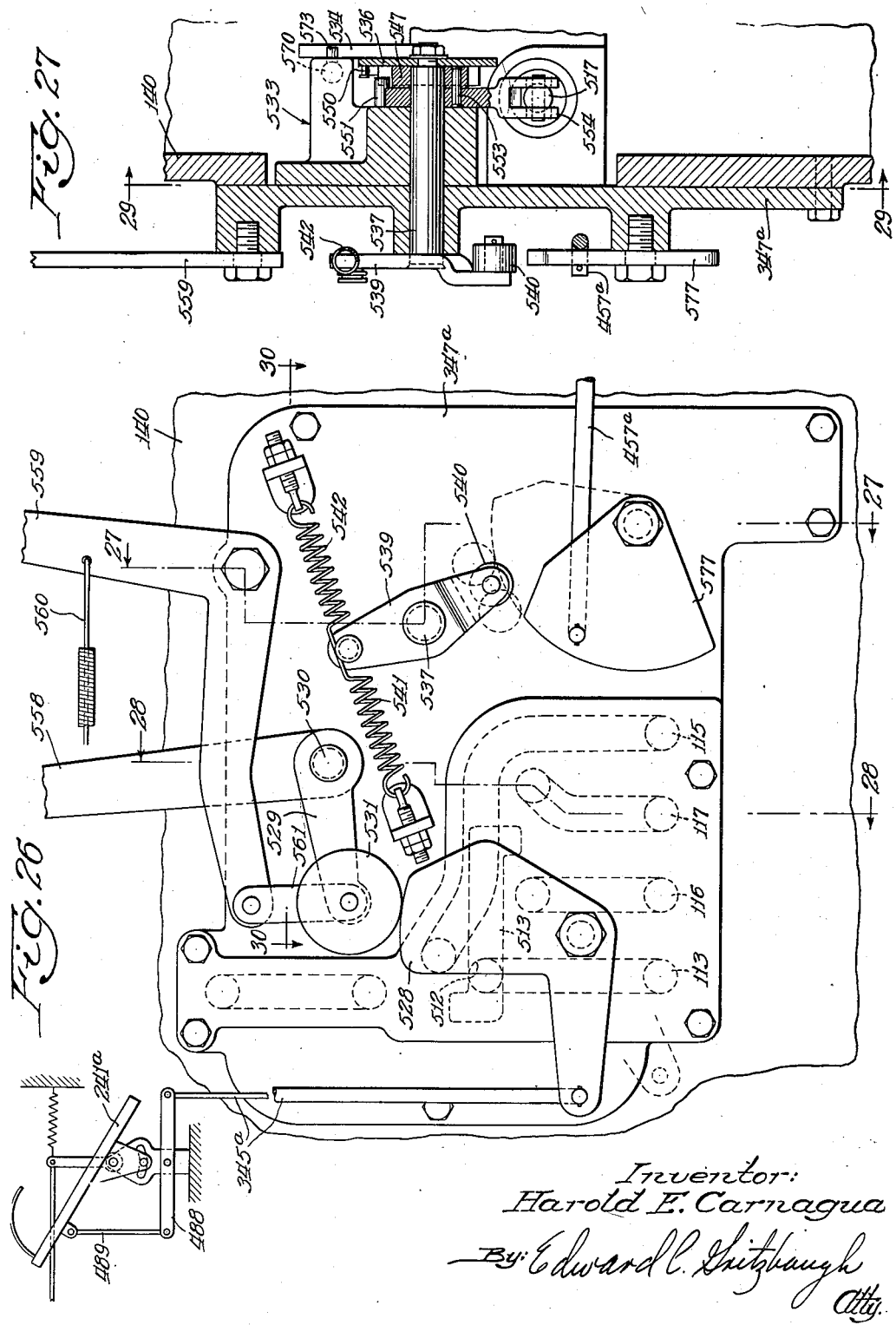
Inventor:
Harold E. Carnagua
By: Edward C. Gritzbaugh
Atty.

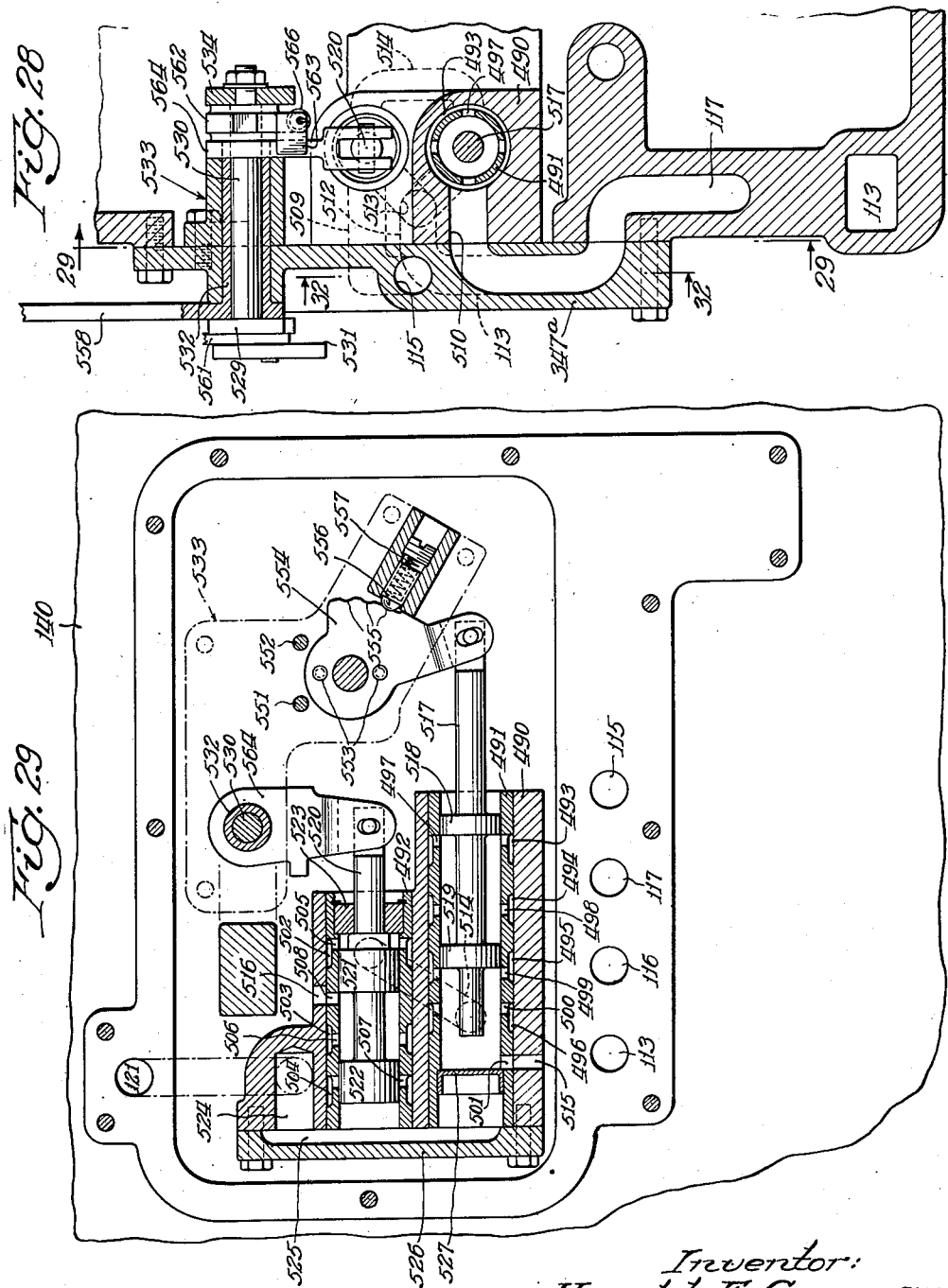

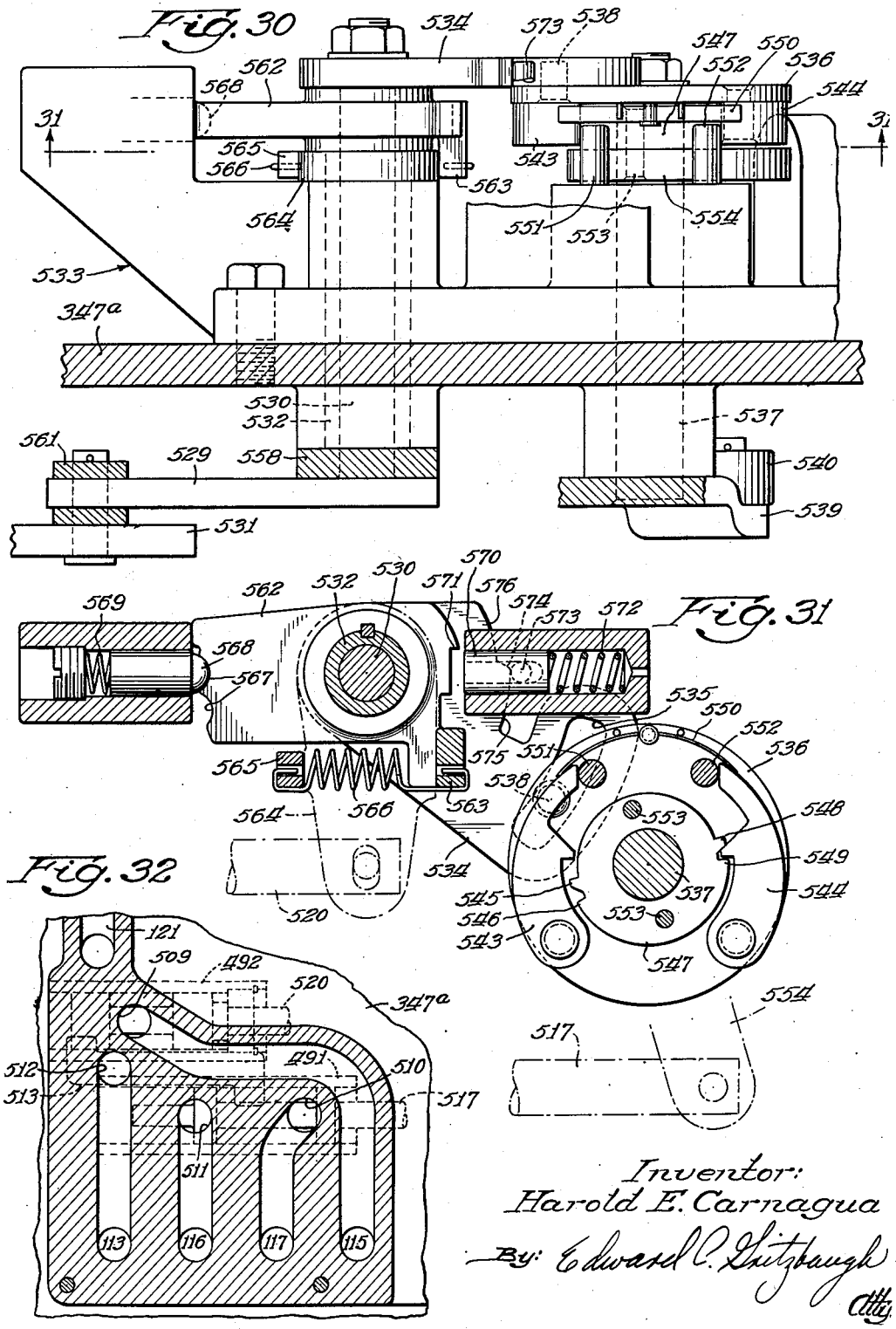

Patented Dec. 2, 1952

2,619,848

UNITED STATES PATENT OFFICE 2,619,848

TRANSMISSION AND CONTROL MECHANISM THEREFOR

Harold E. Carnagua, Muncie, Ind., assignor to Borg-Warner Corporation, Chicago, Ill., a corporation of Illinois Application May 10, 1943, Serial No. 486,293

47 Claims. (Cl. 74—645)

My invention relates to transmissions and control mechanism therefor, and more particularly my invention relates to such transmission mechanism which is particularly suitable for heavy vehicles such as military tanks, tractors, rail cars and trucks.

It is an object of my invention to provide an improved transmission which is suitable for heavy vehicles and which provides a plurality of speed ratios for driving a vehicle in the forward direction and at least one speed ratio for driving the vehicle in the reverse direction. It is also an object of my invention to provide such a transmission which is of compact construction.

It is another object of my invention to provide an improved transmission for heavy vehicles comprising a hydrodynamic power transmitting device by means of which a vehicle may be started gradually from rest and also comprising power-operated clutches which are capable of transmitting power of large magnitudes but are nevertheless easily controlled and by means of which the speed ratio between the shafts of the transmission may be increased.

More particularly it is an object of my invention to provide an improved transmission comprising a hydrodynamic power transmitting device driven by the input shaft of the transmission, a gear train for connecting the driven element of the hydrodynamic device and the output shaft of the transmission, a clutch for connecting directly the driven element of the hydrodynamic device and the output shaft and a clutch for locking up the driving and driven elements of the hydrodynamic device. It is contemplated that the driving element of the hydrodynamic device and the input shaft of the transmission may be connected by a clutch and that the gear train may be completed by means of a positive type clutch.

It is an object to provide in a transmission of this type a compact arrangement of the clutches for locking up the hydrodynamic device and for connecting the hydrodynamic device and the input shaft, such clutches, however, being such as to be capable of transmitting power of large magnitudes, in order that the transmission may be suitable for heavy vehicles. It is contemplated that both of the clutches shall preferably comprise annular fluid pressure operated piston means and that the piston means for the clutches shall be concentrically disposed with respect to each other.

The gear train in the transmission preferably is of the countershaft type comprising a pair of spaced gears on a countershaft each of which is in mesh with a gear coaxially disposed with respect to the input and output shafts, and it is an object of my invention to provide a clutch for connecting directly the driven element of the hydrodynamic device and the output shaft which is of such a type and is so positioned as to be compactly arranged with respect to the two sets of meshed gears in the gear train. To this end it is an object to provide such a clutch between the two sets of meshed gears, and the clutch preferably comprises a pair of annular fluid pressure operated piston means which act in opposite directions to engage the clutch.

It is another object of my invention to provide a brake for the driven element of the hydrodynamic coupling device for restraining rotation of that element in order to facilitate engagement of the positive clutch for completing the gear train, and it is an object of my invention to so arrange the brake with respect to the clutch for connecting directly the coupling device and the output shaft that the construction is quite compact. To this end it is an object to construct the clutch to comprise a drum rotatable with the driven element of the hydrodynamic device and to arrange the brake to act on the drum.

It is a further object of my invention to provide free-wheeling mechanism in the gear train whereby the clutch for connecting directly the driven element of the hydrodynamic device and the output shaft may be engaged without injury to the transmission, and it is another object to provide a clutch for locking up the freewheeling mechanism whereby the output shaft may be driven with a positive drive through the gear train. It is contemplated that the clutch for locking up the freewheeling mechanism shall preferably comprise annular fluid pressure operated piston means arranged coaxially with respect to the countershaft.

It is another object of my invention to provide improved control mechanism suitable for use with a transmission of this type, and more particularly it is an object of my invention to provide such control mechanism which is actuated by the accelerator or other throttle control of the vehicle. It is an object to provide for a power transmission adapted to drive its output shaft at a plurality of speed ratios, controlling means including valve means and a source of hydraulic power and means interconnecting the valve means and a throttle lever whereby the throttle lever on being moved successively to one of the limits of its movement successively actuates the valve means to successively change the speed ratio of the transmission. It is contemplated that the arrangement shall preferably be such that when the throttle control is so moved to closed throttle position, the speed ratio of the transmission mechanism is successively decreased and the output shaft is driven at decreased speeds and when the throttle control is so moved to open throttle position, the speed ratio of the transmission mechanism is successively increased and the output shaft is driven at increased speeds. It is also contemplated that the means for successively actuating the valve means shall comprise a pair of pawls and a ratchet wheel.

It is also an object of my invention to provide with a power transmission comprising a hydrodynamic coupling device, a clutch for connecting the driving element and the driven element of the device to lock up the device and a clutch for connecting directly the driven element of the device and the output shaft of the transmission, means interconnecting the clutches and a throttle control of the vehicle whereby the throttle control on being moved successively to one of the limits of its travel successively actuates one of the clutches and then the other of the clutches. It is contemplated that on successive movements of the control to closed throttle position, the clutch for connecting the driven element of the hydrodynamic device and the output shaft shall first be engaged and then the clutch for locking up the hydrodynamic device shall thereafter be engaged. It is also contemplated that on successive movements of the throttle control to open throttle position the clutch for locking up the hydrodynamic device shall first be disengaged and then the other clutch shall thereafter be disengaged.

It is still another object of my invention to provide with a transmission for an automotive vehicle, which transmission provides a plurality of speed ratios, means for controlling the transmission including a valve, a source of hydraulic power and a governor responsive to the speed of the vehicle, with the governor cooperating with the valve to shift the valve whereby to decrease the speed ratio through the transmission on the speed of the vehicle decreasing below a predetermined value. It is contemplated that the transmission shall preferably comprise a hydrodynamic coupling device and a clutch for locking up the coupling device which may be disengaged to decrease the speed ratio, and it is also contemplated that the means under the control of the governor for actuating the valve shall preferably include a fluid pressure operated piston.

It is another object of my invention to provide with a transmission comprising a hydrodynamic coupling device, a clutch for locking up the device, a gear train for connecting the device with the output shaft, and a clutch for connecting the device directly with the output shaft; a control for said clutches which in one position maintains the clutches disengaged, in another position engages the clutch for connecting directly the coupling device and the output shaft and in a third position engages both of the clutches. It is contemplated that a freewheeling mechanism may be provided in the gear train, and it is an object to provide means for locking up the freewheeling mechanism which is engaged when the control is in its first position disengaging the other two clutches. It is contemplated that the clutches may be actuated by fluid pressure and that the control may be a valve connecting a source of fluid pressure with the clutches. It is also contemplated that the valve may be under the control of the accelerator or other throttle control.

It is another object of my invention to provide with this hydraulic transmission control an auxiliary valve operatively between the main control valve and the clutch for connecting directly the hydrodynamic device and the output shaft whereby the clutch may be maintained disengaged if desired. It is also an object to provide piston means for operating the auxiliary valve and under the control of the governor whereby when the main control valve is moved under the control of the governor to disengage the clutch for locking up the hydrodynamic device, the auxiliary valve is moved to its open position whereby the clutch for connecting directly the coupling device and the output shaft may be engaged. It is a further object to provide means interlocking the main and auxiliary valves whereby the auxiliary valve cannot be opened or closed while the main valve is being moved from one of its positions to another.

It is another object of my invention to provide a transmission for an automotive vehicle under the control of a governor which functions to prevent a shift of the transmission to neutral from an "in gear" condition above a predetermined speed of the vehicle.

It is another object of my invention to provide an improved transmission control mechanism including a valve for conditioning the transmission for operation in any one of a number of forward drive ratios and a control for conditioning the transmission for operation in either forward or reverse and means interconnecting the forward and reverse control for the transmission and the valve whereby the valve is actuated to downshift the transmission when the control is moved to condition the transmission for reverse operation.

It is a further object of my invention to provide improved control mechanism for a transmission comprising a hydrodynamic coupling device, a clutch for locking up the device and a clutch for connecting directly the output shaft of the transmission and the device, with the control mechanism including a pair of valves, one of which controls the clutch for locking up the coupling device and the other of which controls the clutch for connecting directly the coupling device and the output shaft and also functions to control the first valve, whereby the clutch for connecting the output shaft and the coupling device directly is engaged in one position of the second valve and both of the clutches are engaged in another position of the last-mentioned valve. It is contemplated that the second valve shall preferably be under the control of a throttle control and the first valve may also be manually controlled independently of the first valve.

It is also an object of my invention to provide in this improved control mechanism, means interlocking the two valves whereby the first valve cannot be moved manually to engage the clutch for locking up the coupling device except when a throttle control of the vehicle is in closed throttle position.

It is another object of my invention to provide in this control mechanism, vehicle governor controlled means for moving both of the valves when the vehicle speed has decreased below a predetermined value whereby the clutch for locking up the coupling device is disengaged.

It is a further object of my invention to provide for an automotive transmission, a manual control for the throttle of the vehicle which is supplementary to the ordinary accelerator and which controls the transmission for downshifting the transmission at open throttle and for upshifting the transmission at closed throttle and to provide also means under the control of the accelerator for preventing an upshift unless the accelerator is also at closed throttle position.

My invention consists of the novel constructions, arrangements and devices to be hereinafter described and claimed for carrying out the above stated objects and such other objects as will appear from a detailed description of certain preferred embodiments illustrated in the accompanying drawings, wherein:

Fig. 4 is a longitudinal sectional view of the transmission;

Figure 1:
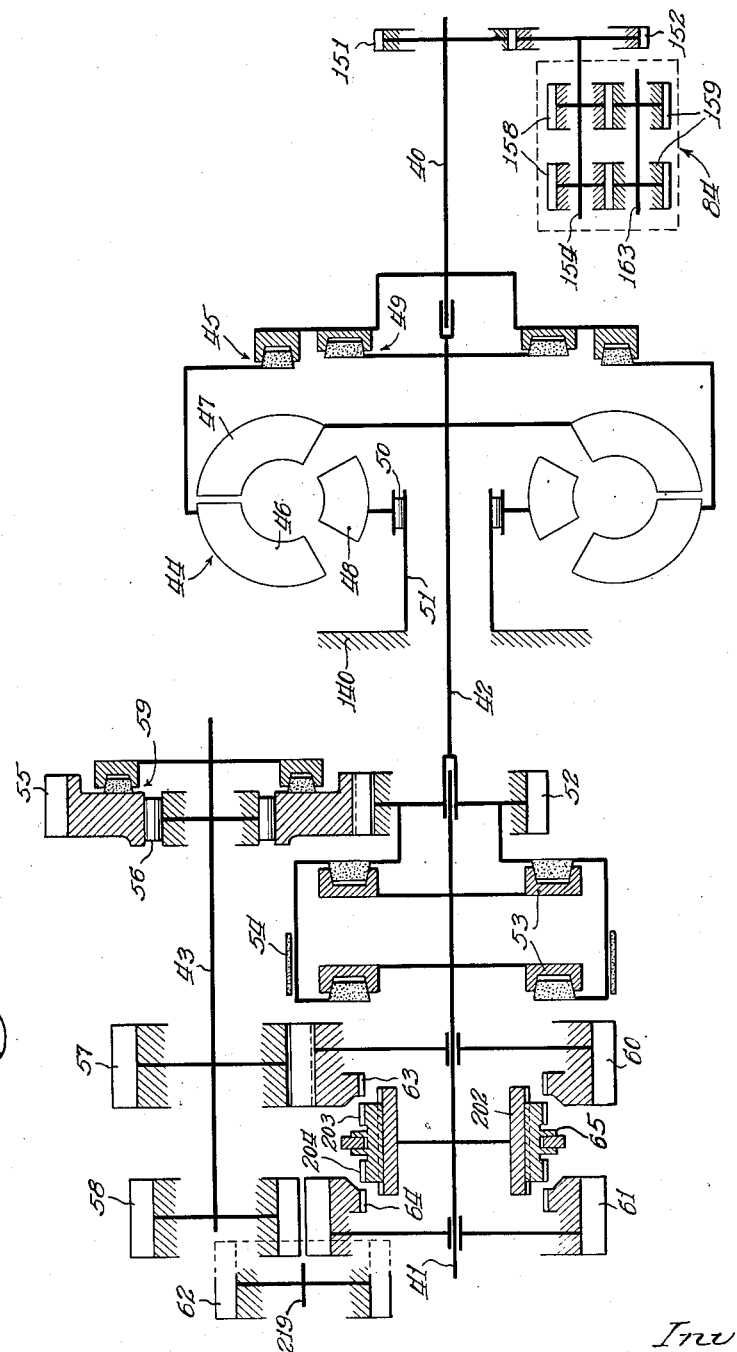
Fig. 1 is a view showing diagrammatically my improved transmission.
Figure 2:
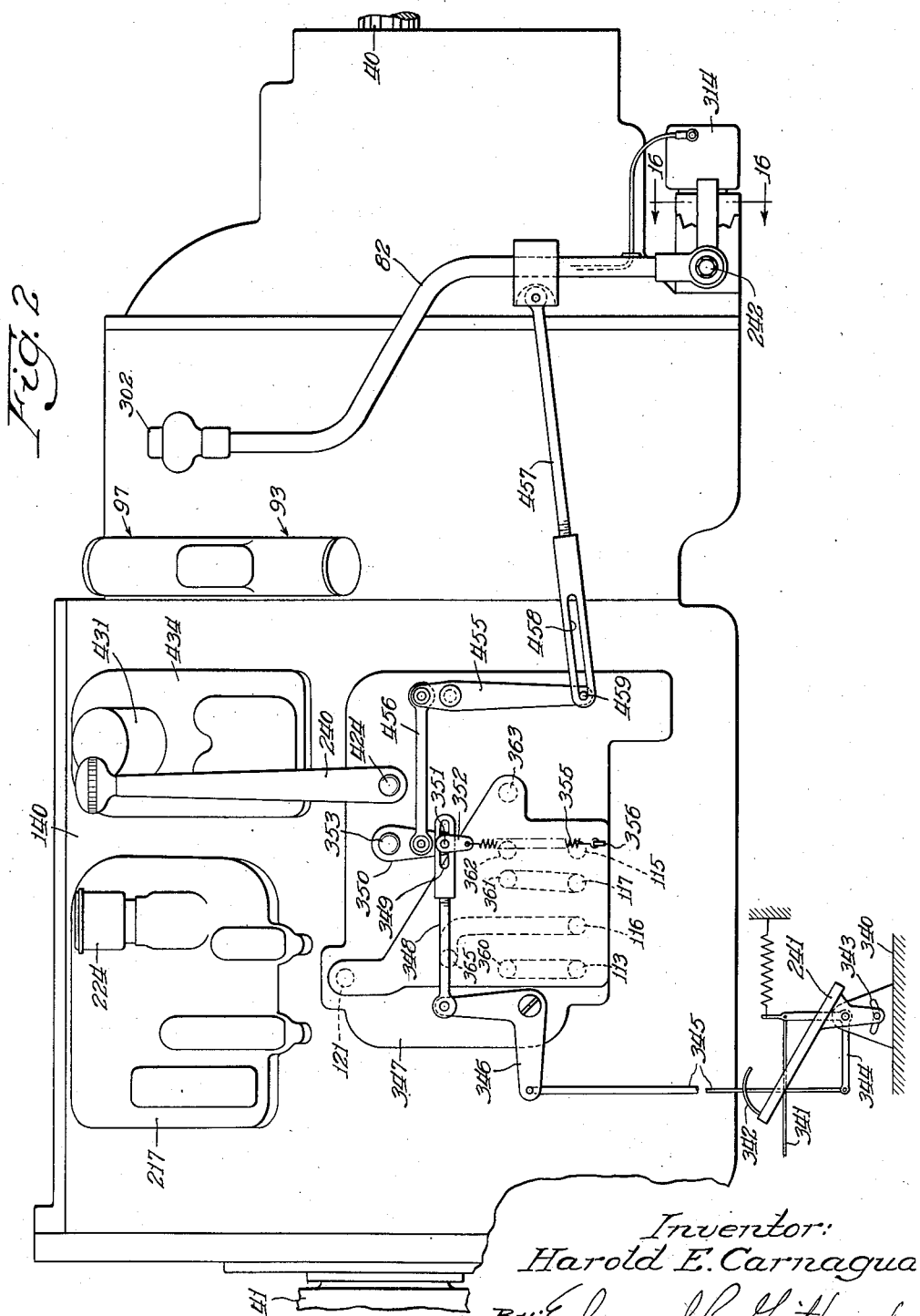
Fig. 2 is a side view of the transmission.
Figure 11:
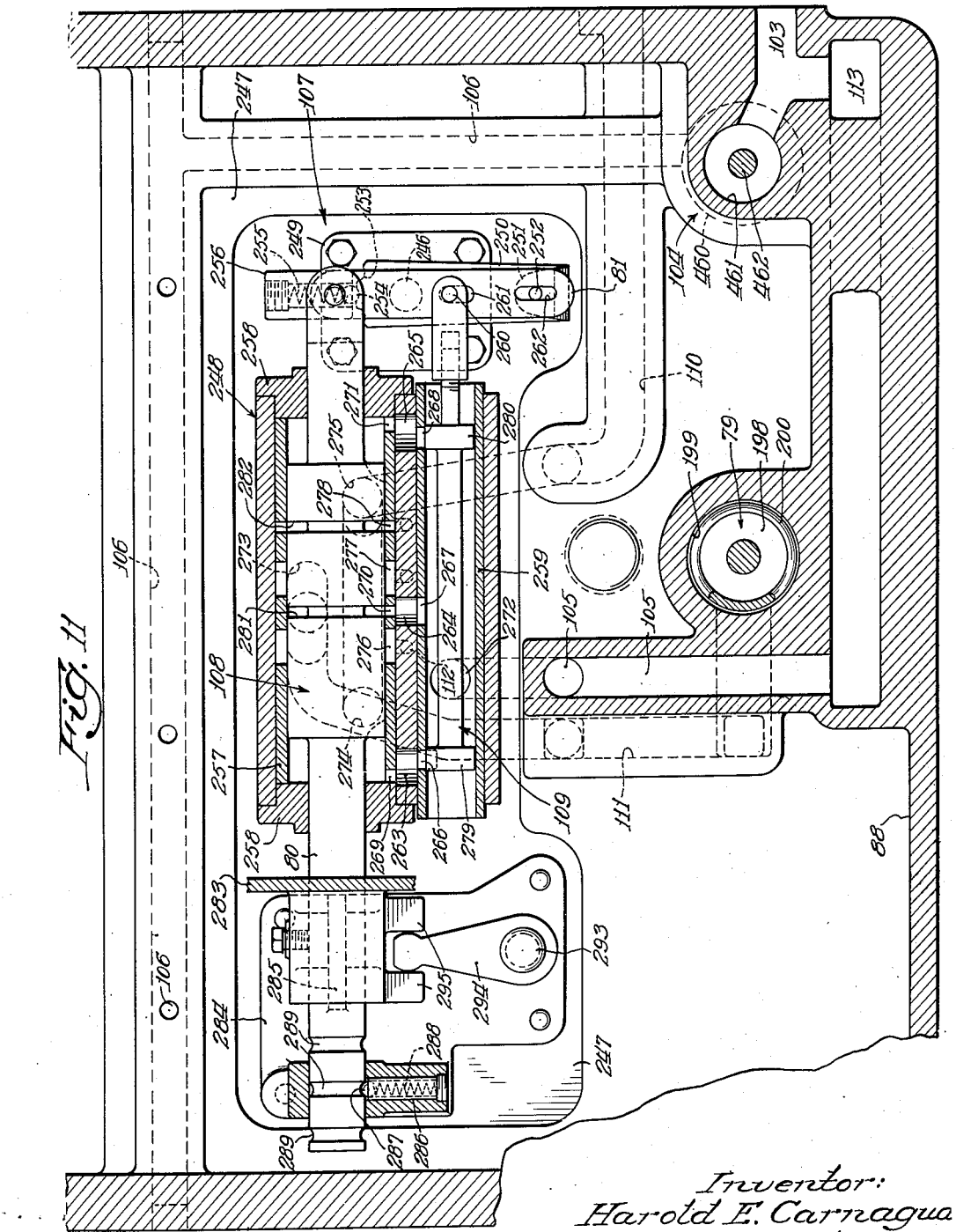
Figure 12:
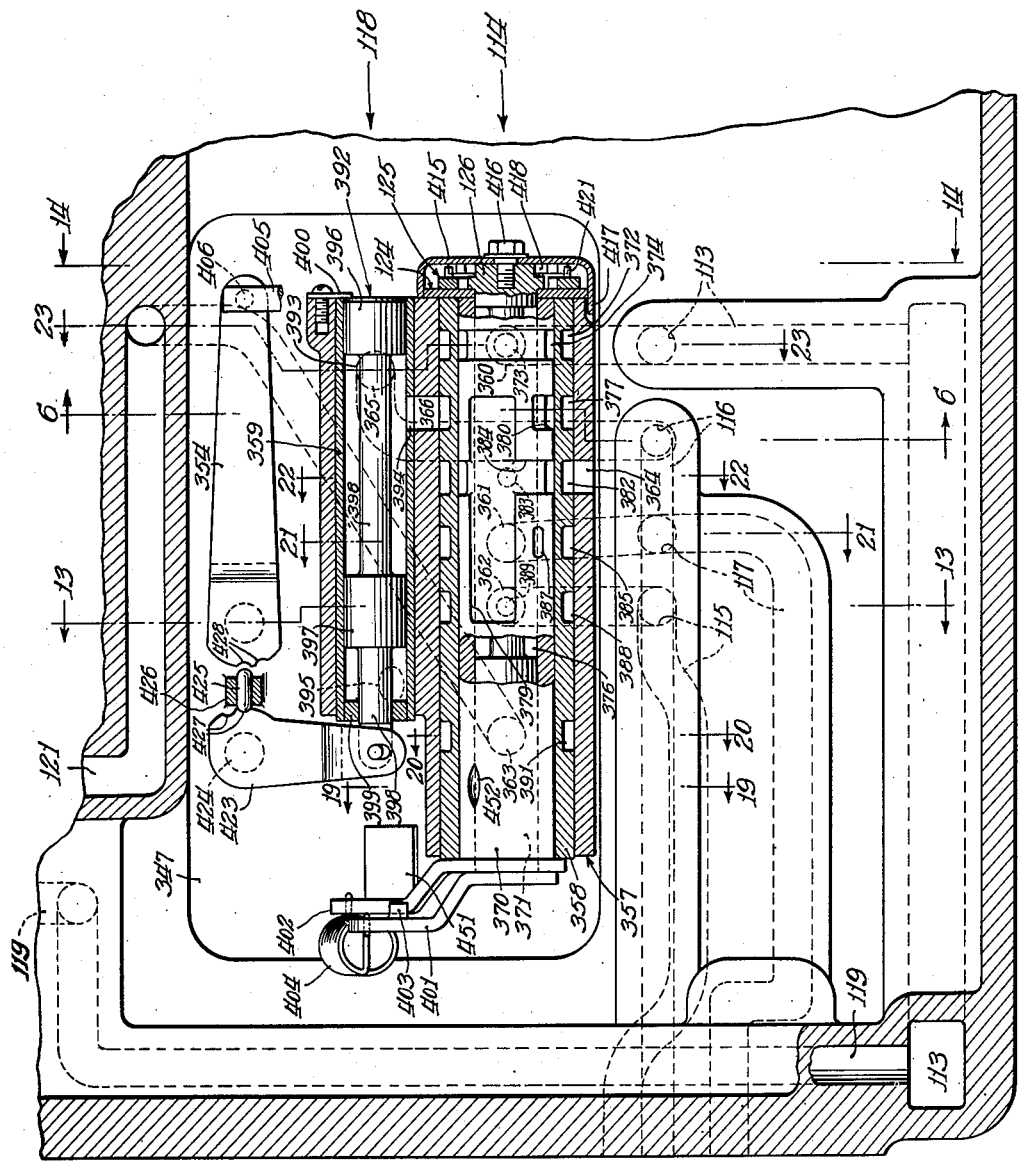

Figs. 5, 6 and 7 are sectional views on an enlarged scale taken on lines 5—5, 6—6 and 7—7 respectively, of Fig. 4;

Figs. 8, 9 and 10 are sectional views on an enlarged scale taken on lines 8—8, 9—9 and 10—10 respectively, of Figs. 4;

Fig. 11 is a sectional view on an enlarged scale taken on lines 11—11 of Figs. 6 and 1;

Fig. 12 is a sectional view on an enlarged scale taken on line 12—12 of Fig. 7;

Figs. 13 and 14 are sectional views taken on lines 13—13 and 14—14 respectively, of Fig. 12;

Fig. 15 is a view with certain portions of the construction being broken away and on an enlarged scale taken from line 15—15 of Fig. 6;

Fig. 16 is a view on an enlarged scale taken on line 16—16 of Fig. 2;

Figs. 17 and 18 are views taken on an enlarged scale on lines 17—17 and 18—18 respectively, of Fig. 16;

Figs. 19, 20, 21, 22 and 23 are sectional views taken on lines 19—19, 20—20, 21—21, 22—22 and 23—23 respectively, of Fig. 12;

Fig. 24 is a view showing diagrammatically the electrical control means for the transmission;

Fig. 25 is a view showing diagrammatically the hydraulic control mechanism for the transmission;

Fig. 26 is a view showing modified control mechanism for use with the transmission instead of certain control mechanism shown in Fig. 2;

Figs. 27 and 28 are sectional views taken on lines 27—27 and 28—28 respectively, of Fig. 26;

Fig. 29 is a view taken on lines 29—29 of Figs. 27 and 28;

Fig. 30 is a view taken on line 30—30 of Fig. 26;

Fig. 31 is a view taken on line 31—31 of Fig. 30; and

Fig. 32 is a sectional view taken on line 32—32 of Fig. 28.

Like characters of reference designate like parts in the several views.

General description of the transmission

Referring to the schematic illustration of the transmission shown in Fig. 1, my improved transmission comprises an input shaft 40, an output shaft 41, an intermediate shaft 42, and a countershaft 43. Functionally, as will hereinafter appear, the intermediate shaft 42 constitutes an output shaft with respect to the shaft 40 and an input shaft with respect to the shaft 41. A hydrodynamic coupling device 44, which is preferably of the torque converter type, is adapted to be driven by the shaft 40 by means of a clutch 45. The torque converter comprises a driving element 46 connected with the clutch 45, a driven element 47 connected with the shaft 42, and a stator element 48. A clutch 49 is provided for connecting directly the input shaft 40 and the intermediate shaft 42 and for locking up the driving element 46 and the driven element 47 of the converter 44 when the clutch 45 is engaged. The stator element 48 is connected by means of a one-way brake mechanism 50 with a stationary shaft 51, and the brake mechanism 50 is of such construction as to prevent reverse rotation of the element 48.

The intermediate shaft 42 has fixed thereon a gear 52, and a clutch 53 is provided for connecting directly the intermediate shaft and the output shaft 41. A brake 54 is provided for restraining the rotation of the shaft 42 and driven element 47. A gear 55 in mesh with gear 52 is disposed on the countershaft 43 and is connected therewith by a one-way clutch mechanism 56, and spaced gears 57 and 58 are fixed on the countershaft. A clutch 59 is provided for locking up the one-way clutch mechanism 56. Gears 60 and 61 are rotatably disposed on the output shaft 41 with gear 60 in mesh with gear 57 and gear 61 in mesh with an idler gear 62 which in turn meshes with gear 58. Clutch teeth 63 and 64 are provided on the gears 60 and 61 respectively, and a grooved clutch sleeve 65 is slidably and non-rotatably disposed with respect to shaft 41 and is adapted to interengage with either the teeth 63 or 64.

The transmission may be controlled to provide three speed ratios in forward drive and one speed in reverse. The lowest or first speed forward is obtained when the clutches 45 and 59 and the positive clutch comprising teeth 63 and the member 65 are engaged, and the clutches 49 and 53 are disengaged. Second or intermediate speed forward is thereafter obtained by engaging the clutch 53 and disengaging the clutch 59 to couple directly the shafts 42 and 41. Third or high speed forward is obtained by thereafter engaging the clutch 49 to lock up the torque converter 44. An auxiliary intermediate speed may be obtained if desired with clutch 49 engaged and with the clutch sleeve 65 engaged with teeth 63 and with the clutches 45 and 59 either engaged or disengaged. Reverse may be obtained by engaging the clutch member 65 with the teeth 64, with the clutches 45 and 59 engaged and with the clutches 49 and 53 disengaged.

General description of the transmission control mechanism

Fig. 25 of the drawings will be referred to particularly for a general description of the control mechanism for the transmission. The clutches 45, 49, 53 and 59 shown in Fig. 1 are, in the control arrangement illustrated, each actuated by fluid pressure operated piston means with the piston means 75, 76, 77 and 78 operating to engage respectively the clutches 45, 49, 53 and 59. The brake 54 is also fluid pressure actuated, a piston mechanism 79 being employed for this purpose. The clutch sleeve 65 is movable with a shaft 80, which in turn is pivotally connected with and is movable with a lever 81. The lever 81 is connected and is movable with a pair of manual control levers 82.

Three pumps 83, 84 and 85 are provided and each is driven by the input shaft 40 of the transmission. The pump 85 functions to draw fluid, preferably oil, through conduits 86 and 87 from a sump 88 for the transmission, and the pump forces the oil through conduit 89 to a cooler 90 and from the cooler through conduit 91 to the hydrodynamic coupling device 44. The pump forces the oil to circulate through the hydrodynamic device and out of the device through a conduit 92 to a low pressure relief valve 93 and from the latter valve through a conduit 94 to conduits 95 and 96 and lubricant relief valve 97. The relief valve 93 functions to connect the conduits 92 and 94, after the oil pressure in the coupling 44 and the conduit 92 has reached a predetermined value, and the relief valve functions to maintain the pressure in the coupling at substantially this value. The relief valve 97 has a conduit 98 connected therewith which leads to the sump 88, and the valve 97 functions to connect conduits 94 and 98 when the oil pressure in conduit 94 has reached a predetermined value and to maintain the oil pressure in the conduits 95 and 96 at this predetermined value. The conduit 95 is connected with the output shaft 41 to lubricate parts movable relative thereto, and the conduit 96 is connected with the countershaft 43 to lubricate parts movable relative thereto, as will be described more fully in connection with the detailed description of the transmission.

The pump 83 is connected to draw oil through a conduit 99 from the oil sump 100 for the hydrodynamic device 44 and to discharge oil through conduits 101 and 98 into the oil sump 88. The pump 83 thus functions to transfer oil which may leak from the hydrodynamic device 44 into the sump 100 to the main sump 88 of the transmission.

The pump 84 is connected to draw oil from the sump 88 through conduits 86 and 102 and to discharge oil under pressure into a conduit 103. The oil pressure in the conduit 103 is maintained at a predetermined value by means of a high pressure relief valve 104 which is connected in conduit 105 which in turn is connected with conduit 103. The valve 104 has a conduit 106 connected therewith, and the valve functions to discharge through this conduit a portion of the oil discharged by the pump 84 through the conduit 103 when the oil pressure in conduit 103 reaches this predetermined value. The conduit 106 is provided with outlets adjacent the gears 55, 57 and 58 whereby the oil which flows through the conduit 106 discharges on to the teeth of the gears for lubricating the teeth.

The conduit 105 is connected with a valve mechanism 107 which comprises valves 108 and 109. The valve 108 is formed on the shaft 80 which is pivotally connected with the lever 81 and which acts on movement thereof to move the clutch sleeve 65. The valve 109 is pivotally connected with the lever 81 adjacent its lower end, as seen in Fig. 25, which is connected with the control levers 82. The valve mechanism is connected by means of a conduit 110 with the engine clutch 45 and is connected by means of a conduit 111 with the brake actuating piston mechanism 79. A conduit 112 arranged to discharge oil into the sump 88 is connected with the valve mechanism as shown.

The valve mechanism 107 as shown in Fig. 25 is in its neutral condition. In this condition of the mechanism, the valve 108 operates to bleed oil from the engine clutch 45 through the conduits 110 and 112 to the sump 88 for disengaging the clutch, and the valve 108 provides a passage between conduits 105 and 111 for engaging the brake 54 for restraining rotation of the driven element 47 of the converter 44.

When the lower end of the lever 81 is moved by means of the control levers 82 to the left as seen in Fig. 25, the valve 109 is moved to the left and opens a passage in the mechanism to allow oil under pressure to flow to the left end of the valve 108. The valve 108 is thereby moved to the right for shifting the clutch sleeve 65 also to the right. However, any such movement of the valve 108 also causes movement of the valve 109 in the same direction by means of link 81 whereby the latter valve covers the passage for admitting fluid under pressure at the left end of the valve 108. Movement of the valve 109 by means of lever 81 thus controls movement of the valve 108 and sleeve 65, and the sleeve may be moved as slowly as desired by power means but under manual control for engaging it with teeth 63. When the sleeve 65 has been moved to fully engage the teeth thereon with the teeth 63, the valve 108 is in a position uncovering an inlet of the conduit 110 whereby fluid under pressure is admitted to the conduit to engage the engine clutch 45. The valve 108 in this position also provides a passage between conduits 111 and 112 whereby the oil is drained from the conduit 111 to disengage the brake 54. The valve mechanism 107 thus functions when in neutral condition to maintain engaged the brake 54 and when conditioned for forward drive, to engage the engine clutch 45 and to engage teeth on the sleeve 65 with the teeth 63. The lower end of the lever 81 may be moved to the right as seen in Fig. 25 to condition the valve mechanism 107 for reverse, and when the mechanism is so conditioned, the engine clutch 45, the brake 54 and the sleeve 65 are actuated in substantially the same manner as when the mechanism is conditioned for forward except that the sleeve 65 is engaged instead with the teeth 64.

The conduit 103 is connected with a conduit 113 which in turn is connected with a valve 114. Conduits 115, 116 and 117 are also connected with the valve 114, and these conduits connect the valve respectively with the clutch 49, the clutch 53 and the clutch 59. A valve 118 adapted for manual operation is provided in the conduit 116 for closing the conduit when desired.

The valve 114 has three positions: low, high and lock-up positions. In the low position of the valve, in which it is shown in Fig. 25, the conduit 113 is connected by the valve with the conduit 117 for applying fluid pressure to the clutch 59 for engaging the clutch. The valve 114 in this position also functions to "bleed" the conduits 115 and 116, that is to say, the valve allows any fluid in the conduits to freely drain therefrom, for maintaining disengaged the clutches 49 and 53. In the second or high position of the valve 114, which is indicated in the figure, the valve functions to bleed the conduits 115 and 117 for maintaining the clutches 49 and 59 disengaged, and the valve also functions to connect the conduits 113 and 116 for applying fluid pressure to the clutch 53 for engaging the latter clutch. In the third or lock-up position of the valve 114, the valve functions to bleed the conduit 117 for maintaining disengaged the clutch 59, and the valve functions also to connect the conduits 115 and 116 each with the conduit 113 for applying fluid pressure to the clutches 49 and 53 for engaging the latter clutches. The clutch 49 may be engaged while the clutch 53 is disengaged by moving the valve 118 to block the conduit 116 and then moving the valve 114 from its first to its third position.

A conduit 119 is provided to connect a valve 120 with the conduit 103. A conduit 121 connects the valves 118 and 120, and a conduit 122 connects a fluid pressure operated piston mechanism 123 with the conduit 121. The valve 120 is actuated by a solenoid which in turn is controlled by a governor responsive to the speed of the vehicle whereby the valve 120 functions to connect the conduits 119 and 121 when the speed of the vehicle has decreased below a predetermined value and to bleed the conduit 121 when the speed of the vehicle is above this value. The piston mechanism 123 operates when the valve 120 connects the conduits 119 and 121 to move the valve 114 from its lock-up position, if it is in that position, to its high or second position, and the valve 118 is moved from its position closing the conduit 116, if it is in that position, to a position opening the conduit 116 when the valve 120 operates to connect the conduits 119 and 121.

The valve 114 is adapted to be actuated by the accelerator of the vehicle by means of a member 124 which is so connected with the accelerator as to be rotated in one direction or the other on the accelerator being moved to one or the other of the limits of its movement. The member 124 has pawl mechanism 125 fixed thereto which is adapted to cooperate with ratchet wheel 126 fixed with respect to the rotatable parts of the valve 114. By means of the ratchet wheel and pawl mechanism, the accelerator on being moved successively to closed throttle position successively moves the valve 114 from its low to its high and then to its lock-up position, and the accelerator on being moved successively to open throttle position successively moves the valve from its lock-up to its high and then to its low position.

*Detailed description of the transmission*

Figs. 2 to 23 of the drawings will be referred to particularly for a detailed description of the transmission. Referring now more particularly to Fig. 4, the input shaft 40 of the transmission is journalled with respect to the housing 140 for the transmission by means of bearings 141, 142 and 143. The intermediate shaft 42 is piloted in the shaft 40, and the shaft 42 is supported at its other end by the sleeve like shaft 51, which is fixed with respect to the housing 140, and the shaft 42 is also supported by a bearing 145 which is disposed in a cylindrical member 146 fixed to the housing 140. Output shaft 41 of the transmission is piloted in the shaft 42 by means of a bearing 147, and the shaft 41 is supported at its other end by means of a bearing 148. The countershaft 43 is supported in the housing 140 by means of bearings 149 and 150.

The shaft 40 has a gear 151 fixed thereon which is in mesh with three other gears 152 (one being shown in the drawing) which are fixed on shafts 153, 154 and 155 respectively (see Fig. 10). The shaft 153 has fixed thereon a pair of gears 156 which are in mesh with a pair of gears 157; the shaft 154 has fixed thereon a pair gears 158 which are in mesh with a pair of gears 159; and the shaft 155 has fixed thereon a pair of gears 160 which are in mesh with a pair of gears 161. The gears 157, 159 and 161 are disposed on shafts 162, 163 and 164 respectively; and the gears 156 and 157 form the low pressure pump 85, the gears 158 and 159 form the high pressure pump 84, and the gears 160 and 161 form the sump pump 83. It will be apparent that these pumps are driven by the input shaft 40 by means of gears 151 and 152.

The torque converter 44 comprises the driving element 46 which is rotatably mounted on the sleeve 51 by means of a bearing 165. The element 46 is connected by means of a ring-like member 166 with a member 167 which latter member forms the side of the converter 44 opposite that formed by the driving element 46. The member 167 is fixed to a clutch housing member 168 which is supported by the bearing 143, as shown. The driven element 47 of the torque converter is fixed to a hub member 169 which is splined on the shaft 42. The stator element 48 of the converter is supported by the roller brake 50, the stationary part of which is the sleeve 51. The roller brake 50 is of any suitable construction and functions to prevent reverse rotation of the stator element 48.

A member 170 which has fixed thereto a ring-like member 171 of yielding friction material is splined to the hub member 169 so as to rotate therewith and with the shaft 42. The member 167 of the torque converter has fixed thereto a similar ring-like member 172. A member 173 which carries a plurality of pistons 174 and a plurality of pistons 175 is fixed to the shaft 40 to rotate therewith. The pistons 174 are each provided with a cavity 176 the sides of which are adapted to engage the friction ring 172 when the pistons are moved toward the ring, and the pistons 175 are each provided with a cavity 177 the sides of which are adapted to engage the friction ring 171 when the pistons are moved toward the ring. The sets of pistons 174 and 175 are disposed in circles (see Fig. 9), and it will be apparent that the pistons 174 form annular piston means 75 for engaging the friction member 172, and the pistons 175 form annular piston means 76 for engaging the friction ring 171. The annular piston means 76 is concentrically disposed with respect to the piston means 75, and it will be noted that both of the annular piston means are coaxial with the shafts 40, 42 and 41.

The conduits 110 and 115 are formed in the housing 140, the shaft 40 and the member 173 (see Fig. 4), and these conduits constitute means for applying fluid pressure to the pistons 174 and 175 as has been hereinbefore explained. The pistons 174 and the friction ring 172 form the clutch 45 for coupling the input shaft 40 and the driving element 46 together. The pistons 175 and the friction ring 171 together form the clutch 49 for coupling together the shafts 40 and 42 and locking up the converter 44 assuming that the clutch 45 has previously been engaged. Fluid passages 178 between the pistons 174 and fluid passages 179 between the pistons 175 are provided in order that fluid pressure from the conduits 110 and 115 will be applied to all of each set of pistons when the respective conduits carry fluid under pressure. The portion of the housing 140 under the converter 44 forms the sump 100, as indicated in Fig. 4.

The gear 52 is formed on the shaft 42, and the shaft is provided with a flange 180 to which is fixed a ring-like member 181 of yielding friction material. A drum 182 having a side 183 to which side is fixed a member 184 similar to the member 181 is fixed to the flange 180.

A member 185 carrying opposed pistons 186 and 187 is fixed to the shaft 41 and is disposed inside the drum 182. The pistons 186 are each formed with cavities 188 the sides of which are adapted to engage the member 181 when the pistons are moved toward the member, and the pistons 187 are each provided with a cavity 189 the sides of which are adapted to contact the member 184 when the pistons 187 are moved toward the member 184. The conduit 116 is formed in the shafts 41 and 42 and in the housing 140 and functions to connect the high-pressure pump 84 with the pistons 186 and 187 to apply fluid pressure to the pistons. The pistons 186 and 187 and ring members 181 and 184 form the clutch 53, and when fluid under pressure is applied to the pistons, the pistons 186 and 187 are moved in opposite directions whereby the pistons frictionally contact the ring-like members 181 and 184 to engage clutch 53 and couple directly together the shafts 42 and 41. The set of pistons 186 and the set of pistons 187 are both disposed in rings (see Fig. 6), and both sets of pistons form annular piston means designated as 77 in Fig. 25.

The brake 54 acts on the drum 182 and comprises a brake band 190 which is held in place on the drum by portions 191, 192 and 193 of the housing, substantially as shown in Fig. 6. One end of the brake band 190 is fixed to a member 194 which in turn is fixed with respect to the housing portion 193. The brake band 190 at its other end is fixed to a member 195 which has swingably and adjustably mounted thereon a link 196. A link 197 is pivotally connected with both the link 196 and the member 194, and the link 197 is also pivotally connected with a piston 198. The piston is slidably disposed in a cylinder 199 formed in the housing 140, and a spring 200 is provided between the land portion of the piston and a sleeve-like member 201 in the end of the cylinder for forcing the piston to the right as seen in Fig. 6. The cylinder 199 is connected with the conduit 111 by means of which fluid under pressure is applied to the piston 198, and the piston when so acted on by fluid pressure is moved to the left as seen in the figure. Such movement of the piston moves the links 197 and 196 such as to forcibly pull the end member 195 of the brake band 190 to the left as seen in the figure and tighten the brake band about the drum 182. When the fluid in the conduit 111 is drained from the conduit, the spring 200 functions to move the piston 198 to the right as seen in the figure and to disengage the brake band 190. The parts 198, 200 and 201 form the piston mechanism 79, as seen in Fig. 25, and actuate the brake 54 as described.

The gears 60 and 61 are rotatably disposed on the shaft 41 as seen in Fig. 4. A hub member 202 is fixed on the shaft 41 between the gears 60 and 61, and the grooved clutch sleeve 65 provided with teeth 203 and 204 is splined on the hub member 202. The gears 60 and 61 are provided with the teeth 63 and 64 respectively, and the teeth 203 and 204 are adapted to mesh with the teeth 63 and 64 respectively when the sleeve 65 is moved on the member 202 in one direction or the other. The teeth 63 and 203 thus constitute a positive type clutch for connecting the gear 60 with the shaft 41, and the teeth 204 and 64 constitute a positive type clutch for connecting the gear 61 with the shaft 41. The gears 60 and 61 are lubricated by means of oil which is forced into the passages 95 which are formed in the shafts 41 and 42 as shown, with the passages being connected with the pump 85 as has been hereinbefore described.

The countershaft 43 has integrally formed thereon the gears 57 and 58, and the gear 55 is rotatably disposed on the shaft. The one-way roller clutch 56 is provided between the gear 55 and the shaft 43, and the clutch 56 is of such construction as to cause the shaft 43 to turn in a direction reverse with respect to the direction of rotation of the shaft 40 when the gear 55 is turned in such direction in order that there may be a transmission of power through the shaft 43.

The gear 55 is provided with a flange portion 205 to which is fixed a cover plate 206. The flange portion and the cover plate form an annular cavity in which is disposed a member 207. The member 207 is fixed to the shaft 43 and has slidably disposed therein a plurality of pistons 208. A ring-like member 209 of yielding friction material is fixed to the gear 55, and the pistons 208 are each provided with a cavity 210 the sides of which are adapted to engage the member 209 when the pistons are moved to the left as seen in Fig. 4. The pistons 208 and the member 209 together form the clutch 59 for locking up the one-way clutch 56 and preventing relative movement between the gear 55 and the shaft 43. The pistons 208 are disposed in a circle, as shown in Fig. 7, to constitute annular piston means which is designated as 78 in Fig. 25. Fluid under pressure is supplied to the pistons 208 by means of conduit 117 for engaging clutch 59, and the conduit is formed in the shaft 43 and in the transmission housing 140 as shown in Fig. 4. Passages 211 are provided for connecting certain of the pistons 78 substantially as shown in Fig. 7 in order that fluid under pressure may be supplied to all the pistons.

The housing portion 192 which serves to guide the brake band 190 (see Figs. 4 and 6) fits about the shaft 43 and is formed with a part of the conduit 96 which serves to connect that part of the conduit in the transmission housing 140 with that part of the conduit which is formed in the shaft 43. The conduit 96 serves to lubricate the gear 55 as is apparent from the figures. The sump 88 for collecting any fluid from the conduit 96 or from other sources is located in the housing 140 beneath the gears 52, 60 and 61 as indicated.

A gear 212, in addition to the gears 55, 57 and 58, may be provided on the shaft 43 (see Figs. 4 and 5), and a gear 213 on a shaft 214 journaled in housing 140 may be provided to mesh with the gear 212. The shaft 214 may be utilized for any suitable purpose as for driving a speedometer unit (not shown).

Another countershaft 215 is provided, journaled in a housing portion 216 which is fixed to a plate portion 217 for the housing 140 (see Figs. 5, 6 and 15). A gear 218 is fixed on the shaft 215 and is in mesh with and is adapted to be driven by the idler gear 62. The gear 62 is in mesh both with gear 58 and gear 61 as has been hereinbefore described and is rotatably disposed on a shaft 219 fixed with respect to housing 140. Oil from conduit 96 is utilized for lubricating the gear 62 in addition to gear 55 as is indicated in Fig. 25. The shaft 215 drives a pump unit 220 in the housing portion 217, and the unit may be utilized for supplying fluid under pressure for any suitable purpose such as for lubricating certain parts of the power train (not shown) driven by the transmission. A gear 221 is fixed on the shaft 215 and is in mesh with a gear 222 on a shaft 223 of a governor unit 224. The clutch sleeve 65 is in mesh with teeth 63 for forward drive as has been hereinbefore described, and it will be apparent that the governor unit 224 and shaft 41 are then connected by the power train which comprises shaft 223, gears 222 and 221, shaft 215, gears 218, 62 and 58, shaft 43 and gears 57 and 60, and the speed at which the governor unit is driven in forward drive of shaft 41 is thus proportional to the speed of shaft 41.

The transmission may be actuated to provide three speeds in forward drive and one speed in reverse drive. Low speed forward is obtained by engaging the teeth 203 on the clutch sleeve 65 with the teeth 63 and engaging the clutch 45. The drive is then from the input shaft 40 through the member 173, the pistons 174, the friction ring 172, the members 167 and 166, the driving element 46 of the torque converter 44, the driven element 47 of the converter and the shaft 42 and from this shaft to the gear train comprising the gears 52 and 55, the one-way clutch 56, the counter shaft 43, the gears 57 and 60, the teeth 63 and 203 and the clutch ring 65 to the output shaft 41. The friction clutch 59 is preferably engaged in this speed ratio to lock up the clutch 56 whereby the shaft is also driven through friction ring 209, piston 208 and the piston holding member 207. The clutch 59 thus need not be of sufficient size for transmitting the entire power for driving the vehicle; however, it is contemplated that the clutch 59 shall be of sufficient capacity to prevent coasting of the vehicle. Second speed forward may be obtained thereafter by engaging the clutch 53 and disengaging the clutch 59. In this speed the drive from the input shaft 40 to the shaft 42 is the same as in low speed, and the shaft 42 drives the output shaft 41 through the friction rings 181 and 184, the pistons 186 and 187 and the piston holding member 185. In this speed the one-way clutch 56 overruns. Third or lock-up speed may be obtained by thereafter engaging the clutch 49, and the drive is then from the input shaft 40 through the member 173, the pistons 175, the friction ring 171, the members 170 and 169, the shaft 42, the friction rings 181 and 184, the pistons 186 and 187, and the piston holding member 185 to the output shaft 41. An auxiliary intermediate speed forward may be obtained by engaging the clutch 49 with the teeth 203 and 63 intermeshing and with the clutch 59 either engaged or disengaged. The drive through the transmission is then the same as in low speed except that the shaft 42 is driven through the member 173, the pistons 175, the ring 171 and member 170 instead of through the pistons 174, the ring 172 and the torque converter 44. Reverse may be obtained by engaging the teeth 204 of the clutch sleeve 65 with the teeth 64 and with the clutches 53 and 49 disengaged. The drive is then the same as in low speed forward except that the drive is through gears 58, 62 and 61 and clutch teeth 204 and 64 instead of gears 57 and 60 and clutch teeth 203 and 63.

My improved transmission is advantageously constructed to transmit the large torques necessary for driving heavy vehicles such as military tanks, trucks and tractors. All of the friction clutches in the transmission, which are actuated for changing the transmission ratios, are power-operated and are capable of transmitting the necessary high torques and are easily controlled. The transmission advantageously is quite compactly constructed. The clutches 49 and 45 are arranged concentrically with respect to each other and coaxially with respect to the shafts 40 and 42, and the clutches require a minimum of space. The clutch 53 for connecting directly the shafts 42 and 41 is positioned between the set of meshed gears 52 and 55 and the set of meshed gears 60 and 57 and is thus compactly arranged with respect to the gears.

*Detailed description of the transmission control mechanism*

Figure 3:
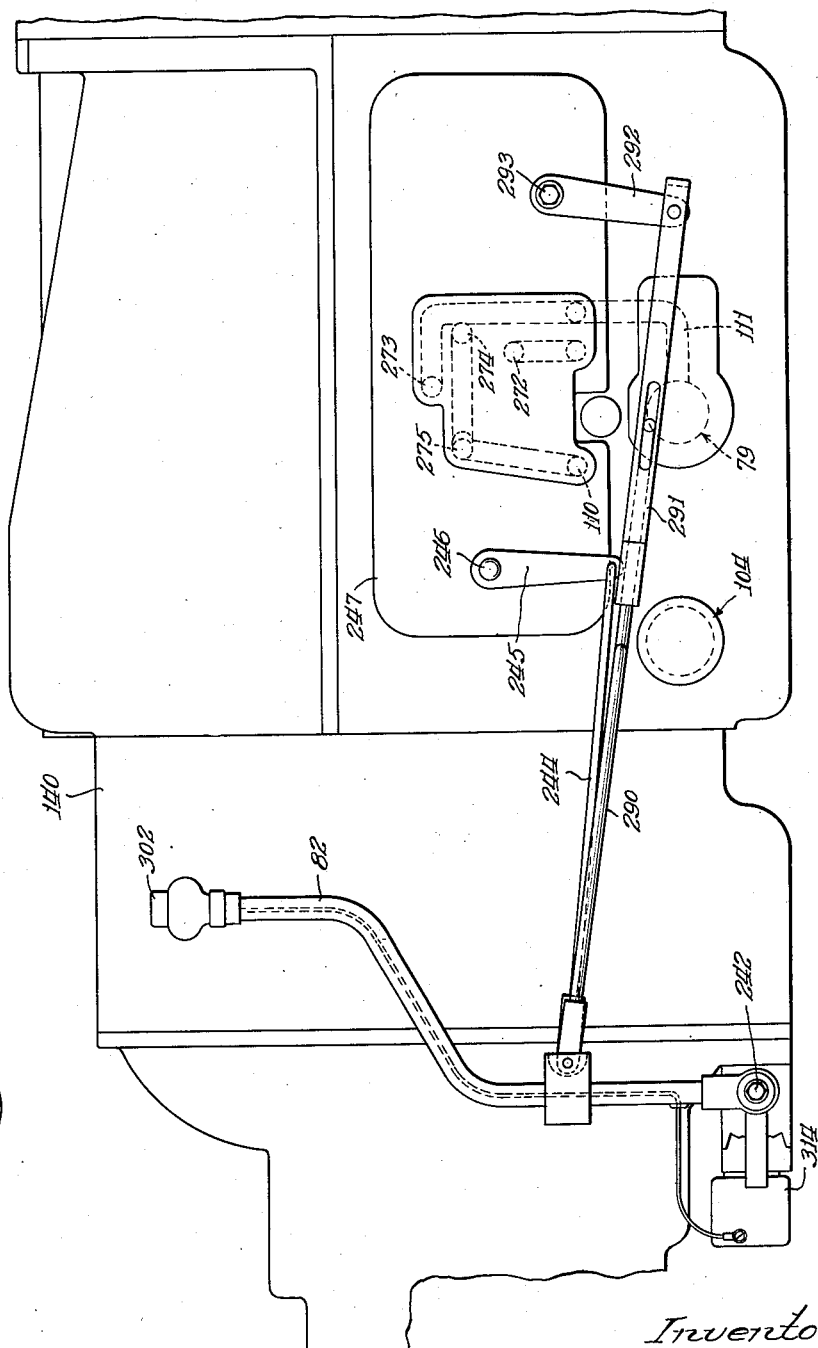
Fig. 3 is a side view of the transmission, showing the side thereof opposite to that shown in Fig. 2.

The transmission above described is controlled by control levers 82 and 240 and a throttle control or more particularly the accelerator or accelerator pedal for the vehicle in which the transmission is installed (see Figs. 2 and 3). The control levers 82 are disposed one on each side of the transmission and are connected by means of a shaft 242 (see Fig. 16). The levers 82 are swingably mounted with respect to the transmission by means of that shaft which extends through flanges 243 fixed with respect to the transmission housing 140 and the levers are both fixed on the shaft 242 to move together.

The control lever 82 on the right side of the transmission as shown in Fig. 3 is connected by a link 244 with a lever 245. The lever 245 is fixed to a shaft 246 (see Fig. 7) which extends through a plate portion 247 supporting a valve block 248 and through a shaft supporting member 249 fixed to the plate portion 247. The shaft 246 has fixed on its inner end a member 250 which is formed with a return bend portion 251 at its lower end and is provided with a pin 252 in the return bend portion (see also Fig. 11). The member 250 on its upper edge is provided with three notches 253 each of which is adapted to receive a ball 254 which is yieldably pressed by a spring 255 into the notches. The spring and ball are disposed in a hollow portion 256 of the member 249, and the spring, ball and notches act as poppet means for yieldably holding the member 250 and thereby the lever 245 in any one of the three positions corresponding to the notches 253.

The valve block 248 is provided with a cylindrical cavity therein in which is disposed a sleeve 257. The valve 108 is slidably disposed in the sleeve, and caps 258 having central openings therein are provided for closing the ends of the cylindrical cavity in the valve block and the sleeve 257. The shaft 80 of the piston 108 extends through the caps 258 as shown. The valve block 248 is provided with another cylindrical cavity therein in which is disposed a sleeve 259, and the valve 109 is slidably disposed in the sleeve 259 as shown.

The lever 81 is connected with the shaft 80, the valve 109 and the member 250. The lever 81 has a pivotal connection with the shaft 80 as shown, and the lever is connected with the valve 109 by means of a pin 260 which passes through a slot 261 in the lever. The lever 81 is provided with a slot 262 for receiving the pin 251, and the lever is thereby connected with the member 250.

The valve block 248 is provided with openings 263, 264 and 265 connecting the two cylindrical cavities in the block. The sleeve 259 is provided with openings 266, 267 and 268 which are aligned with the openings 263, 264 and 265 respectively, and the sleeve 257 is provided with openings 269, 270 and 271 which are also aligned with the openings 263, 264 and 265 respectively. The sleeve 259 is also provided with an opening 272 therein to which the conduit 105 is connected as shown. The sleeve 257 is also provided with openings 273, 274 and 275, and the openings 273 and 275 are elongated openings as shown. The openings 274 and 275 are each connected with the conduit 110, and the opening 273 is connected with the conduit 111. The sleeve 257 is also provided with openings 276, 277 and 278 therein which are connected to drain fluid into the transmission sump 98 as by means of a conduit 112 (see Fig. 25).

The valve 109 is formed with lands 279 and 280 which in the neutral position of the valve as shown in Fig. 11 function to cover the openings 266 and 268 respectively. The valve 109 is provided with slots 281 and 282 therein, and in the neutral position of the valve as shown in Fig. 11, the slot 281 is in alignment with the openings 278 and 273 and the slot 282 is in alignment with the openings 278 and 275.

In its neutral condition, the valve mechanism functions to connect the conduit 105, which carries fluid under pressure, by means of the openings 272, 267, 264 and 278, the slot 281 and the opening 273, with the conduit 111 which is connected with the piston mechanism 79 for the brake 54 whereby the brake is engaged. In this condition, the valve mechanism also bleeds the conduit 110 connected with the clutch 45 by means of the opening 275, the slot 282, and the opening 278 whereby the engine clutch is maintained disengaged.

When the member 250 is moved in one direction or the other by means of the lever 245 and the control levers 82, the member 250 functions by means of the pin 252 to move the lever 81, pivoting it about its connection with the piston rod 80. When the lever 81, for example, is moved by the member 250 in a clockwise direction about its pivotal connection with the piston rod 80, as seen in Fig. 11, the piston 109 is moved to the left such that its land 279 uncovers the opening 266. This movement of the piston 109 thus connects the conduit 105, which carries fluid under pressure, with the left end of the sleeve 257 by means of the openings 266, 263, and 269, and fluid under pressure is admitted between the left end of the valve 108 and the adjacent cap 258 to move the valve to the right as seen in the figure. Such movement of the valve 108, however, also moves the upper end of the lever 81 to the right and acts to move the piston 109 in the same direction, pivoting the lever 81 about the pin 252 in a clockwise direction. Such movement of the valve 109 to the right causes the land 279 to again cover the opening 266 to stop additional flow of fluid to the left end of the sleeve 257. Thus, it will be apparent that a movement of the lever 81 in a clockwise direction by means of the member 250 causes the valve 108 and the rod 80 to be moved a small distance to the right until the land 279 again covers the opening 266. The valve 108 may be moved to the limit of its movement to the right into contact with the cap 258 at the right end of sleeve 257 simply by continuing to move the lever 81 in a clockwise direction of rotation to keep the opening 266 uncovered by the land 279 while the piston 108 is moving to the right.

When the lever 81 is moved with a counterclockwise direction of rotation about its pivotal connection with the rod 80 by means of the member 250 and the pin 252, such movement causes movement of the valve 109 to the right as seen in Fig. 11, to uncover the opening 268 and admit fluid under pressure to the right end of the sleeve 257 for moving the valve 108 to the left. Such movement of the valve 108, however, tends to move the valve 109 to the left to again cover the opening 268 to stop fluid flow to the sleeve 257 and stop movement of the valve 108. The piston 108 may be moved to the limit of its movement to the left into contact with cap 258 at the left end of sleeve 257 simply by continuing the movement of the lever 81 in a counterclockwise direction by means of the member 250 to keep the opening 268 uncovered as the valve 108 moves, substantially in the same manner as the piston 108 is moved to the limit of its movement to the right by moving the lever 81 in a clockwise direction as above described.

The member 250 when conditioned to move the valve 108 to either of the limits of its movement is rotated such that the ball 254 is positioned in one of the outer notches 253. In either of these positions of the member 250, with the valve 108 at either of the limits of its movement, the lever 81 is in such position that one of the openings 266 or 268 is uncovered by the respective land 279 or 280 whereby fluid under pressure continues to be applied to one of the ends of the valve 108, and the valve 108 is thereby held at the limit of its movement. The valve 108 when at either of the limits of its movement uncovers one of the openings 274 or 275 both of which are in communication with conduit 110, and the fluid which is applied under pressure to one end of the valve enters one of these openings and is thereby applied to the engine clutch 45 for engaging the clutch. When the piston 108 is at either of the limits of its movement, the conduit 111 is bled through the opening 273, the slot 281 and either of the openings 276 or 277, and the brake 54 is thus disengaged.

A yoke member 283 (see Fig. 5) which fits in the groove of the clutch sleeve 65 is fixed on the valve rod 80 whereby the sleeve 65 and yoke 283 are movable with the rod 80. The rod 80 is journaled in a member 284 which is fixed to the plate portion 247, and the member 284 is preferably provided with a rib 285 fitting in a groove formed in the yoke member for supporting the yoke member. The member 284 is provided with a cylindrical cavity 286 in which is disposed a ball 287 and a spring 288 acting on the ball. The rod 80 is provided with three grooves 289 each of which is adapted to receive the ball 287, and the ball when positioned in any of the grooves 289 acts to yieldably hold the piston rod 80 and thereby the yoke member 283 from movement. Each of the grooves 289 is so disposed as to correspond with a principal position of the clutch sleeve 65 and of the valve 108. When the central groove 289 is in position to receive the ball 287, the clutch sleeve 65 is in neutral and it does not engage with either the teeth 63 or 64, and the valve 108 is in neutral position substantially as shown in Fig. 11. When the rod 80 is moved to the right such that the grooves 289 on the extreme end of the rod 80 is in position to receive the ball 287, the teeth 203 are completely engaged with the teeth 63, and the gear 60 is thus fixed with respect to shaft 41, and the valve 108 is in contact with the cap 258 at the right end of sleeve 257. When the piston rod 80 is moved to the left such that its innermost groove 289 is in position to receive the ball 287, the teeth 204 are in engagement with the teeth 64, and the gear 61 is thus fixed with respect to the shaft 41, and the valve 108 is in contact with the cap 258 at the left end of sleeve 257. It will thus be apparent that the grooves 289, the ball 287 and the spring 288 act as poppet means for holding the valve 108 and yoke member 283 in their principal positions.

The arrangement of the parts above described under the control of the control levers 82 is such that the levers 82 may be moved in one direction or the other out of neutral position for simultaneously moving the clutch sleeve 65 to complete a gear train for either forward or reverse drive and for disengaging the brake 54 and engaging the engine clutch 45. The lever 82 shown in Fig. 3 may be moved in a clockwise direction, with corresponding movement of the other lever 82, to condition the transmission for forward drive. Such movement of the levers 82 causes counterclockwise rotation of the lever 245 as seen in Fig. 3, clockwise rotation of the member 250 and lever 81 as seen in Fig. 11, movement of the piston rod 80 to the right as seen in this figure and movement of the clutch sleeve 65 to the right as seen in Fig. 4. It will be apparent that small movements of the control lever 82 cause correspondingly small movements of the piston rod 80 and the clutch sleeve 65 and that slow continuous movement of the lever 82 causes corresponding movement of the piston rod 80 and the clutch sleeve 65. The sleeve 65 may thus be moved into engagement with teeth 63 as slowly as desired to avoid clash. Although the movement of the sleeve 65 and levers 82 in general corresponds, it will be appreciated that the sleeve 65 is moved by the force of fluid under pressure, and thus no great manual force is needed to effect a shift of the sleeve. When the teeth 203 and 63 are thus engaged, the valve 108 is in such a position as to bleed conduit 111 and to apply fluid pressure to conduit 110 as is apparent, and the outer groove 253 in member 250 on the left as seen in Fig. 11 receives the ball 254 and the groove 289 on the extreme end of the rod 80 receives the ball 287. The poppet means comprising the ball 254 functions to hold the member 250 and lever 245 from jarring out of their positions corresponding to forward drive, and the poppet means comprising the ball 287 functions to hold the valve 108 and yoke member 283 from jarring out of their positions for forward drive. The controls 82 may be moved in a counterclockwise direction as seen in Fig. 3 to condition the transmission for a drive in reverse, and the parts operate in a manner similar to that in which they operate for a conditioning of the transmission for forward drive with the exception that the piston rod 80 is moved to the left as seen in Fig. 11 to engage the teeth 204 and 64 instead of engaging the teeth 203 and 63.

The control lever 82 on the right side of the transmission as seen in Fig. 3 is connected by means of a link comprising link portions 290 and 291 with a lever 292 which is fixed on a shaft 293. The link is of any suitable construction to provide a lost motion connection between link portions 290 and 291 such that there may be a limited movement of the portion 290 before this portion acts to move the link portion 291. The shaft 293 is journaled in the plate portion 247 and in the member 284 as may be seen in Fig. 5. The shaft 293 has fixed on its inner end a lever 294, and the yoke member 283 for the clutch sleeve 65 is provided with two spaced lugs 295 adapted to receive between them the end of the lever 294 (see Fig. 11).

This connection comprising the levers 292 and 294 for connecting the controls 82 and the yoke member 283 is provided for shifting the clutch sleeve 65 when for any reason it is not possible to do so with use of the valve mechanism 107, as, for example, if the high pressure pump 84 should fail. Assuming the valve mechanism 107 inoperative, movement of the controls 82 in a clockwise direction as seen in Fig. 3 causes movement of the lever 292 in a counterclockwise direction as seen in this figure and movement of the lever 294 in a clockwise direction as seen in Fig. 11, whereby the yoke member 283 and the clutch sleeve 65 are moved to interengage the teeth 203 and 63 for connecting the gear 60 with the shaft 41. When the controls 82 are moved in the opposite direction, the levers 292 and 294 and the yoke member 283 move in opposite directions to bring into interengagement the teeth 204 and 64 for connecting the gear 61 with the shaft 41. The lost motion linkage comprising the link portions 290 and 291 is provided in order that the lever 245 shall be effective to move the clutch sleeve 65 by means of the valve mechanism 107 when the latter is operative without help from the lever 292, so that ordinarily the shifting of the clutch sleeve 65 is done entirely by the power means provided.

Poppet means is preferably provided for maintaining the control levers 82 in any of their principal positions, neutral, forward or reverse. The poppet means comprises a hollow portion 296 (see Fig. 17) formed on each of the rods 82 and having disposed therein a plunger 297 and a spring 298 acting on the plunger. The flanges 243 are provided with notches 299 for receiving the plungers 297, and the notches are so disposed as to position the levers 82 in their neutral, forward or reverse positions and so maintain the levers against such forces as are caused by jarring or jerking of the vehicle on which the transmission is installed. It will be understood that this poppet means acts to supplement the action of the poppet means comprising the ball 254 and notches 253 since the rods 82 and member 250 are movable together. The flanges 243 are also preferably provided with abutment portions 300 for contacting the portions 296 of the rods 82 to limit movement of rods 82.

Mechanism for preventing certain shifts of the control levers 82 except for under certain conditions is preferably provided. With the contemplated mechanism, the control levers 82 cannot be moved from neutral to condition the transmission for reverse drive until the operator has first closed an electrical switch, and the control levers cannot be moved from their positions conditioning the transmission for forward drive to neutral unless the speed of the vehicle has decreased below a predetermined value. This control mechanism comprises switches 301 (see Fig. 24) one of which is disposed in the upper end of each of the shift levers 82 and push buttons 302 for closing the switches. One contact of each of these switches is grounded to the vehicle as indicated by reference numeral 303, and the other contacts of the switches are connected by means of leads 304 with the winding 305 of a relay 306. The winding 305 is connected by a lead 307 with the battery 308 of the vehicle which is grounded to the vehicle at 309. A resistor 310 and the ignition switch 311 of the vehicle are disposed in series in the lead 307 between the winding 305 and the battery 308 as shown.

The relay winding 305 is adapted when energized to close relay contacts 312 which are connected with lead 307 and by means of a lead 313 with a solenoid 314 having a movable armature 315 and grounded to the vehicle at 316 (see Figs. 18 and 24). The shaft 242 has fixed thereon a flanged member 317 which is provided with a slot comprising slot portions 318, 319, 320 and 321. The armature 315 is bifurcated at its outer end and receives the flange of the member 317 between its bifurcations, and the armature is provided with a stub shaft 322 fixed therein and extending through the slot in the member 317. The shaft 322 carries on its ends a pair of tension springs 323 which are connected by pins 324 to the member 317 and function to yieldingly pull the armature 315 toward the shaft 242 as is apparent.

Relay contacts 325 which are in shunt with the contacts 312 are provided for connecting leads 307 and 313. The contacts 325 are brought into contact to complete a circuit upon energization of a relay winding 326 which is connected with the lead 307. The winding 326 is also connected, by means of a lead 327, with the governor 224 which, as shown in Fig. 6, is driven by the gears 221 and 222 and the shaft 223 and which is grounded at 328 to the vehicle. The governor 224 may be of any suitable construction, and it functions to connect the lead 327 with the ground 328 upon the speed of the vehicle increasing above a predetermined value, for example, ten miles an hour in the forward direction.

When the solenoid 314 is not energized, the armature 315 is held at the limit of its movement to the right as seen in Fig. 18 by the springs 323 with the shaft 322 in the slot portions 319 and 320. In this position of the shaft 322, the control rods 82 may be moved between their neutral and forward positions with relative movement between shaft 322 and slot portion 320; however, the shaft 322 by contact with a side of the slot portion 319 functions to prevent movement of the control rods 82 from their neutral to their reverse positions. Either of the switches 301 actuated by the buttons 302 may be utilized for energizing the solenoid 314 to move the armature 315 and shaft 322. Either of the switches 301 when closed completes a circuit through the relay coil 305 to close the relay contacts 312, and the solenoid 314 is energized by means of the closed contacts and leads 307 and 313. The solenoid 314 upon energization operates to move the armature 315 inwardly thereof and to move the shaft 322 in the slot portion 319 to the side of the slot portion 318. The control levers 82 thereafter may be moved from their neutral positions to their reverse positions with relative movement between the slot portion 318 and the shaft 322. When the push button 302 which has been utilized to close a switch 301 is released to open the switch, the solenoid 314 is deenergized, and the control levers 82 may thereafter be moved from their reverse positions to their neutral positions, and the springs 323 will operate to move the armature 315 and shaft 322 to their positions as shown in Fig. 18. The shaft 322 will then again operate to prevent movement of the levers 82 to their reverse positions. The solenoid 314 and the associated parts thus function as latch means to prevent accidental movement of the control levers 82 to their reverse positions, and the latch means is so operative until the vehicle operator by the operative stroke of depressing either of the buttons 302 energizes the solenoid.

The governor 224 and the parts associated therewith operate to prevent a movement of the control levers 82 from their forward positions until the speed of the vehicle has decreased below the critical speed of the governor. When the speed of the vehicle has increased above the critical governor speed, the governor operates to ground the relay winding 326 through the lead 327 to energize the winding and thereby close the relay contacts 325. The relay contacts 325, being in parallel with the contacts 312, operate when closed to energize the solenoid 314. When the control levers 82 are in their forward positions, the shaft 322 is in contact with a side of the slot portion 320, and the energization of the solenoid 314 moves the armature 315 inwardly of the solenoid against action of the springs 323 and moves the shaft 322 to the left in the slot portion 321 as seen in Fig. 18. When the shaft 322 is thus positioned at the end of the slot portion 321, it will be apparent that the levers 82 cannot thereafter be moved out of their forward positions. The governor 224, the solenoid 314 and the parts associated therewith thus act to prevent a conditioning of the transmission for neutral when the speed of the vehicle is above a predetermined value, and any breakage of parts of the transmission which might result from this operation is thus prevented.

The control mechanism for actuating the clutches 49, 53 and 59 and for changing the speed ratio of the transmission will next be described. The principal control for this mechanism is the accelerator 241 for the vehicle which is shown in Fig. 2. The accelerator is pivotally mounted on any suitable supporting member 340 of the vehicle and is connected with an accelerator rod 341 which in turn is connected with the carburetor for the vehicle engine (not shown) as is standard practice. The accelerator 241 is provided with a hollow portion 342 on its upper end which is adapted to receive a toe of the operator in order that the operator may move the accelerator in a clockwise direction as seen in the figure to the limit of its movement as well as in a counterclockwise direction. Any suitable means may be provided for providing the limits for the movement of the accelerator 241, as for example, the pin and slot connection 343 between the movable and stationary parts of the pedal.

A lever 344 is provided which is movable with the accelerator 241, and the lever is connected by a link 345 with one end of a bell crank 346 which is swingably mounted on a plate portion 347 fixed to the transmission housing 140. The bell crank 346 at its other end is connected by a link 348, which is provided with a slot 349, with a lever 350. The lever 350 and the link 348 are connected by a pin 351 (see Fig. 13) which is fixed in the lever 350 and extends through the slot 349. A washer-like member 352 is provided on the pin 351 and is held from movement with respect to the pin by any suitable means such as a cotter pin, and the member 352 functions to hold the link 348 on the pin 351 as is apparent from Fig. 13. The lever 350 is fixed to a shaft 353 which is journaled in the plate portion 347, and the shaft 353 has fixed thereto at its inner end a lever 354 which functions to hold the shaft 353 in its bearing as is apparent. The member 352 has a spring 355 connected therewith, and a lug 356 is provided on the plate portion 347 for anchoring the lower end of the spring.

The accelerator 241 when moved about its pivotal connection causes movement of the link 348 by means of the bell crank 346, the link 345 and the lever 344. When the accelerator 241 is substantially midway between the limits of its movement, the pin 351 is substantially midway between the ends of the slot 349 in the links 348, all as shown in Fig. 2. The lever 350 and the pin 351 are yieldably held in their positions as shown in this figure by the spring 355, as is apparent. When the accelerator 241 is moved downwardly, that is, in a counterclockwise direction (see Fig. 2), as for increasing the supply of fuel to the vehicle engine and increasing the speed of the engine, the lever 344 is moved in the same direction as the accelerator 241, the link 345 is moved downwardly, the bell crank 346 is rotated counterclockwise, and the link 348 is moved to the left. When the accelerator 241 moves near to the lower limit of its movement, the right end of the slot 349 contacts the pin 351, and the continued movement of the accelerator 241 in such direction causes a clockwise movement of the lever 350 against the action of the spring 355. When the accelerator 241 reaches the lower limit of its movement, the lever 350 has been moved a predetermined distance in a clockwise direction.

When the accelerator 241 is moved toward the upper limit of its movement, that is, in a clockwise direction of rotation, the left end of the slot 349 acts similarly against the pin 351 to move the lever 350, such movement, however, being in a counterclockwise direction. When the accelerator 241 has reached the upper limit of its movement, the lever 350 has been moved substantially the same amount in a counterclockwise direction as it was moved in a clockwise direction when the accelerator 241 was moved to its lower limit.

The accelerator 241 and rod 341 are preferably so arranged that the carburetor of the vehicle is actuated between the points in the movement of the accelerator at which the ends of the slot 349 contact the pin 351 and such that any movement from either of these points by the accelerator to either of the limits of its movement, although moving the lever 350, does not affect the carburetor. It will thus be apparent that the accelerator 241 has three ranges of movement, a middle range for actuating the carburetor and two end ranges for moving the lever 350. The spring means provided by standard practice for holding the accelerator at its idling position is preferably provided and functions to hold the accelerator 241 at the point of its movement at which the carburetor is in idling condition and the left end of the slot 349 is in contact with pin 351, with the lever 350 being held vertical by spring 355 as shown in Fig. 2.

The lever 354 is connected to actuate a valve which has been designated generally as 114 in Fig. 25 and which will now be described in more detail, along with the valve 118, particularly with reference to Figs. 6, 12 to 14 and 19 to 23. A valve block 357 is fixed to the plate portion 347, and the block is provided with a cylindrical cavity in which is disposed a sleeve 358 so as to be stationary in the cavity, and the valve block is also provided with another cylindrical cavity in which is disposed a sleeve 359 which is fixed in the latter cavity. The valve block 357 is provided with passages 360, 361, 362, 363 and 364 therein which communicate from the outside of the block with the cavity holding the sleeve 358. The openings 360, 361 and 362 are respectively in communication with conduits 113, 117 and 115, all of which are formed in the plate portion 347.

The conduit 363 is in communication with the conduit 121 formed in the plate portion 347, and it and parts of the sleeve 358 form portions of the conduit 121 as will hereinafter be described. The passage 364 is a bleed passage through which fluid may freely drain.

The valve block 357 is provided with a passage 365 which is in communication with the cylindrical cavity holding the sleeve 359 and with the portion of the conduit 116 provided in the plate portion 347 and connected with clutch 53. A passage 366 is provided in the valve block between the two cylindrical cavities therein and forms a portion of the conduit 116 as will be hereinafter described. Other communication between the two cylindrical cavities in the block is provided by the passages 367, 368 and 369, and these passages form portions of the conduits 121 and 122 as will hereinafter be described.

The valve 114 comprises the sleeve 358, another sleeve 370 which is rotatably disposed inside the sleeve 358, and a shaft 371 rotatably disposed in the sleeve 370. The sleeve 358 is provided with a groove 372 and a pair of openings 373 therein in communication with the groove (see Fig. 23). The sleeve 370 is provided with a groove 374 and a pair of openings 375 therein in communication with the groove. The shaft 371 is provided with a portion of relatively small diameter which extends along the length of the shaft and provides an annular passage 376 inside the sleeve 370 (see Fig. 12). The groove 372 is in communication with the passage 360, and the passage 376 in the sleeve 370 is in communication, for all relative positions of the shaft 371, the sleeve 370 and the sleeve 358, with the groove 372 by means of openings 375, groove 374 and openings 373, and fluid under pressure from the conduit 113 is thereby supplied to the passage 376 for all relative positions of the parts.

The sleeve 358 is provided with a groove 377 which is in communication with the opening 366 in the valve block and is provided with a pair of openings 378 which are in communication with the groove 377 (see Figs. 6 and 12). The sleeve 370 is provided with grooved portions 379 which extend along the length of the sleeve, and the sleeve is also provided with peripherally grooved portions 380 and with a pair of openings 381 therein in communication with the grooved portions 380.

Both of the grooved portions 379 and 380 are adapted to communicate with the openings 378 depending upon the rotative position of sleeve 370, and the openings 381 are always in communication with the passage 376. The sleeve 358 is provided with a peripheral groove 382 which is in communication with the opening 364 (see Fig. 22), and the sleeve is provided with openings 383 in communication with the groove 382. The sleeve 370 is provided with a groove 384 which is in communication with the longitudinal groove 379 on the sleeve and also with the openings 383 in the sleeve 358. Thus, for all relative rotative positions of sleeves 358 and 370, the longitudinal groove 379 is in communication with the bleed opening 364.

The sleeve 358 is provided with a groove 385 which is in communication with the passage 361 (see Fig. 21) and is provided with a pair of openings 386 therein which are in communication with the groove 385. The sleeve 370 is provided with a pair of openings 387 therein which are in the same plane as the openings 386 and are in communication with the passage 376 in sleeve 370, and it will be noted that portions of the slotted grooves 379 in the sleeve 370 are coextensive with the openings 386 along the lengths of the sleeves 358 and 370 such that there may be communication between the openings 386 and grooves 379, depending on the rotative position of sleeve 370.

The sleeve 358 is provided with a groove 388 which is in communication with the passage 362 (see Fig. 13), and the sleeve is provided with a pair of openings 389 therein in communication with the groove 388. The sleeve 370 is provided with a pair of openings 390 which are in the same plane as the groove 388; and it will be noted that the slot-like grooves 379 in the sleeve 370 are coextensive along the length of the sleeves 358 and 370 with the openings 389 whereby the grooves 379 may be in communication with the openings 389 depending on the rotative position of the sleeve 370. The sleeve 358 is provided with a groove 391 which is in communication with the passage 363 and the passage 367 but which has no communication with the sleeve 370 (see Fig. 20).

The valve 113 shown diagrammatically in Fig. 25 comprises the sleeve 359 and a piston 392 slidably disposed in the sleeve. The sleeve 359 adjacent one end thereof is provided with an opening 393 which is in communication with the passage 365 in the valve block (see Fig. 23), and the sleeve is also provided with an opening 394 which is in communication with the opening 366 in the valve block (see Fig. 12). The sleeve 359 adjacent its other end is provided with an opening 395 therein which is in communication with the passage 369. The piston 392 comprises two land portions 396 and 397 formed on a piston rod 398. A collar 399 is disposed in one end of the sleeve 359 about the piston rod 398 and provides a fluid-tight seal about the rod at that end of the sleeve. A member 400 is fixed to the valve block 357 at the other end of the sleeve 359 for limiting movement of the piston 392 toward the right as seen in Fig. 12.

The piston 392 has two principal positions: in one of these positions which may be termed its normal position, the piston is as shown in Fig. 12, contacting the member 400, and in its other position, the piston is moved to the left with its land 397 adjacent the collar 399. In its first position, the land 396 of the piston does not cover the opening 393 in the sleeve 359, and fluid may flow through the sleeve from the opening 394 to the opening 393. In its other position, with the land 397 adjacent the collar 399, the opening 393 is covered by the land 396 and the opening 395 is partially covered by the land 397. With the piston in this position, no fluid can flow between the openings 394 and 393.

The sleeve 370 corresponds with the movable part of the valve 114 as shown in Fig. 25 and has three principal rotative positions. The shaft 371 in general moves with the sleeve 370, and it is only under relatively unusual conditions, hereinafter to be described, that there is relative rotation between the sleeve 370 and shaft 371. The mechanism for causing the sleeve 370 and shaft 371 to move together includes a lever 401 fixed with respect to the shaft 371 and a lever 402 fixed with respect to the sleeve 370. The lever 401 is provided with a stop portion 403 which is adapted to contact the lever 402, as shown in Figs. 7 and 12, for limiting movement of the levers together, and a spring 404 is provided for yieldably holding the stop portion of the lever 401 in contact with the lever 402.

In the first of the three principal positions of the sleeve 370, it is substantially in its position as shown in the figures (see particularly Figs. 6, 12, 13 and 20 to 23). In this and in the rest of the positions of the sleeve 370, as has been hereinbefore described, the passage 376 inside the sleeve 370 is in communication with the conduit 113, and fluid under pressure is thereby supplied to the passage 376. It will be noted from the figures that there are three pairs of openings in the sleeve 370 (exclusive of the openings 375 through which fluid under pressure is supplied to passage 376) which are in communication with the passage 376 and through which the fluid can be applied to the clutches of the transmission; these are the openings 381, 387 and 390. The openings 381 and grooves 380 (see Fig. 6) are not in communication with the openings 378 in this position of sleeve 370, and there is thus no flow of fluid under pressure through the latter openings. However, it will be noted that the openings 378 are rather in communication with the longitudinal grooves 379 in the sleeve 370. The grooves 379 are in communication with the groove 384 (see Fig. 12), and the groove 384 is always in communication with the bleed opening 364 for all positions of the sleeve 370 by means of the opening 383 and the groove 382. When the piston 392 is in its normal position, the openings 378 are in communication with the conduit 116 connected with the clutch 53 by means of passage 366, sleeve openings 394 and 393 and passage 365. Thus any fluid in the conduit 116 may drain through the opening 364 to the transmission sump 88 for disengaging the clutch 53 if it was previously engaged and for maintaining it disengaged.

In the first position of the sleeve 370, the openings 387 of the sleeve are in communication with the openings 386 in the sleeve 358 (see Fig. 21). The openings 386 are in communication with the conduit 117 connected with the clutch 59, and fluid under pressure thus flows through the conduit 117 to engage the clutch. In this position of the sleeve 370, the openings 390 in the sleeve are not in communication with the openings 389 in the sleeve 358 (see Fig. 13), and there is thus no flow of fluid under pressure through the latter openings. The openings 389 are rather in communication with the longitudinal passages 379 in the sleeve 370, and any fluid in the conduit 115 which is in communication with the openings 389 is free to drain through the passages 379 to the transmission sump 88. The conduit 115 is connected with the clutch 49, and the clutch is thereby disengaged if it had been previously engaged, and is maintained disengaged.

In its second principal position, the sleeve 370 is rotated 45 degrees counterclockwise as seen in Figs. 13 and 20 to 23, and 45 degrees clockwise as seen in Fig. 6 from its first principal position. In this position of the sleeve 370, the openings 381 and the grooves 380 are in communication with the openings 378, and, assuming the piston 392 is in its normal position as shown in Fig. 12, fluid under pressure is supplied by means of passage 366 and sleeve openings 394 and 393 to the conduit 116 connected with clutch 53 for engaging the clutch. In this position of the sleeve 370, the openings 387 are out of communication with the openings 386 (see Fig. 21), and fluid under pressure is thereby not supplied to the clutch 59. The openings 386 are rather in communication with the longitudinal passages 379 in the sleeve 370, and any fluid in the conduit 117 is drained out of the conduit by means of the passages 379. The clutch 59 is thereby disengaged if it had been previously engaged, and the clutch is maintained disengaged. In this position of the sleeve 370, the openings 390 in the sleeve 370 are out of communication with the openings 389, and the longitudinal grooves 379 of the sleeve 370 are in communication with the openings 389. The conduit 115 is drained through the passages 379, and the clutch 49 is disengaged if it had been previously engaged and is maintained disengaged.

In the third principal position of the sleeve 370, the sleeve is rotated 45 degrees counterclockwise as seen in Figs. 13 and 20 to 23 and 45 degrees clockwise as seen in Fig. 6 from its second position or 90 degrees in such directions from its first position. In this position of the sleeve 370, the openings 381 and the grooves 380 are in communication with the openings 378, and, assuming the piston 392 is in its normal position, fluid under pressure is supplied to the conduit 116 connected with the clutch 53 by means of passage 366 and the openings 394 and 393 for engaging the clutch and maintaining it engaged. In this position of the sleeve 370, the openings 387 are out of communication with the openings 386, and no fluid under pressure is thereby supplied to the conduit 117 leading to the clutch 59. The openings 386 are rather in communication with the longitudinal grooves 379 in the sleeve 370, and the conduit 117 is thereby drained for maintaining the clutch 59 disengaged. In this position of the sleeve 370, the openings 390 in the sleeve 370 are in communication with the openings 389, and fluid under pressure is supplied through the latter openings to the conduit 115 connected with the clutch 49 for engaging the clutch and maintaining it engaged.

It will be apparent that the sleeve 370 in its first principal position supplies fluid under pressure to the conduit 117 for engaging the clutch 59, and the sleeve bleeds the conduit 116 through the valve 118 for maintaining the clutch 53 disengaged and also bleeds the conduit 115 for maintaining the clutch 49 disengaged. The transmission is thus set for low speed forward drive. The sleeve 370 in its second position bleeds the conduit 117 for disengaging the clutch 59 and bleeds the conduit 115 for maintaining disengaged the clutch 49, and the sleeve supplies fluid under pressure to the conduit 116 and through the valve 118 to the clutch 53 for engaging the clutch. The transmission is thus set for its ordinary intermediate speed forward. The sleeve 370 in its third principal position bleeds the conduit 117 for maintaining disengaged the clutch 59, and it supplies fluid under pressure through the conduit 116 and the valve 118 to the clutch 53 for maintaining the clutch 53 engaged, and it also supplies fluid under pressure through the conduit 115 to the clutch 49 for engaging the latter clutch. The transmission is thus set for its high speed forward drive.

The piston 392, when moved out of its normal position, acts in cooperation with the valve 114 to change the manner in which the latter valve actuates the clutches 59, 53 and 49, whereby the transmission may be set for its auxiliary intermediate speed. If the piston 392 is moved to its second principal position with its land 396 blocking the opening 393, the clutch 53 cannot be engaged since the conduit 116 is blocked. With the piston 392 in this position, movement of the sleeve 370 from its first principal position to its second principal position does not change the speed ratio of the transmission and has no effect on the transmission except that the clutch 59 is disengaged and the drive is entirely through the free-wheeling clutch 56 instead of both the clutch 56 and the clutch 59. When the sleeve 370 is moved to its third principal position with the piston 392 still in its second principal position, the clutch 49 is engaged and the transmission is set for its auxiliary intermediate speed with the drive being through the gear train with the torque converter 44 locked up.

Ratchet means under the control of the lever 354 is provided whereby the lever may be moved successively in one direction to move the valve 114 from its first principal position to its second principal position and then to its third principal position and whereby the lever may be moved successively in an opposite direction to move the valve successively from its third position to its second position and then to its first position. Such ratchet means also permits movement of the lever 354 in one direction to move the valve 114 from its first position to its second position and then movement of the lever 354 in the opposite direction to move the valve from its second position to its first position.

The ratchet means for actuating the valve 114 comprises the member 124 rotatively disposed on the shaft 371 and pivotally connected with a link 405 which in turn is connected by a ball and socket joint 406 with the lever 354. A pair of pawls 407 and 408 and which form the pawl means 125 shown in Fig. 25 are swingably mounted on the member 124 by means of pins 409, and the shaft 371 has formed thereon the ratchet wheel 126 provided with teeth 410, 411, 412 and 413 with which the pawls 407 and 408 are adapted to cooperate. A leaf spring 414 is provided on the member 124 and is so arranged as to press the free ends of the pawls 407 and 408 toward the teeth on the ratchet wheel 126. A cap 415 is provided over the pawls and ratchet wheel, and the cap is held in position by means of a screw 416 disposed in the right end of the shaft 371. The screw 416 is so arranged with respect to the cap that there may be relative rotation between the screw and the cap and thereby between the shaft 371 and the cap, and the cap is provided with a lug portion 417 which enters an appropriate slot in the valve block 357 for holding the cap stationary regardless of movement of the shaft 371. The cap 415 has fixed thereon a plate portion 418, the ends of which are formed so as to provide cams 419 and 420. The pawls 408 and 407 are provided with pins 421 and 422 respectively, in their free ends which are adapted to cooperate with the cams 419 and 420 respectively, when the member 124 is swung in one direction or the other, to lift the pawls away from the teeth on the ratchet wheel 126.

The ratchet mechanism including the member 124 and lever 354 is shown in its neutral condition in Fig. 14. The sleeve 370 is shown in its first principal position in Figs. 12 and 14, and since the ratchet wheel 126 is connected to move with the sleeve 370, by means of the shaft 371, the levers 401 and 402, the stop portion 403 and the spring 404, the ratchet wheel is shown in Fig. 14 in a position corresponding to the first principal position of the sleeve 370. The sleeve 370 may be shifted from its first to its second position by moving the lever 354 downwardly from its neutral position to rotate the member 124 in a counterclockwise direction as seen in Fig. 14. On this movement of the member 124, the pawl 407 acts on the tooth 412 to rotate the shaft 371 and also the sleeve 370 due to the action of spring 404, all through 45 degrees to bring the tooth 413 on the vertical center line of the shaft 371 and to move the sleeve to its second principal position.

In order to move the valve sleeve 370 to its third position from its second position by means of the lever 354, the lever is returned to its neutral position thereby bringing the member 124 to its neutral position, and the lever is then again moved downwardly to move the member 124 counterclockwise as seen in Fig. 14. On such movement of the latter member, the pawl 407 engages with tooth 413, which is on the vertical center line of the shaft 371 when the sleeve 370 is in its second position, and moves the shaft 371 and sleeve 370, 45 degrees in a counterclockwise direction as seen in Fig. 14 to bring the sleeve 370 to its third position. On such downward movement of the member 124, the pin 421 of the pawl 408 contacts the cam 419 to raise the pawl out of position for engaging any of the teeth on the ratchet wheel 126, and thus when the lever 354 and member 124 are moved back to their neutral positions, the pawl 408 does not engage the tooth 410, which in the third position of the sleeve 370 is in a position 90 degrees counterclockwise from its position as shown in Fig. 14, to return the sleeve 370 to its second position.

In order to return the sleeve 370 to its second position from its third position by means of the lever 354, the lever is moved upwardly from its neutral position to move the member 124 clockwise as seen in Fig. 14 from its neutral position. On such movement of the member 124, the pawl 408 engages the tooth 411, which in the third position of the sleeve 370 is on the vertical center line of the shaft 371, and rotates the sleeve 370, through the shaft 371, the stop portion 403 on lever 401, and lever 402 in contact with the portion 403, for 45 degrees in a clockwise direction as seen in Fig. 14, to move the sleeve back to its second position.

In order to return the sleeve 370 to its first position from its second position, the lever 354 and member 124 are returned to their neutral positions, and then again the lever 354 is moved upwardly from its neutral position to move the member 124 in a clockwise direction as seen in Fig. 14. On such movement of the member 124, the pawl 408 engages the tooth 410, which in the second position of the sleeve 370 is on the vertical center line of the shaft 371, and rotates the sleeve 370, 45 degrees in a clockwise direction as seen in Fig. 14, whereby the sleeve is brought back to its first position. On such movement of the member 124, the pin 422 contacts the cam 420, and the pawl 407 is moved thereby out of position for engaging the teeth on the ratchet wheel 126. The pawl 407, therefore, does not engage the tooth 413, when the member 124 is returned to neutral position, to rotate the ratchet wheel and sleeve 370.

It will be apparent that the sleeve 370 may be moved from its first position to its second position and returned to its first position without being shifted to its third position. This may be done by moving the lever 354 and member 124 from their neutral positions down to the limit of the movement of the member 124 as seen in Fig. 14 and then returning the lever and member to their neutral positions and thereafter moving the lever 354 and member 124 upwardly as seen in Fig. 14 to the limit of the movement of member 124. On the downward movement of the member 124 from its neutral position the pawl 407 engages the tooth 412 to move the sleeve 370 to its second position, and on the subsequent upward movement of the member 124 from its neutral position the pawl 408 engages the tooth 410 to move the sleeve 370 back to its first position.

The linkage between the lever 354 and the accelerator 241, which has been previously described, is utilized for shifting the valve 114. The spring 355 operates to hold the lever 350 yieldingly in a vertical position, and, as the lever 354 and member 124 are in their neutral positions when the lever 350 is in a vertical position, the spring 355 thereby functions to hold the lever 354 and the member 124 yieldingly in their neutral positions. The accelerator 241 on being moved to the upper limit of its movement moves the lever 350 in a counterclockwise direction as seen in Fig. 2, and the lever 354 and member 124 on such movement are moved correspondingly, with the member 124 being moved to the limit of its movement in a counterclockwise direction as seen in Fig. 14. The accelerator 241 on being moved to the lower limit of its movement operates to move the lever 350 in a clockwise direction as seen in Fig. 2, and the lever 354 and valve member 124 on such movement are correspondingly moved to move the latter member to the limit of its movement in a clockwise direction as seen in Fig. 14.

It will be apparent that, in order to move the sleeve 370 from its first position to its second position, it is only necessary to move the accelerator 241 to the upper limit of its movement from an intermediate position thereof, and, in order to thereafter shift the sleeve 370 from its second position to its third position, it is only necessary to again move the accelerator 241 from an intermediate position to the upper limit of its movement. It will also be apparent that, in order to successively move the sleeve 370 from its third position to its second position and then to its first position, the accelerator 241 may simply be moved successively from an intermediate position thereof to the lower limit of its movement. In order to move the sleeve 370 from its first position to its second position and then back to its first position, it is only necessary to move the accelerator 241 from an intermediate position thereof first to the upper limit of its movement and then to the lower limit of its movement.

Since the valve 114 operates to engage and disengage the clutches 53, 49 and 59 for changing the speed ratio through the transmission, as has been previously described, it will be apparent that the speed ratio through the transmission may be controlled by means of the accelerator 241. In order to increase the speed ratio of the transmission, that is, to increase the speed in which the shaft 41 is driven with respect to the speed of the shaft 40, the accelerator 241 is simply moved to the upper limit of its movement from an intermediate position thereof, and this may be done twice in succession for successive increases in speed ratio. In order to decrease the speed ratio through the transmission, the accelerator 241 is simply moved from an intermediate position thereof to the lower limit of its movement, and this may be done twice in succession to downshift from the third speed ratio.

The valve 118 is adapted to be manually controlled by means of the control lever 240. The valve piston 392 has a pin and slot connection with a lever 423 (see Fig. 12) which is fixed on a shaft 424 at one end thereof. The shaft 424 is journaled in the plate portion 347, and it has the lever 240 fixed thereto at its other end. In order to move the valve piston 392 between its two positions, it is only necessary to move the lever 240 through a small arc.

Interlocking means is provided between the levers 423 and 354 which comprises a bean-like member 425 slidably disposed in an inwardly extending lug 426 integral with the plate portion 347. The lever 423 is provided with notches 427 corresponding with the two principal positions of the valve piston 392, and the lever 354 is provided with two notches 428 which correspond with the neutral and the upshifting positions of the lever 354. The member 425 cooperates with the notches 427 and 428 so as to prevent a shifting of the valve piston 392 from one of its principal positions to the other when the lever 354 is in any other except its neutral or upshifting positions or is being moved to shift the sleeve 370 between any of its principal positions. It is, of course, undesirable to allow the valve 118 to be shifted when the sleeve 370 is being shifted, since this might result in only a partial engagement of the clutch 53 if the valve 118 is shifted to close the conduit 116 when the conduit 116 is being either filled or drained by the valve 114, and the interlocking means functions to prevent such undesirable shifting of the valve 118.

Means are provided for interconnecting the governor 224 (see Figs. 6 and 24) and the valves 118 and 114, whereby the valves are actuated at the critical speed of the governor. As has been hereinbefore described, the governor 224 functions above its critical speed to complete the electric lead 327 for energizing the relay winding 326, and the governor below its critical speed functions to open the lead 327 to deenergize the winding 326. The relay 306 is provided with contacts 429 adapted to be opened by energization of winding 326 and which function when closed to connect electric lead 307 with an electric lead 430. The lead 430 is connected with a solenoid 431 which is grounded at 432 and which is provided with a movable armature 433 (see Figs. 7 and 15). The solenoid 431 is disposed on a plate portion 434 fixed to housing 140, and the armature 433 is connected with a valve piston 435 which forms the movable part of the valve 120 shown in Fig. 25. The piston is slidably disposed in a sleeve 436 which is fixed in a cylindrical cavity of a valve block 437 with the valve block being fixed to the plate portion 434. The sleeve 436 is provided with openings 438, 439 and 440 therein. The opening 438 is in communication with the conduit 119 which carries fluid under pressure from conduit 103 and which is formed in the valve block 437. The opening 439 is in communication with the conduit 121 which is formed in the valve block 437, and the opening 440 is in communication with an opening in the block 437 and forms with the latter opening a bleed passage through which fluid may drain into the transmission sump 88. The valve piston 435 is provided with lands 441, 442 and 443, and a spring 444 is provided for yieldingly holding the piston 435 at its position shown in Fig. 7 with the armature 433 at the limit of its movement out of the solenoid 431.

The valve piston 435 has two principal positions, in one of which it is shown in Fig. 7. The valve piston in this position connects openings 439 and 440 by means of the groove between lands 442 and 443, and any fluid in the conduit 121 may drain through these openings into the transmission sump. In this position of the piston 435, the land 442 blocks the opening 438 for the conduit 119 out of communication with any of the other openings in the sleeve 436. The solenoid 431 may be energized to draw the piston 435 against the action of the spring 444 to its second principal position. The piston in this position connects openings 438 and 439 by means of its groove between the lands 441 and 442, and the latter land blocks the bleed opening 440.

When the vehicle is travelling below the critical governor speed, the governor 224 maintains the lead 327 open, and the contacts 429 are closed whereby the solenoid 431 is energized. The solenoid when energized holds the valve piston 435 in its second principal position to connect the conduits 119 and 121, and fluid under pressure is thereby supplied to conduit 121. When the speed of the vehicle is above the critical governor speed, the governor completes the lead 327 whereby the winding 326 is energized and the relay contacts 429 are opened. The solenoid 431 is thereby deenergized, and the spring 444 functions to move the valve piston 435 back into its first principal position as shown in Fig. 7. In this position of the piston, the conduits 121 and 119 are disconnected, and the conduit 121 is drained through the bleed opening 440 in the sleeve 436.

The conduit 121 from valve 120 is formed in the housing 140 and plate portion 347 to connect with the opening 363 in the valve block 357, as has been previously described (see Fig. 20). The opening 363 is connected by means of the groove 391 and passages 367, 368 and 369 (see Fig. 13) with opening 395 in the sleeve 359, and the groove and passages form part of the conduit 121, as shown in Fig. 25. When fluid under pressure is supplied from valve 120 through the opening 395 to the left end of piston 392, when the piston is in its second principal position, the fluid pressure functions to move the piston to the right as seen in Fig. 12 to its first principal position as shown in the figure.

The piston block 357 is provided with a portion 445 (see Fig. 7) provided with a portion 445 (see Fig. 7) provided with a cylindrical cavity 446 therein, and the block 357 is also provided with a passage 447 (see Fig. 13) which is in communication with the lower end of the cavity and with the passage 368 and forms a portion of the conduit 122 shown in Fig. 25. An end member 448 is provided for the cavity 446, and a piston 449 is provided in the cavity and is formed with a stem 450 extending through the portion 445. The lever 402 is provided with a plate-like portion 451, which, when the sleeve 370 is in its third principal position, is adjacent the end of the piston stem 450. The stem 450 is adapted to move the lever 402 and the sleeve 370 to the second position of the latter from its third position as will be hereinafter described. The parts 445 to 450 form the piston means 123 as shown in Fig. 25, as is apparent.

Since the passage 447 is in communication with the passage 368 which is connected with the conduit 121 in the plate portion 347 by means of the passage 367, the groove 391 and the passage 363, when the governor controlled valve 120 is conditioned to supply fluid under pressure to conduit 121, as when the speed of the vehicle has decreased below the critical governor speed, fluid under pressure is applied behind the piston 449 to move the piston upwardly in the cylindrical cavity 446. If the sleeve 370 has previously been shifted to its third position, and assuming that the lever 354 and valve member 124 are in their neutral positions, as when neither an upshift nor a downshift is being made with the accelerator, the piston stem 450 on such upward movement of the piston 449 contacts the plate portion 451 and moves the sleeve 370 into its second principal position. Since the tooth 413 on the ratchet wheel 126, when the sleeve 370 is in its third position, is rotated from its position as shown in Fig. 14 through 90 degrees in a counterclockwise direction, there is no tooth on the ratchet wheel in contact or adjacent the engaging end of the pawl 407 which could engage with the pawl 407 to prevent rotation of the ratchet wheel 126, and the ratchet wheel 126 and shaft 371 rotate with the sleeve 370 with the tooth 410 riding under pawl 408.

The spring 404 is provided between the levers 401 and 402 for absorbing the force transmitted by the lever 354 if the accelerator is moved to the uppermost limit of its movement, as for making an upshift, when the piston 449 is operative. In such case the ratchet wheel 126 and shaft 371 are rotated to their positions in which they would ordinarily be with the sleeve 370 in its third position and with the stop portion 403 in contact with lever 402; however, the piston 449 holds the sleeve 370 in its second position and the stop portion 403 is out of contact with lever 402 and the spring 404 is fixed. When the accelerator is thereafter moved downward from its upshifting position at the uppermost limit of its movement, the shaft 371 moves back to its position corresponding with the second position of the sleeve 370 with the stop portion 403 in contact with lever 402, due to the action of the spring 404, and the spring 355 functions to move the lever 354 to its neutral position.

The governor operated valve 120 is connected by means of the conduit 121 including the passages 367, 368 and 369 with the valve 118 as has been described, and this connection functions when the speed of the vehicle has decreased below the critical governor speed and if the piston has previously been moved to its second principal position to close the opening 393 in the sleeve 359, to move the piston back to its first principal position as shown in Fig. 12 by admitting fluid under pressure into the sleeve 359 at the left of the land 397 as seen in the figure. The valve 120 and conduit 121 thus function with respect to the valve 118 on such decrease in vehicle speed to actuate the valve to open the conduit 116 to the clutch 53.

The valve 120 thus operates, with respect to the transmission as a whole, if the transmission has previously been shifted to its auxiliary intermediate speed by actuation of both the valves 114 and 118, to shift the transmission to its ordinary intermediate speed with clutch 53 engaged and clutch 49 disengaged when the speed of the vehicle has decreased below the critical governor speed. If the valve 118 has not been actuated to shift the transmission to its auxiliary intermediate speed but the transmission has been shifted to its third speed, the valve 120 operates to shift the transmission back to its ordinary intermediate speed. The valve 120 operates in either case, by means of the piston means 123, when the speed of the vehicle has decreased below the critical governor speed, to disengage clutch 49 and unlock the torque converter 44. Due to this action of the valve 120, it is practically impossible to stall the engine of the vehicle with the transmission being conditioned for forward drive, even though the vehicle is entirely stopped due to the action of the brakes of the vehicle or any other means, since under these conditions the torque converter 44 will slip.

Poppet means is preferably provided for yieldingly holding the valve sleeve 370 in each of its three principal positions. This poppet means comprises a notch 452 in the sleeve 370 for each of the three positions, a plunger 453 slidably disposed in a portion of the valve block 357 having a cylindrical cavity therein and a spring 454 for yieldingly pressing the plunger into the notches 452 (see Fig. 19).

Interconnecting means between the control levers 82 and the valve 114 is provided whereby the valve sleeve 370 is shifted from its second principal position to its first position when the control levers 82 are moved to condition the transmission for reverse drive if, of course, the sleeve 370 is in its second position prior to such movement of the control levers 82. Such interconnecting means comprises a lever 455 rotatably mounted on the plate portion 347 and connected at one end thereof by a link 456 with the lever 350. The lever 455 and the control lever 82 on the left side of the transmission (see Fig. 2) are connected by means of a link 457, with the connection between the latter link and the lever 455 comprising a slot 458 in the link and a pin 459 in the lever 455.

As has been hereinbefore explained, if the valve sleeve 370 has been shifted to its third position for engaging clutch 49, the piston means 123 functions to move the sleeve 370 back to its second position with corresponding movement of the ratchet wheel 126 when the speed of the vehicle has decreased below the critical governor speed. Thus, when the vehicle is stopped and the control levers 82 are shifted to their neutral positions, the valve sleeve 370 is in a position no higher than its second position. When the control levers 82 are shifted clockwise as seen in Fig. 2, the clutch sleeve 65 is moved to engage teeth 204 and 64 for conditioning the transmission for reverse drive, as has been hereinbefore explained, and the end of the slot 458 cooperates with the pin 459 on the lever 455 to move the lever in a counterclockwise direction as seen in Fig. 2. Such movement of the lever 455, by means of the link 456, causes movement of the lever 350 in a clockwise direction, as is apparent. This movement of the lever 350 operates to move the valve member 124, by the linkage connecting the lever 350 and member 124, in a clockwise direction as seen in Fig. 14 and by means of the pawl 408 cooperating with the tooth 410, which in the second position of the sleeve 370 is rotated to a position 45 degrees from that shown in Fig. 14 to be on the vertical center line of the sleeve, to move the ratchet wheel 126 and thereby the sleeve 370, 45 degrees in a clockwise direction to the first position of the sleeve 370. Such movement of the sleeve 370 to its first position operates to disengage the clutch 53 as has been described. Breakage of parts of the transmission would very probably result if the clutch teeth 204 and 64 were engaged to complete the reverse gear train at the same time that the clutch 53 is engaged, with the clutch 53 always functioning to directly connect the shafts 42 and 41 to drive the latter in a forward direction, and the means interconnecting the control levers 82 and lever 350, including the links 456 and 457 and lever 455, functions to disengage the clutch 53 when the gear train for driving the output shaft 41 in a reverse direction is being completed for preventing such damage to the transmission. When the transmission is conditioned for forward drive by a counterclockwise movement of the control levers 82 as seen in Fig. 2, the link 457 is moved such that the pin 459, with the levers 350 and 455 being in their positions as shown in Fig. 2, is substantially midway between the ends of the slot 458, and the link thus does not interfere with the operation of the lever 350 by the accelerator 241 for upshifting or downshifting the transmission.

The fluid pressure relief valves 93, 97 and 104 for cooperating with the pumps 84 and 85 to provide fluid pressures of appropriate values for engaging the fluid pressure operated clutches, for lubricating moving parts on the transmission shafts, and for maintaining the torque converter 44 operative will now be described in greater detail. The high pressure relief valve 104 comprises cylindrical cavities 460 and 461 in the transmission housing 140 (see Fig. 7). The high pressure conduits 103 and 113 are in communication with the cavity 461 as is shown in Fig. 11, and the conduit 106 is in communication with the cavity 460. A valve piston 462 is provided for closing the open end of the cavity 461, and a spring 463 is provided in the cavity 460 between the valve piston 462 and a pair of caps 464 and 465 which caps function to close the cavity 460. The valve piston 462 functions to open the cavity 461 and connect the cavities 460 and 461 against the action of the spring 463 when the fluid pressure in the cavity 461 exceeds a predetermined value, and the valve 104 thus functions to maintain the fluid pressure in the cavity 461 and conduits 103 and 113 associated therewith at this predetermined value. In a particular embodiment of the transmission and control mechanism, the valve 104 operated to maintain the fluid pressure in the conduits 103 and 113 at substantially 400 pounds per square inch, which was an appropriate fluid pressure for operating the clutches.

The low pressure relief valve 93 comprises a cylindrical cavity 466 in the transmission housing 140 having therein a slidable piston 467 (see Fig. 8). The cavity 466 is connected with the conduit 92, and the piston 467 when at the limit of its upward movement as shown in Fig. 8, functions to close the conduit 92 with respect to the cavity 466. A pair of springs 468 and 469 are provided between a cap 470 in the cavity 466 and the piston 467 for yieldingly maintaining the piston in position to close the cavity. The cavity 466 is provided with an opening 471 in its side which is in communication with the conduit 94 as shown. The piston 467 functions to maintain the pressure in the conduit 92 at an appropriate value for maintaining the torque converter 44 operative by moving downwardly in the cavity 466 upon the fluid pressure in the conduit 92 becoming greater than that value and making a connection between the conduit 92 and the conduit 94 for allowing some of the fluid in the conduit 92 to flow into the conduit 94. In a certain embodiment of the transmission, the valve 93 operated to provide a pressure of approximately 30 pounds per square inch in the conduit 92 which was sufficient for maintaining the converter 44 operative.

The relief valve 97 is quite similar to the valve 93 with the exception that a single spring 472 which exerts less force than the two springs 469 and 468 is provided. The valve 97 comprises a cylindrical cavity 473 in the transmission housing 140 which is connected with conduits 94, 95 and 96. A piston 474 is slidably disposed in the cavity, and the piston at the lower limit of its movement closes these conduits with respect to the cavity 473 as shown in Fig. 8. The spring 472 is provided between the plunger 474 and a cap 475 in the cavity 473. The cavity 473 is provided in its side with an opening 476 which drains any fluid passing therethrough into the sump 88 of the transmission. The piston 474 functions to maintain a predetermined fluid pressure in the conduits 94, 95 and 96 by moving upwardly in the cavity against the action of the spring 472 when the fluid pressure in these conduits has reached the predetermined value and connecting the conduit 94 and opening 476. In a certain embodiment of my transmission, the valve 97 operated to maintain the fluid pressure in the conduits 94, 95 and 96 at approximately 10 pounds per square inch which was an appropriate pressure for lubricating the movable parts on the shafts of the transmission.

*Operation*

The operation of the transmission and control mechanism therefor is believed to be clear from the foregoing description of the parts of the transmission and control mechanism and the operation of the individual parts; however, a brief résumé of the operation of the transmission as a whole will be here given.

When the control levers 82 are in their neutral positions as shown in Figs. 2 and 3, there is no connection through the transmission since the clutches 49 and 45 are disengaged and the clutch sleeve 65 is disengaged from both of the gears 60 and 61. When it is desired to condition the transmission for forward drive, the control levers 82 are moved in a counterclockwise direction as seen in Fig. 2 whereby to engage the clutch sleeve 65 with the gear 60, and such engagement is facilitated by the brake 54 which stops rotation of the shaft 42 and thereby the gear 60 when the engine of the vehicle is idling. Upon such engagement of the clutch sleeve 65, a depression of the accelerator 241 in its carburetor-controlling range accelerates the motor, and power is transmitted through the first speed train of the transmission. When it is desired to increase the ratio, the accelerator 241 is moved upwardly to the limit of its movement to actuate the valve 114, and the transmission is thereby shifted to second speed ratio; and when it is desired to increase the speed ratio to third speed ratio, the accelerator 241 is again moved to the upper limit of its movement to actuate the valve 114, and this shift is made.

In order to decrease the speed ratio of the transmission from third speed ratio, the accelerator 241 is moved downwardly to the lower limit of its movement to actuate the valve 114, and the transmission is shifted to second speed ratio. To further decrease the speed ratio of the transmission to first speed ratio, the accelerator 241 is again moved to the lower limit of its movement to actuate the valve 114, and such downshift is accomplished.

If it is desired to obtain the auxiliary intermediate speed ratio with the torque converter 44 locked up and with the drive being through the gear train including the gears 52, 55, 57 and 60, the valve 118 is manually actuated to close the conduit 116, and the accelerator 241 is then moved twice successively to its upper limit of its movement to actuate the valve 114, and such speed ratio is obtained.

With the drive being in the auxiliary intermediate speed ratio, if the speed of the vehicle decreases below the critical governor speed, the governor operates to actuate the valve 114 to its second position and to actuate the valve 118 to open the conduit 116, and the transmission is thus automatically shifted to its ordinary second speed. If the transmission has been shifted from its first to its second and then to its third speed ratio without any actuation of the valve 118 to close the conduit 116, the governor acts similarly to actuate the valve 114 on the vehicle decreasing below the critical governor speed to shift the transmission back to its second speed ratio. The governor also has an added function of preventing a movement of the control levers 82 out of their forward positions until the speed of the vehicle has decreased below the critical governor speed.

The transmission may be shifted to drive in reverse by moving the control levers 82 clockwise as seen in Fig. 2. Such movement of these levers connects the clutch sleeve 65 with the gear 61 to complete a gear train for driving in reverse and also engages the engine clutch 45. The brake 54 operates to stop any movement of the shaft 42 when the control levers 82 are in neutral to facilitate shifting. Such movement of the control levers 82 also operates to move the valve 114 to first position whereby there can be no engagement of the clutch 53 when the shaft 41 is being driven in reverse.

*Description of modified ratio-changing control mechanism*

A description will now be given of a modified ratio-changing control mechanism for my improved transmission and which is illustrated in Figs. 26 to 32. This modified control mechanism is adapted to be substituted for the valve 114, the valve 118, and the piston mechanism 123, which are mounted on the plate portion 347. The modified control mechanism comprises a plate portion 347a which has substantially the same outline as the plate portion 347 and is adapted to be fixed to the transmission housing 140 in substantially the same manner as the plate portion 347. The modified control mechanism, like the control mechanism shown with the transmission, is adapted to be controlled by control levers 82, this being accomplished by means of a link 457a adapted to be connected with the control lever 82 on the left side of the transmission shown in Fig. 2, and the control mechanism is also adapted to be controlled by an accelerator, with the link 345a, lever 488 and link 489 being connected with the accelerator 241a. The link 345a corresponds with the link 345 and the accelerator 241a corresponds with the accelerator 241; however, the connections between the parts 345a and 241a are such that the link 345a is moved downward when the vehicle accelerator is moved to the limit of its upward movement instead of upward as in the case of the link 345.

The modified control mechanism comprises a valve block 490 having a pair of cylindrical cavities therein in one of which is fixed a sleeve 491 and in the other of which is fixed a sleeve 492. The sleeve 491 is provided with grooves 493, 494, 495 and 496 and openings 497, 498, 499 and 500 in communication with the grooves 493, 494, 495 and 496 respectively, and the sleeve is also provided with an opening 501. The sleeve 492 is provided with grooves 502, 503, and 504 and with openings 505, 506 and 507 in communication with the grooves 502, 503 and 504 respectively, and the sleeve is also provided with an opening 508.

The valve block 490 is provided with a passage 509 which is in communication with the groove 503 in the sleeve 492 and with the conduit 115, part of which is formed in the plate portion 347a (see Fig. 32). The valve block is also provided with a passage 510 which is in communication with the groove 493 in the sleeve 491 and also with the conduit 117, part of which is formed in the plate portion 347a. The valve block is provided with another passage 511 which is in communication with the groove 495 in the sleeve 491 and also with the conduit 116, part of which is formed in the plate portion 357a. Another passage 512 in the valve block is in communication with a passage 513 in the valve block and with the conduit 113, a part of which is in the plate portion 347a. The conduit 513 is in communication with the groove 504 in the sleeve 492 and also in communication with the groove 494 in the sleeve 491. The valve block 490 is also provided with another passage 514 which connects the groove 502 in the sleeve 492 with the groove 496 in the sleeve 491. Another passage 515 in the valve block is in communication with the opening 501 in the sleeve 491, and an opening 516 in the block is in communication with the opening 508 in the sleeve 492.

A valve piston 517 having lands 518 and 519 is slidably disposed in the sleeve 491, and a valve piston 520 having lands 521 and 522 is slidably disposed in the sleeve 492. A washer 523 is fixed in the sleeve 492 and fits in fluid-tight relation about the valve piston 520.

The valve piston 520 has two principal positions. In the first of these positions, in which it is shown in Fig. 29, the valve 520 functions to bleed the conduit 115 for maintaining the clutch 49 disengaged, and this is done by means of the passage 509, the groove 503, and the openings 506, 508 and 516. In the second of its principal positions, the valve 520 is moved to the left as shown in Fig. 29 for connecting the openings 507 and 506 in the sleeve 492. In this position, the valve 520 functions to supply fluid under pressure to the conduit 115 for engaging the lock-up clutch 49, and this is done by means of the passage 512 connected with the conduit 113 carrying fluid under pressure, passage 513, groove 504, openings 507, openings 506, groove 503 and passage 509.

The valve piston 517 has three principal positions. In the first of these in which it is shown in Fig. 29, the openings 497 and 498 are connected between the lands 518 and 519. The valve functions in this position to supply fluid under pressure to the conduit 117 for engaging the clutch 59, and this is accomplished by means of the passages 512 and 513, the groove 494, the openings 498 and 497, the groove 493, and the passage 510. In this position, also, the valve 517 functions to bleed the conduit 116 connected with the clutch 53 for maintaining the clutch disengaged. This is accomplished by means of passage 511, groove 495, openings 499, opening 501 and the bleed passage 515. The valve in this position also functions to bleed the passage 514 by means of the groove 496, openings 500 and 501 and passage 515.

The valve 517 in its second principal position is moved to the left as seen in Fig. 29, to connect the openings 498 and 499 between the lands 518 and 519. In this position, the valve 517 functions to supply fluid under pressure to the conduit 116 for engaging clutch 53, and this is done by means of the passages 512 and 513, the groove 494, the openings 498 and 499, the groove 495 and the passage 511. In this position also the valve 517 functions to bleed the conduit 117 for maintaining the clutch 59 disengaged since when the valve is in its second position, fluid is free to drain from the groove 493 and openings 497 out the open end of the sleeve 491. The valve 517 in second position functions to bleed the passage 514, by means of groove 496, openings 500 and 501 and passage 515.

In its third position, the valve 517 is moved to the left as seen in Fig. 29 from its second position, for connecting between the lands 519 and 518, the openings 498, 499 and 500. The valve 517 in this position, as in its second position, applies fluid under pressure to the conduit 116 for engaging the clutch 53 and also permits the conduit 117 to bleed through the openings 497. In its third position, the valve 517 also functions to apply fluid under pressure to valve 520 between the land 521 and the fluid-tight washer 523 in the sleeve 492, and this is done by means of passages 512 and 513, groove 494, openings 498, openings 500, groove 496, passage 514, groove 502 and openings 505. The valve piston 520 on such application of pressure moves from its first position as shown in Fig. 29 to its second position for connecting the openings 507 and 506, and such connection of the openings 507 and 506, as has been hereinbefore described, operates to supply fluid under pressure to the conduit 115 for engaging the lock-up clutch 49.

When the valve 517 is returned from its third to its second position, the space between the land 521 and the washer 523 in the sleeve 492 is drained by means of openings 505, groove 502, passage 514, groove 496, openings 500 and 501, and passage 515. The valve 520 is thereupon moved back to its first position for disengaging the lock-up clutch 49 by spring means hereinafter to be described.

The conduit 121 connected with the valve 120 is connected for controlling both the valves 517 and 520. Such connection with the valves is by means of a passage 524 which is connected with the conduit 121 and which is in communication with a passage 525 formed by an end 526 for the piston block 490. The passage 525 is in communication with the land 522 of the valve 520, and the arrangement is such that when fluid under pressure is present in passage 525, with the valve 520 being in its second position the fluid functions to force the valve from its second position to its first position. A plunger 527 is provided in the sleeve 491 and is in communication with the passage 525. The plunger 527, when fluid pressure is applied thereto, functions, if the valve 517 has previously been moved to its third position, to move the valve back to its second position. As has been previously described, the governor-controlled valve 120 functions to admit fluid under pressure into the conduit 121 when the speed of the vehicle has decreased below a predetermined value, and the valves 517 and 520 are thus so arranged that, when the vehicle speed has decreased below the critical governor speed, the valve 520 is moved to disengage the lock-up clutch 49 and the valve 517 is moved so that the passage 514 and the space between the land 521 and the washer 523 is drained. It will be apparent that the governor operates with valve 520 to disengage the lock-up clutch 49 below the critical governor speed of the vehicle whether the lockup valve 520 has been shifted to its lock-up position by means of the valve 517, or has been shifted by other means to its lock-up position without movement of the valve 517 out of its first two positions.

The valve 517 is under the control of the accelerator 241a of the vehicle. The means interconnecting the valve 517 and the accelerator may comprise a cam 528 swingably mounted on the plate portion 347a and connected with a link 345a. The link 345a is connected with a lever 488, and the lever is connected by a link 489 with the accelerator 241a. The arrangement is such that when the accelerator 241a is depressed, as for increasing the speed of the vehicle engine, the link 345a is raised to rotate the cam 528 in a clockwise direction. The direction of movement of these parts is, of course, in the opposite directions when the accelerator 241a is raised as for decreasing the speed of the vehicle engine.

A lever 529 fixed on a shaft 530 and having a roller 531 on an end thereof is rotatably disposed with respect to the plate portion 347a by means of the shaft which is journaled in a sleeve 532 extending through the plate portion and through a member 533 fixed to the plate portion. The arrangement of the cam 528, the lever 529 and the roller 531 is such that when the accelerator 241a is at the upper limit of its movement, the cam is in a position rotated counterclockwise from its position shown in Fig. 26 out of contact with roller 531, and such that the cam cooperates with the roller to rotate the lever 529 in a clockwise direction to its position as seen in Fig. 26 when the accelerator 241a is depressed as for increasing the vehicle engine speed.

The shaft 530 has fixed on the inner end thereof a member 534 which is provided with a slot 535 therein. A member 536 is fixed on a shaft 537 which extends through the member 533 and through the plate portion 347a, and the member 536 is thus rotatably mounted with respect to the member 533. The member 536 is provided with a pin 538 which fits in the groove 535 and is adapted to cooperate therewith. The shaft 537 on its outer end has fixed thereto a lever 539 which on one end is provided with a roller 540. The lever 539 at its other end is connected with a pair of springs 541 and 542, each of which is anchored with respect to the plate portion 347a. The arrangement is such that the member 536 may be oscillated in one direction or the other by means of the member 534 with either end of the slot 535 contacting the pin 538 to move the pin and the member 536. Such movement of the member 536 is against one or the other of the springs 541 and 542, since the lever 539 and member 536 are both fixed to the shaft 537, and the springs 541 and 542 function to yieldably hold the lever 539 and member 536 in their neutral positions in which they are shown in the figures.

The member 536 is provided with a pair of pawls 543 and 544 swingably mounted thereon. The pawl 543 is adapted to cooperate with teeth 545 and 546 on a member 547 rotatably mounted on the shaft 537, and the pawl 544 is adapted to cooperate with teeth 548 and 549 also provided on the member 547. A spring 550 is provided on member 536 for yieldably swinging the pawls 543 and 544 toward the member 547, and pins 551 and 552 are provided on member 533 for acting as abutment means for the pawls as will be hereinafter described.

The member 547 is fixed by means of pins 553 to another member 554 which is also rotatably mounted on the shaft 537 and has a pin and a slot connection with the valve piston 517. It will be apparent that the members 547 and 554 are movable with the valve piston 517 as its is moved in the sleeve 491. The member 554 is preferably provided with a plurality of notches 555 adapted to receive a plunger 556 which is slidably disposed in a cylindrical cavity provided in the member 533 and which is yieldingly pressed by a spring 557 into the notches. The three slots 555 each correspond with one of the principal positions of the valve piston 517, and the plunger 556 and spring 557 constitute poppet means for yieldingly holding the valve piston in each of its principal positions.

Manual control levers 558 and 559 are provided for the control mechanism. The control 559 is pivotally mounted on the plate portion 347a and is connected by any suitable means, such as a Bowden wire 560, with the carburetor (not shown) of the engine of the vehicle whereby the lever 559 on clockwise movement thereof as seen in the figures functions to open the throttle of the engine. The engine throttle is preferably in an idling condition with the lever 559 in its position as shown in the figures. The control 559 is supplementary to the accelerator 241a for controlling the throttle of the engine, and the lever 559 is adapted to act as other standard manual throttle controls for opening the throttle independently of operation of the accelerator and allowing the accelerator to open the throttle without movement of the lever 559. The lever 559 is connected by means of a link 561 with the lever 529, and the lever 559 thus acts as means in addition to the cam 528 for acting on the lever 529.

The manual control 558 is fixed to the sleeve 532 on the shaft 530, and the sleeve 532 has fixed on its other end a member 562, which is provided with a lug-like portion 563. A lever 564 is rotatably disposed on the sleeve 532 and has a pin and slot connection with the valve piston 520. The lever 564 is provided with a lug portion 565, and a spring 566 is provided for connecting the lug portions 563 and 565. The member 562 is movable with the manual control 558, and its lug portion 563 contacts the lever 564 on a clockwise movement of the control 558, as seen in the drawings, to move the lever 564 and thereby the valve piston 520 from the first principal position of the latter in which it is shown in Fig. 29 to its second principal position connecting the openings 507 and 506 in the sleeve 492. When the control 558 is rotated counterclockwise to bring it back to its original position, the spring 566 acting against the lug portion 565 functions to move the valve piston 520 back to its first principal position. When the valve piston 517 is moved to its third principal position to supply fluid under pressure between the washer 523 and the land 521 of the valve piston 520, as has been hereinbefore described, the valve piston 520 is moved to its second principal position against the action of the spring 566, without necessarily any movement of the control 558. When the valve piston 517 is returned to its first or second positions to drain the space in the sleeve 492 between the land 521 and washer 523, the spring 566 functions to return the valve piston 520 to its first principal position.

Poppet means for the member 562 is preferably provided and includes notches 567 formed in the member 562, a plunger 568 slidably disposed in a cylindrical cavity formed in the member 533 and a spring 569 for yieldingly urging the plunger 568 into either of the notches 567. Each of the notches 567 corresponds to one of the principal positions of the valve piston 520, and the poppet means functions to yieldingly hold the member 562 and the control 558 in the positions corresponding to one of the principal positions of the valve 520 in which they are manually placed. It will be apparent that the poppet means further functions to hold the control 558 and the member 562 in their positions corresponding to the first principal position of the valve piston 520 when the valve piston is moved to its second principal position due to movement of the valve piston 517.

The valve piston 517 is adapted to be shifted by means of the control lever 559 to either upshift or downshift the transmission, and the means under the control of the accelerator 241a, including the cam 528, functions to prevent an upshift by means of the control lever 559 when the accelerator is depressed to open the throttle, as will be described. Assuming the accelerator 241a is rotated to the upper limit of its movement whereby the cam 528 is moved counterclockwise from its position as shown in Fig. 26 to a position whereby the roller 531 cannot on movement of the lever 529 contact the cam 528, the lever 529 is then under the complete control of the control lever 559. In order to shift the valve piston 517 from its first position to its second position, the control lever 559 is moved in a counterclockwise direction as seen in Fig. 26 to move the lever 529 also in such direction from the position of the latter as shown in Fig. 26. The throttle control 559 is in its engine idling position as shown in Fig. 26, and the connection between the lever 559 and the carburetor of the vehicle is preferably such that the carburetor remains in engine idling condition as the lever 559 is rotated counterclockwise from its position as shown in Fig. 26. The member 534 is rotated with the lever 529 on the movement of the latter, by the shaft 530, and the member 534 on such movement makes contact by means of the lower end of its slot 535 with the pin 538 on the member 536, and it thereby rotates the member 536, the shaft 537 and the lever 539 against the action of the spring 541 attached to the lever 539. The pawls 543 and 544 move with the member 536, and the pawl 544 cooperates with the tooth 549 on the member 547 and thereby moves the member 547 and the lever 554, which is fixed with respect to the member 547, in a clockwise direction. The lever 554 is thereby moved such that the plunger 556 moves into the central notch 555 provided on the lever 554, and the valve piston 517 is moved from its first position to its second position. When the throttle lever 559 and the lever 529 are moved back to their positions substantially as shown in Fig. 26, the member 534 moves back to its position as shown in Fig. 31, and the member 536 and pawls 543 and 544 move back to their neutral positions substantially as shown in Fig. 31 under the action of the spring 541, with the member 547, however, being in a position rotated clockwise from its position as shown in the latter figure, as will be understood.

When the control lever 559 is again moved in a counterclockwise direction to move the levers 529 and 534, the lower end of the slot 535 in the member 534 again contacts the pin 538 and moves the member 536, the pawls 543 and 544, the shaft 549, and lever 539 in the same manner as before. In this case the pawl 544 engages with the tooth 548, and the member 547 and lever 554 are rotated such that the plunger 556 moves into the upper one of the notches 555 and the valve piston 517 is moved from its second to its third position. It will be noted that, on such movement of the member 36, the pawl 543 contacts the stationary pin 551 and is moved outwardly to a position such that there can be no cooperation between the pawl and the tooth 545, and when the member 536, shaft 537 and lever 539 are moved back to their neutral positions by spring 541, the pawl 543 does not engage the tooth 545 to rotate the member 547, lever 554 and piston 517 back to their second positions, and the valve piston 517 remains in its third position. It will thus be apparent that the valve piston 517 is moved successively from its first to its second and then to its third positions upon successive movements of the control lever 559 in a counterclockwise direction from a position thereof as shown in Fig. 29.

The valve piston 517 may be moved successively from its third to its second and then to its first position on successive movements of the control lever 559 in a clockwise direction. On a movement of the control lever 559 from its position as shown in Fig. 26 in a clockwise direction, the throttle of the vehicle engine is opened as has been described, and the lever 529 and the member 534 are moved in a clockwise direction. On such movement of the member 534, the upper end of the slot 535 makes contact with the pin 538 and moves the member 536, the shaft 537 and the lever 539 in a counterclockwise direction against the action of the spring 542. The connection between the control rod 559 and the throttle of the vehicle engine is preferably such that when the lever 559 is moved such that the upper end of the slot 535 contacts the pin 538, the throttle has been fully opened and when the lever 559 is moved farther to rotate the member 536, the throttle is maintained in its fully opened condition. The pawls 543 and 544 move with the member 536 from their neutral positions as shown in Fig. 31, and the pawl 543 makes contact with the tooth 546 on the member 547 and moves the member 547 and lever 554 in a counterclockwise direction. The lever 554 is thus moved from its position wherein the plunger 556 is disposed in the upper one of the grooves 555 to a position wherein the plunger is disposed in the middle one of the grooves, and the valve piston 517 is moved with the member 554 from its third principal position to its second principal position.

In order to move the valve piston 517 to its first position from its second position, the control lever 559 is again rotated in a clockwise direction to move the lever 529 and the member 534 in such direction. The upper end of the slot 535 in the member 534 contacts with the pin 538 and moves the member 536 in the counterclockwise direction out of its neutral position against the action of the spring 542, and the pawl 543 cooperates with the tooth 545 on the member 547 and moves the member 547 and lever 554 to move the valve piston 517 from its second position to its first position. When the member 536 is so moved in a counterclockwise direction to shift the piston 517 to its first position, the pawl 544 coacts with the pin 552 fixed in the member 533 whereby the pawl 544 is swung outwardly from the member 547. The pawl 544 is thus moved to a position whereby it cannot cooperate with the tooth 548 on the member 547, when the member 536 is being moved back to its neutral position by the spring 542, to move the member 547 and lever 554 back to the second position of the latter. Thus when the member 536 is brought back to its neutral position after having been moved counterclockwise to move the valve piston 517 from its second position to its first position, the piston 517 remains in its first position.

As has been heretofore pointed out, the cam 528, when the accelerator 241a is at the limit of its upward movement, is rotated counterclockwise as seen in Fig. 26 to a position whereby there can be no contact between it and the roller 531. The cam 528, however, when the accelerator 241a is rotated downwardly from the upper limit of its movement for opening the throttle of the vehicle, is in a position to contact the roller 531 and hold the lever 529 from any counterclockwise movement from its position as shown in Fig. 26, and the cam 528 when it is being moved to this position acts to move the levers 529 and 559 to their closed throttle position as shown in the figure. The cam 528 thus functions to prevent an upshift of the transmission by means of the control rod 559 when the accelerator is at some position for opening the throttle of the vehicle. The cam 528 functions also to allow an upshift by means of the control lever 559 when the accelerator 241a is at the upper limit of its movement. The clutches 53 and 49 thus cannot be engaged when torque is being transmitted through the transmission with an open throttle.

Interconnecting means is provided between the control levers 558 and 559. This means comprises a plunger 570 slidably disposed in a cylindrical cavity formed in the member 533. The plunger 570 is adapted to coact with a notch 571 which is provided on the member 562 and functions to prevent the latter member from being rotated in a clockwise direction as seen in Fig. 31 out of its position corresponding to the first principal position of the piston 520. A spring 572 is provided in the cylindrical cavity and is adapted to move the plunger 570 toward the member 562. The plunger 570 is provided with a pin 573 extending through a suitable slot in the cavity and the member 534 is provided with cam portions 574, 575 and 576, which are adapted to act on the pin 573. The member 534 is connected to move with the control lever 559 as hereinbefore described, and the cam portions 574, 575 and 576 are so arranged that, when the lever 559 is positioned in its closed throttle position, the pin 573 rests on the cam portion 575, and the plunger 570 is held out of engagement with the notch 571. With the plunger in this position, the member 562 and the lever 564 may be moved for moving the valve piston 520 from its first position to its second position for engaging the lock-up clutch 49. The arrangement is such also that, when the control lever 559 is moved in a clockwise direction as seen in Fig. 26 to open the throttle of the vehicle engine, the member 534 is moved whereby the pin 573 contacts first the cam portion 574 and then rests on the cam portion 576, and the plunger 570 engages the notch 571 whereby the lever 558 cannot thereafter be moved to move the valve piston 520 to its second position. The interlocking means between the control levers 559 and 558 and including the plunger 570 and cam portions 574, 575 and 576 thus functions to prevent a movement of the lock-up valve piston 520 by means of control 558 for shifting the piston 520 to its second principal position when the throttle control 559 is positioned for opening the throttle and downshifting the transmission.

Interlocking means is provided between the control rods 82 and the ratchet means including the pawls 543 and 544. This interlocking means comprises a cam 577 which is swingably mounted on the plate portion 347a and is adapted to engage the roller 540 on the lever 539. The cam 577 is connected by means of the link 457a with the control lever 82 on the left side of the transmission, such as is seen in Fig. 2. When the control levers 82 are in their neutral and forward drive positions, the cam 577 is out of contact with the roller 540, and the lever 539 is thus free to move with movement of the control lever 559, as has been heretofore described. When the control levers 82 are moved into their positions for conditioning the transmission for reverse drive, the cam 577 is rotated by means of the link 457a to contact the roller 540 and move the lever 539 in a counterclockwise direction, as seen in Fig. 26, against the action of the spring 542. This movement of the lever 539 functions to move the lever 554, by means of the pawl 543 acting on the tooth 545, so as to move the valve piston 517 from its second position to its first position. As has been previously described, when the valve 120 is actuated upon the speed of the vehicle decreasing below the critical governor speed, fluid pressure is applied to the plunger 527 for moving the valve piston 517 from its third to its second position. Thus when the control levers 82 are shifted to their reverse positions, the governor 224 having previously functioned to shift the valve piston 517 to its second position, the control levers function to shift the valve piston 517 from its second position to its first position, and the clutch 53 cannot, therefore, be engaged when the output shaft 41 of the transmission is driven in reverse.

Although the operation of the modified valve mechanism as shown in Figs. 26 to 32 is believed clear from the description of the operation of the various parts thereof, a brief description of the operation of the mechanism as a whole will be given. The transmission with the modified valve mechanism is upshifted to increase the speed ratio between the input and output shafts 40 and 41 by means of the manually controlled throttle lever 559. Such upshifting, however, is not possible unless the accelerator 241a is moved to the upper limit of its movement. With the accelerator 241a in this position, the lever 559 is moved successively from its closed throttle position in a counterclockwise direction as seen in Fig. 26, and the valve piston 517 is thereby shifted from its first to its second and then to its third position. The transmission may be downshifted when torque is being transmitted through the transmission and the accelerator 241a is in some depressed position, as the cam 528 does not act to prevent any downshifting by means of the lever 559. In order to downshift the transmission, the manual throttle lever 559 is moved successively from its open throttle position in a clockwise direction to actuate the valve 517. The means interlocking the levers 558 and 559 and including the plunger 570 functions so as to prevent an engagement of the lock-up clutch 49 by actuation of the lever 558 when a downshift is being made by the control 559. The means interlocking the control levers 82 and the lever 539 and including the cam 577 functions to downshift the transmission from its second speed ratio to its first speed ratio when the transmission is being conditioned for reverse.

Conclusion

My improved transmission is of such construction as to be well adapted for transmitting the large torques necessary for driving heavy vehicles such as military tanks. The transmission is provided with hydraulically operated clutches for completing the various power trains through the transmission, and the transmission is thereby easily controlled. The hydraulically operated clutches are quite compactly arranged with respect to the other parts of the transmission, and the transmission as a whole thus requires a minimum of space.

The improved control mechanism for the transmission is such that the transmission may be shifted with ease to provide its various speed ratios. The valve mechanism, either as shown in Figs. 1 to 25 or as shown in Figs. 26 to 32, is such that the transmission may be shifted simply by the proper use of a throttle control for the vehicle engine. Governor controlled means are provided for disengaging the clutch for locking up the torque converter when the speed of the vehicle is below a predetermined value, and the vehicle engine cannot, therefore, be stalled. Governor controlled means are also provided for preventing a shift of the forward and reverse conditioning means for the transmission when the speed of the vehicle is above a predetermined value, whereby breakage of parts of the transmission which would result from a shift of the forward and reverse conditioning means when the vehicle is being driven through the transmission, is minimized. Interlocking means is provided between the forward and reverse control for the transmission and the direct clutch 53 whereby the clutch cannot be engaged when the transmission is driving in reverse.

I wish it to be understood that my invention is not to be limited to the arrangements and constructions shown and described except only so far as the claims may be so limited, as it will be apparent to those skilled in the art that changes may be made without departing from the principles of my invention.

I claim:

1. In a transmission, the combination of an input shaft, an output shaft, a hydraulic torque transmitting device having driving and driven elements, a friction clutch for connecting said input shaft and said driving element, a friction clutch for connecting said driving and driven elements for locking up said device, a countershaft, a gear train including gears on said countershaft for connecting said driven element and said output shaft for driving the output shaft at a speed different from that of said driven element, and a clutch for connecting directly said driven element and said output shaft.

2. In a transmission, the combination of an input shaft, an output shaft, a hydraulic torque transmitting device having driving and driven elements, a friction clutch for connecting said input shaft and said driving element, a friction clutch for connecting said driving and driven elements for locking up said device, a countershaft, a pair of gears on said countershaft, a gear driven by said driven element and adapted to drive one of said first-named gears, a gear rotatably mounted on said output shaft and adapted to be driven by the other of said first-named gears, said gears forming a gear train between said driven element and output shaft, a clutch for selectively connecting said gear on the output shaft with the output shaft to complete said gear train, and a clutch for selectively connecting directly said driven element and output shaft.

3. In a transmission, the combination of an input shaft, an output shaft, a hydrodynamic torque transmitting device having driving and driven elements, a friction clutch for connecting said input shaft and said driving element, a friction clutch for connecting said driving and driven elements for locking up said device, a countershaft, a gear train including gears on said countershaft connecting said driven element and said output shaft for driving the output shaft at a speed different from that of said driven element, a positive type clutch in said gear train for selectively completing said gear train, a one-way clutch in said gear train and disposed effectively between said driven element and said positive clutch, and a clutch for selectively connecting directly said driven element and said output shaft whereby said one-way clutch overruns.

4. In a transmission, the combination of an input shaft, an output shaft, a hydrodynamic torque transmitting device having driving and driven elements, a clutch for connecting said input shaft and said driving element, a clutch for connecting said driving and driven elements for locking up said device, a countershaft, a gear train including gears on said countershaft connecting said driven element and said output shaft for driving the output shaft at a speed different from that of the driven element, a positive type clutch in said gear train for completing said gear train, a one-way clutch in said gear train and disposed effectively between said driven element and said positive clutch, means for selectively locking up said one-way clutch, a brake for said driven element for facilitating engagement of said positive clutch, and a clutch for selectively connecting directly said driven element and said output shaft.

5. In a transmission, the combination of an input shaft and a hydrodynamic torque transmitting device, said device having driving and driven elements, a clutch for connecting said input shaft and said driving element, and a clutch for connecting said driving and driven elements for locking up said device, each of said clutches comprising annular fluid operated piston means, said piston means being concentrically disposed with respect to each other and being disposed substantially in the same plane.

6. In a transmission, the combination of an input shaft and a hydrodynamic torque transmiting device, said device having driving and driven elements, a friction clutch for connecting said input shaft and said driving element, and a friction clutch for connecting said driving and driven elements for locking up said device, each of said clutches comprising a set of circularly disposed fluid pressure operated pistons, said sets of pistons being concentrically disposed with respect to each other and being disposed substantially in the same plane.

7. In a transmission, the combination of an input shaft, an output shaft coaxial with said input shaft, a hydrodynamic torque transmitting device having driving and driven elements, said driving element being adapted to be driven by said input shaft, a countershaft, a pair of spaced gears on said countershaft, a gear on said driven element in mesh with one of said gears on the countershaft, a gear rotatably disposed on said output shaft and in mesh with the other of said gears on the countershaft, a clutch for connecting said gear on the output shaft with the output shaft, a clutch between the spaced sets of meshed gears for connecting said driven element and said output shaft, said last-named clutch comprising a drum rotatable with said driven element and having spaced sides, a pair of annular piston means rotatable with said output shaft and disposed in said drum and friction means between said piston means and the sides of said drum, said annular piston means being movable in opposite directions for engaging the clutch to connect the driven element and the output shaft, and a brake on said drum for stopping rotation of the drum and said driven element.

8. In a transmission, the combination of an input shaft, an output shaft, a countershaft having a pair of spaced gears thereon, a gear driven by said input shaft and in mesh with one of said gears on the countershaft, a gear rotatably disposed on said output shaft and in mesh with the other of said gears on the countershaft, a clutch for connecting said gear on the output shaft with the output shaft, a clutch disposed between the spaced sets of meshed gears for connecting said input shaft and said output shaft, said last-named clutch comprising a pair of annular fluid pressure operated piston means coaxial with said input and output shafts and movable in opposite directions to engage the clutch, a one-way clutch between one of said gears on the countershaft and the countershaft, and a clutch for locking up said one-way clutch and comprising an annular fluid pressure operated piston means coaxial with said countershaft and disposed on one side of said last-named gear.

9. In a transmission, the combination of an input shaft, an output shaft coaxial with said input shaft, a hydrodynamic torque transmitting device having driving and driven elements, a clutch for connecting said input shaft and said driving element, a clutch for connecting said driving and driven elements for locking up said device, each of said clutches comprising a set of circularly disposed fluid pressure operated pistons, said piston sets being disposed concentrically with respect to each other and coaxially with said shafts, a countershaft, a pair of spaced gears on said countershaft, a gear driven by said driven element and in mesh with one of said gears on the countershaft, a gear rotatably disposed on said output shaft and in mesh with the other of said gears on the countershaft, a clutch for connecting said gear on the output shaft with the output shaft, a clutch for connecting said driven element and said output shaft and including a drum having spaced sides and connected to rotate with said driven element, two sets of circularly disposed pistons in said drum rotatable with said output shaft, and friction means between said pistons and the sides of said drum, said sets of pistons being disposed coaxially with said output shaft and being movable in opposite directions to engage said last-named clutch, a brake on said drum, a one-way clutch between one of said gears on the countershaft and the countershaft, and a clutch for locking up said one-way clutch and including a set of circularly disposed fluid pressure operated pistons coaxial with said countershaft.

10. In power transmission mechanism for an automotive vehicle having a throttle, the combination of an input shaft, an output shaft, a hydrodynamic coupling device having a driving element and a driven element, said driving element being adapted to be driven by said input shaft, clutch means for connecting directly said driven element and said output shaft, clutch means for connecting said driving element and said driven element to lock up said hydrodynamic device, means for controlling both of said clutch means, a control for the throttle and means interconnecting said means for controlling the clutch means and said throttle control whereby said throttle control on being moved successively to one of the limits of its travel successively actuates one of said clutch means and then the other of said clutch means.

11. In power transmission mechanism, the combination of an input shaft, an output shaft, a hydrodynamic coupling device having a driving element and a driven element, said driving element being adapted to be driven by said input shaft, clutch means for connecting directly said driven element and said output shaft, clutch means for connecting said driving element and said driven element to lock up said hydrodynamic device, a gear train between said driven element and said output shaft for connecting the driven element and the output shaft at a lower speed ratio than that provided by said first-named clutch means, means for controlling both of said clutch means, a throttle control, and means interconnecting said means for controlling the clutch means and said throttle control whereby said throttle control on being moved successively to closed throttle position successively engages said first-named clutch means and then said second-named clutch means.

12. In power transmission mechanism, the combination of an input shaft, an output shaft, a hydrodynamic coupling device having a driving element and a driven element, said driving element being adapted to be driven by said input shaft, clutch means for connecting directly said driven element and said output shaft, clutch means for connecting said driving element and said driven element to lock up said hydrodynamic device, means for controlling both of said clutch means, a throttle control, and means interconnecting said throttle control and said means for controlling the clutch means whereby said throttle control on being moved successively to open throttle position successively disengages said second-named clutch means and then said first-named clutch means.

13. In power transmission mechanism, the combination of an input shaft, an output shaft, a hydrodynamic coupling device having a driving element and a driven element, said driving element being adapted to be driven by said input shaft, a clutch for connecting directly said driven element and said output shaft, a clutch for connecting said driving element and said driven element to lock up said hydrodynamic device, a gear train for connecting said driven element and said output shaft to rotate the output shaft at a lower speed than that of the driven element, means for engaging said clutches and including a valve and a source of hydraulic power, said valve having a position for supplying hydraulic power to said clutches for engaging them and a position for disconnecting the clutches from the hydraulic source of power for disengaging the clutches, said valve in a third position connecting said source of power with said first-named clutch, a throttle control, and means interconnecting said valve and throttle control whereby said throttle control on being moved successively to one of the limits of its movement successively moves said valve to its third position from one of its first-named positions and then to its other position.

14. In power transmission mechanism, the combination of an input shaft, an output shaft, a hydrodynamic coupling device having a driving element and a driven element, said driving element being adapted to be driven by said input shaft, a gear train for connecting said driven element and said output shaft for rotating the output shaft at a lower speed than the driven element, a clutch for connecting directly said driven element and said output shaft, a clutch for connecting said driving and driven elements to lock up said hydrodynamic device, a source of hydraulic power, a valve for connecting said power source with said clutches for engaging the clutches, said valve having one position for supplying power to neither of said clutches whereby the drive may be through said gear train and having another position for supplying power to both of said clutches, said valve having a third position for supplying power to said first-named clutch, a throttle control, a ratchet wheel for moving said valve, and a pawl actuated by said throttle control and cooperating with said ratchet wheel whereby said throttle control on being moved successively to one of the limits of its movement successively moves said valve from one of its first-named positions to its said third position and then to its other position.

15. In power transmission mechanism, the combination of an input shaft, an output shaft, a hydrodynamic coupling device having a driving element and a driven element, said driving element being adapted to be driven by said input shaft, a gear train for connecting said driven element and said output shaft for driving the output shaft at a lower speed than the driven element, a clutch for connecting directly said driven element and said output shaft, a clutch for connecting said driving and driven elements to lock up said hydrodynamic device, means for engaging said clutches including a rotatable valve and a source of hydraulic power, an accelerator, a ratchet wheel on said rotatable valve, and a pair of pawls adapted to cooperate with said ratchet wheel and actuated by said accelerator, said valve in one position supplying power to engage neither of said clutches and in another position supplying power to engage said first-named clutch, and in a third position supplying power to engage both of said clutches, said pawls and said ratchet wheel cooperating whereby said accelerator on being moved successively to closed throttle position successively moves said valve from its first position to its second position and then to its third position and said accelerator on being moved thereafter successively to open throttle position successively moves said valve from its third position to its second position and then to its first position.

16. In transmission mechanism for an automotive vehicle, the combination of an input shaft, an output shaft, a hydrodynamic coupling device having a driving element and a driven element, said driving element being adapted to be driven by said input shaft, means for connecting said driven element and said output shaft for driving the output shaft, a clutch for connecting said driving and driven elements to lock up said hydrodynamic device, means for actuating said clutch including a source of hydraulic power and a valve, a governor responsive to the speed of the vehicle, means including a hydraulic piston for actuating said valve to disengage said clutch, and a valve actuated by said governor to provide hydraulic power to said piston for disengaging said clutch when the speed of the vehicle has decreased below a predetermined value.

17. In power transmission mechanism, the combination of an input shaft, an output shaft, a hydrodynamic coupling device having a driving element and a driven element, said driving element being adapted to be driven by said input shaft, a clutch for connecting said driven element and said output shaft, a clutch for connecting said driving and driven elements to lock up said hydrodynamic device, a power source, and a control for connecting said power source and said clutches, said control in one position disconnecting said power source from both of said clutches for maintaining the clutches disengaged, and in another position connecting said first-named clutch with said power source for engaging the clutch, and in a third position connecting both of said clutches with said power source for engaging the clutches.

18. In power transmission mechanism, the combination of an input shaft, an output shaft, a hydrodynamic coupling device having a driving element and a driven element, said driving element being adapted to be driven by said input shaft, a hydraulically operated clutch for connecting said driven element and said output shaft, a hydraulically operated clutch for connecting said driving and driven elements to lock up said hydrodynamic device, a source of hydraulic power, and a valve connected between said source of hydraulic power and said clutches, said valve in one position disconnecting said power source from both of said clutches for maintaining the clutches disengaged and in another position admitting power to said first-named clutch for engaging the clutch and in a third position admitting power to both of said clutches for engaging the clutches.

19. In power transmission mechanism, the combination of an input shaft, an output shaft, a hydrodynamic coupling device having a driving element and a driven element, said driving element being adapted to be driven by said input shaft, a fluid pressure operated clutch for connecting said driven element and said output shaft, a fluid pressure operated clutch for connecting said driving and driven elements to lock up said hydrodynamic device, a source of fluid pressure, and a valve connected between said fluid pressure source and said clutches, said valve in one position bleeding each of said clutches for disengaging the clutches, and in another position connecting said fluid pressure source with said first-named clutch to engage it and bleeding the other of said clutches, and in a third position connecting said fluid pressure source with both of said clutches for engaging the clutches.

20. In power transmission mechanism, the combination of an input shaft, an output shaft, a hydrodynamic coupling device having a driving element and a driven element, said driving element being adapted to be driven by said input shaft, a gear train for connecting said driven element and said output shaft, a free-wheeling device in said gear train, a clutch for connecting directly said driven element and said output shaft, a clutch for connecting said driving and driven elements for locking up said hydrodynamic device, a clutch for locking up said free-wheeling device, all of said clutches being power operated, a source of power, and a control for connecting said power source and said clutches, said control in one position connecting said power source with said third-named clutch for engaging the clutch, said control in another position connecting said power source with said first-named clutch for engaging the clutch, and said control in a third position connecting said power source with said first and second-named clutches for engaging the clutches.

21. In power transmission mechanism, the combination of an input shaft, an output shaft, a hydrodynamic coupling device having a driving element and a driven element, said driving element being adapted to be driven by said input shaft, a gear train for connecting said driven element and said output shaft, a free-wheeling device in said gear train, a clutch for connecting directly said driven element and said output shaft, a clutch for connecting said driving and driven elements for locking up said hydrodynamic device, a clutch for locking up said free-wheeling device, all of said clutches being fluid pressure operated, a source of fluid pressure, and a valve connected between said fluid pressure source and each of said clutches, said valve in one position connecting said fluid pressure source with said third-named clutch for engaging the clutch, said valve in another position connecting said fluid pressure source with said first-named clutch for engaging the clutch, and said valve in a third position connecting said fluid pressure source with said first and second-named clutches for engaging the latter clutches.

22. In power transmission mechanism, the combination of an input shaft, an output shaft, a hydrodynamic coupling device having a driving element and a driven element, said driving element being adapted to be driven by said input shaft, a gear train for connecting said driven element and said output shaft for rotating the output shaft at a speed lower than that of the driven element, a free-wheeling device in said gear train, a fluid pressure operated clutch for connecting directly said driven element and said output shaft, a fluid pressure operated clutch for connecting said driving and driven elements for locking up said hydrodynamic device, a fluid pressure operated clutch for locking up said free-wheeling device, a source of fluid pressure, and a valve connecting said fluid pressure source with each of said clutches, said valve in one position connecting said fluid pressure source with said third-named clutch for engaging it and bleeding the other clutches for disengaging the latter clutches, said valve in a second position connecting said fluid pressure source with said first-named clutch and bleeding the other two of said clutches, said valve in a third position connecting said fluid pressure source with said first and second-named clutches and bleeding the third-named clutch.

23. In power transmission mechanism, the combination of an input shaft, an output shaft, a hydrodynamic coupling device having a driving element and a driven element, said driving element being adapted to be driven by said input shaft, a gear train for connecting said driven element and said output shaft, a free-wheeling mechanism in said gear train, a power operated clutch for connecting directly said driven element and said output shaft, a power operated clutch for connecting said driving element and said driven element for locking up said hydrodynamic device, a power operated clutch for locking up said free-wheeling mechanism, a source of power, a control for connecting said power source with said clutches, said control having a position connecting said power source with said third-named clutch for engaging the clutch and a position connecting said power source with said first and second-named clutches for engaging the latter clutches, said control having a third position connecting said power source with said first-named clutch, a throttle control, and means interconnecting said two controls whereby said throttle control on being moved successively to one of the limits of its movement successively moves said first-named control from one of its first-named positions to its third position and then to the other of its positions.

24. In power transmission mechanism, the combination of an input shaft, an output shaft, a hydrodynamic coupling device having a driving element and a driven element, said driving element being adapted to be driven by said input shaft, a gear train for connecting said driven element and said output shaft, a free-wheeling mechanism in said gear train, a hydraulically operated clutch for connecting directly said driven element and said output shaft, a hydraulically operated clutch for connecting said driving element and said driven element for locking up said hydrodynamic device, a hydraulically operated clutch for locking up said free-wheeling mechanism, a source of hydraulic power, a valve for connecting said hydraulic power source with each of said clutches, said valve having a position connecting said hydraulic power source with said third-named clutch for engaging the clutch and having a position connecting said power source with said first and second-named clutches for engaging the latter clutches, said valve having a third position connecting said power source with said first-named clutch, a throttle control, and means interconnecting said valve and throttle control whereby said throttle control on being moved successively to one of the limits of its movement successively moves said valve from one of its first-named positions to its third position and then to the other of its positions.

25. In power transmission mechanism, the combination of an input shaft, an output shaft, a hydrodynamic coupling device having a driving element and a driven element, said driving element being adapted to be driven by said input shaft, a gear train for connecting said driven element and said output shaft, a hydraulically operated clutch for connecting directly said driven element and said output shaft, a hydraulically operated clutch for connecting said driving and driven elements for locking up said hydrodynamic device, a source of hydraulic power, a valve for connecting said hydraulic power source with each of said clutches, said valve in one position connecting said hydraulic power source with neither of said clutches whereby said output shaft may be operated through said hydrodynamic device and said gear train, said valve in another position connecting said hydraulic power source with said first-named clutch for engaging the clutch, said valve in a third position connecting said hydraulic power source with both of said clutches for engaging the clutches, and a manually operated valve for operatively disconnecting said first-named valve and said first-named clutch whereby said output shaft may be driven through said gear train with said hydrodynamic device locked up.

26. In power transmission mechanism, the combination of an input shaft, an output shaft, a hydrodynamic coupling device having a driving and a driven element, said driving element being adapted to be driven by said input shaft, a gear train for connecting said driven element and said output shaft for rotating the output shaft at a speed lower than that of the driven element, a fluid pressure operated clutch for connecting directly said driven element and said output shaft, a fluid pressure operated clutch for connecting said driving and driven elements for locking up said hydrodynamic device, a free-wheeling mechanism in said gear train, a fluid pressure operated clutch for locking up said free-wheeling mechanism, a source of fluid pressure, a valve for connecting said fluid pressure source with each of said clutches, said valve in one position connecting said fluid pressure source with said third-named clutch for engaging the clutch, said valve in another position connecting said fluid pressure source with said first-named clutch for engaging the clutch, said valve in a third position connecting said fluid pressure source with both said first and second-named clutches for engaging the clutches, and a manually operated valve operatively between said first-named valve and said first-named clutch for preventing the application of fluid pressure to said first-named clutch whereby said output shaft may be driven through said gear train with said hydrodynamic device locked up.

27. In transmission mechanism for an automotive vehicle, the combination of an input shaft, an output shaft, a hydrodynamic coupling device having a driving element and a driven element, said driving element being adapted to be driven by said input shaft, a gear train for connecting said driven element and said output shaft, a fluid pressure operated clutch for connecting directly said driven element and said output shaft, a fluid pressure operated clutch for connecting said driving and driven elements for locking up said hydrodynamic device, a source of fluid pressure, a valve for connecting said fluid pressure source with said clutches, said valve in one position connecting said fluid pressure source with neither of said clutches whereby said output shaft may be driven through said hydrodynamic device and said gear train, said valve in another position connecting said fluid pressure source with said first-named clutch for engaging the clutch, said valve in a third position connecting said fluid pressure source with both of said clutches for engaging the clutches, a governor responsive to the speed of the vehicle, a manually controlled valve operatively between said first-named valve and said first-named clutch for preventing the application of fluid pressure to said first-named clutch, and means controlled by said governor for moving said first-named valve from its third position to its second position and for moving said second-named valve to a position allowing fluid pressure to be applied to said first-named clutch when the speed of the vehicle decreases below a predetermined value.

28. In transmission mechanism for an automotive vehicle, the combination of an input shaft, an output shaft, a hydrodynamic coupling device having a driving element and a driven element, said driving element being adapted to be driven by said input shaft, a gear train for connecting said driven element and said output shaft for driving the output shaft at a speed less than that of said driven element, a fluid pressure operated clutch for connecting directly said driven element and said output shaft, a fluid pressure operated clutch for connecting said driving and driven elements for locking up said hydrodynamic device, a source of fluid pressure, a valve for connecting said fluid pressure source and said clutches, said valve in one position connecting said fluid pressure source with neither of said clutches whereby said output shaft may be driven through said hydrodynamic device and said gear train, said valve in a second position connecting said fluid pressure source with said first-named clutch for engaging the clutch, said valve in a third position connecting said fluid pressure source with both of said clutches for engaging the clutches, a manually operated valve operatively between said first-named valve and said first-named clutch for preventing the application of fluid pressure to said first-named clutch, a piston for moving said second-named valve to a position allowing the application of fluid pressure to said first-named clutch, a piston for moving said first-named valve from its third position to its second position, a governor responsive to the speed of the vehicle, and a valve controlled by the governor for connecting said fluid pressure source with each of said pistons when the speed of the vehicle has decreased below a predetermined value.

29. In a transmission mechanism for an automotive vehicle, the combination of an input shaft, an output shaft, a hydrodynamic coupling device having a driving element and a driven element, said driving element being adapted to be driven by said input shaft, a hydraulically operated clutch for connecting said driven element and said output shaft, a hydraulically operated clutch for connecting said driving and driven elements for locking up said hydrodynamic device, a source of hydraulic power, a valve for connecting said hydraulic power source and said clutches, said valve in one position connecting said power source with said first-named clutch for engaging the clutch and in a second position connecting said power source with both of said clutches for engaging the clutches, an accelerator, means interconnecting said accelerator and said valve for moving the valve from its first position to its second position when the accelerator is moved to closed throttle position, said last-named means including a member movable with said accelerator when said accelerator is moved to its closed throttle position and a spring connecting said member and said valve, a governor responsive to the speed of the vehicle, and means controlled by said governor for moving said valve from its second position to its first position when the speed of the vehicle has decreased below a predetermined value, said spring being flexed when said last-named means is operative and said accelerator is moved to its closed throttle valve shifting position.

30. In a transmission mechanism for an automotive vehicle, the combination of an input shaft, an output shaft, a hydrodynamic coupling device having a driving element and a driven element, said driving element being adapted to be driven by said input shaft, a gear train for connecting said driven element and said output shaft, a fluid pressure operated clutch for connecting directly said driven element and said output shaft, a fluid pressure operated clutch for connecting said driving and driven elements for locking up said hydrodynamic device, a source of fluid pressure, a valve for connecting said fluid pressure source and said clutches, said valve in one position connecting neither of said clutches with said fluid pressure source whereby said output shaft may be driven through said gear train, said valve in another position connecting said first-named clutch and said fluid pressure source for engaging the clutch, said valve in a third position connecting both of said clutches and said fluid pressure source for engaging the clutches, an accelerator, means interconnecting said accelerator and said valve for moving the valve successively from its first position to its second position and then to its third position on successive movements of the accelerator to closed throttle position, said last-named means including a member moved by such successive movements of the accelerator and connected by a spring with said valve for moving the valve, a governor responsive to the speed of the vehicle, a fluid pressure operated piston for moving said valve from its third position to its second position, and a valve controlled by said governor for connecting said piston with said fluid pressure source when the speed of the vehicle has decreased below a predetermined value, said spring being flexed when said piston is operative and the accelerator is moved to its closed throttle valve shifting position.

31. In transmission mechanism for an automotive vehicle, the combination of an input shaft, an output shaft, a hydrodynamic coupling device having a driving element and a driven element, said driving element being adapted to be driven by said input shaft, a gear train for connecting said driven element and said output shaft and including a free-wheeling mechanism, a fluid pressure operated clutch for connecting directly said driven element and said output shaft, a fluid pressure operated clutch for connecting said driving and driven elements for locking up said hydrodynamic device, a fluid pressure operated clutch for locking up said free-wheeling mechanism, a source of fluid pressure, a valve for connecting said clutches with said fluid pressure source, said valve in one position connecting said fluid pressure source and said third-mentioned clutch for engaging the clutch, said valve in a second position connecting said first-named clutch and said fluid pressure source for engaging the clutch, said valve in a third position connecting said first and second-named clutches and said fluid pressure source for engaging the clutches, an accelerator, means interconnecting said accelerator and said valve for moving the valve successively from its first to its second position and then to its third position on said accelerator being moved to closed throttle position, said last-named means including a member moved by such successive movements of said accelerator and a spring connecting said member and valve for moving the valve, a governor responsive to the speed of the vehicle, a fluid pressure operated piston for moving said valve from its third position to its second position against the action of said spring, and a valve controlled by said governor for connecting said piston and said fluid pressure source for moving the valve from its third position to its second position when the speed of the vehicle has decreased below a predetermined value.

32. In transmission mechanism for an automotive vehicle, the combination of an input shaft, an output shaft, a hydrodynamic coupling device having a driving element and a driven element, said driving element being adapted to be driven by said input shaft, a gear train for connecting said driven element and said output shaft and including a free-wheeling mechanism, a fluid pressure operated clutch for connecting directly said driven element and said output shaft, a fluid pressure operated clutch for connecting said driving and driven elements for locking up said hydrodynamic device, a fluid pressure operated clutch for locking up said free-wheeling mechanism, a source of fluid pressure, a valve for connecting said clutches with said fluid pressure source, said valve in one position connecting said fluid pressure source and said third-named clutch for engaging the clutch, said valve in a second position connecting said first-named clutch and said fluid pressure source for engaging the clutch, said valve in a third position connecting said first and second-named clutches and said fluid pressure source for engaging the clutches, an accelerator, means interconnecting said accelerator and said valve for moving the valve successively from its first to its second position and then to its third position on said accelerator being moved successively to closed throttle position, said last-named means including a member moved by such successive movement of said accelerator and a spring connecting said member and valve for moving the valve, a governor responsive to the speed of the vehicle, a fluid pressure operated piston for moving said valve from its third position to its second position against the action of said spring, a valve operatively positioned between said first-named valve and said first-named clutch for preventing the application of fluid pressure to the clutch, a piston for moving said last-named valve to a position allowing the application of fluid pressure to said first-named clutch, and a valve controlled by said governor for connecting both of said pistons with said fluid pressure source for moving said first-named valve from its third position to its second position and for moving said second-named valve to a position allowing application of fluid pressure to said first-named clutch when the speed of the vehicle has decreased below a predetermined value.

33. In power transmission mechanism, the combination of an input shaft, an output shaft, a hydrodynamic coupling device having a driving element and a driven element, said driving element being adapted to be driven by said input shaft, a gear train for connecting said driven element and said output shaft, a hydraulically operated clutch for connecting directly said driven element and said output shaft, a hydraulically operated clutch for connecting said driving and driven elements for locking up said hydrodynamic device, a source of hydraulic power, a valve for connecting said power source with said clutches, said valve in one position connecting said power source with neither of said clutches whereby said output shaft may be driven through said gear train, said valve in a second position connecting said power source with said first-mentioned clutch for engaging the clutch, said valve in a third position connecting said power source with both of said clutches for engaging the clutches, a manually operated valve operatively between said first-named valve and said first-named clutch for preventing the application of hydraulic power to the clutch, and means interconnecting said two valves for preventing actuation of said second-named valve when said first-named valve is being moved from one of its positions to another of its positions.

34. In power transmission mechanism for an automotive vehicle, the combination of an input shaft, an output shaft, means for driving said output shaft at a plurality of speed ratios in a forward direction, means for driving said output shaft in a reverse direction, a manually operable control for controlling both of said means for conditioning the transmission mechanism for a drive either in forward or reverse, a control for said first-named means to vary the speed ratio, and means interconnecting said controls whereby said first-named control acts to move said second-named control to a lower ratio position when the first-named control is moved to condition the transmission mechanism for a drive in reverse.

35. In power transmission mechanism for an automotive vehicle, the combination of an input shaft, an output shaft, means for driving said output shaft at a plurality of speed ratios in a forward direction, means for driving said output shaft in the reverse direction, a manually operable control for controlling both of said means for conditioning the transmission mechanism for a drive either in forward or reverse, means for controlling said first-named means to vary the speed ratio and including a valve and a source of hydraulic power, a throttle control, ratchet means interconnecting said valve and throttle control whereby said throttle control on being moved successively to closed throttle position successively actuates said valve to successively increase the speed ratio of the transmission mechanism and said throttle control on being moved thereafter successively to open throttle position successively actuates said valve to successively decrease the speed ratio of the transmission mechanism, and means interconnecting said first-named control and said ratchet means whereby the control acts to move said valve to a lower ratio position when the control is moved to condition the transmission mechanism for a drive in reverse.

36. In power transmission mechanism, the combination of an input shaft, an output shaft, a hydrodynamic coupling device having a driving element and a driven element, said driving element being adapted to be driven by said input shaft, a gear train for connecting said driven element and said output shaft for a forward drive of the latter shaft, a fluid pressure operated clutch for connecting directly said driven element and said output shaft, a fluid pressure operated clutch for connecting said driving and driven elements for locking up said hydrodynamic device, a source of fluid pressure, a valve for connecting said fluid pressure source with said clutches, said valve in one position connecting said fluid pressure source with neither of said clutches whereby said output shaft may be driven through said gear train, said valve in another position connecting said fluid pressure source with said first-named clutch for engaging the clutch, said valve in a third position connecting said fluid pressure source with both of said clutches for engaging the clutches, a throttle control, ratchet means movable with said throttle control on successive movements of the throttle control to closed throttle position to move said valve successively from its first position to its second position and then to its third position, a gear train for driving said output shaft in reverse, a manual control for conditioning the transmission mechanism for a drive in forward or in reverse, and means interconnecting said ratchet means and said last-named control whereby when the control is moved to condition the transmission mechanism for a drive in reverse said valve is moved to its first position.

37. In power transmission mechanism, the combination of an input shaft, an output shaft, a hydrodynamic coupling device having a driving element and a driven element, a fluid pressure operated clutch for connecting said input shaft and driving element, a gear train for connecting said driven element and said output shaft, a positive clutch for completing said gear train, a fluid pressure operated clutch for connecting directly said driven element and said output shaft, a fluid pressure operated clutch for connecting said driving and driven elements for locking up said hydrodynamic device, a source of fluid pressure, means for connecting said fluid pressure source and said fluid pressure operated clutches, a valve operatively disposed between said third and fourth-named clutches and said fluid pressure source, said valve in one position connecting said fluid pressure source to neither of said third and fourth-named clutches whereby said output shaft may be driven through said gear train, said valve in a second position connecting said fluid pressure source with said third-named clutch, said valve in a third position connecting said fluid pressure source with both of said third and fourth-named clutches, a fluid pressure operated brake for said driven element, and means including a valve for connecting said brake and said fluid pressure source whereby said brake may be engaged while said positive clutch for said gear train is being engaged.

38. In power transmission mechanism, the combination of an input shaft, an output shaft, a hydrodynamic coupling device having a driving element and a driven element, said driving element being adapted to be driven by said input shaft, a gear train for connecting said driven element and said output shaft, a fluid pressure operated clutch for connecting directly said driven element and said output shaft, a fluid pressure operated clutch for connecting said driving and driven elements for locking up said hydrodynamic device, a source of fluid pressure, a valve for connecting said fluid pressure source with said second-named clutch, a fluid pressure operated piston for moving said valve and a second valve in one position connecting said fluid pressure source with said first-named clutch for engaging the clutch and in another position connecting said fluid pressure source with said first-named clutch and with said piston whereby said first-named valve is moved to connect said fluid pressure source and said second-named clutch for engaging the latter clutch.

39. In power transmission mechanism, the combination of an input shaft, an output shaft, a hydrodynamic coupling device having a driving element and a driven element, said driving element being adapted to be driven by said input shaft, a gear train for connecting said driven element and said output shaft, a free-wheeling mechanism in said gear train, a fluid pressure operated clutch for connecting directly said driven element and said output shaft, a fluid pressure operated clutch for connecting said driving and driven elements for locking up said hydrodynamic device, a fluid pressure operated clutch for locking up said free-wheeling mechanism, a source of fluid pressure, a valve for connecting said fluid pressure source with said second-named clutch, a fluid pressure operated piston for moving said valve, and a second valve, said last-named valve in one position connecting said fluid pressure source with said third-named clutch for engaging the clutch, said last-named valve in another position connecting said fluid pressure source with said first-named clutch for engaging the clutch, said last-named valve in a third position connecting said fluid pressure source with said first-named clutch and with said piston whereby said first-named valve is moved to connect said fluid pressure source and said second-named clutch for engaging the latter clutch.

40. In transmission mechanism for an automotive vehicle, the combination of an input shaft, an output shaft, a hydrodynamic coupling device having a driving element and a driven element, said driving element being adapted to be driven by said input shaft, a gear train for connecting said driven element and said output shaft, a fluid pressure operated clutch for connecting directly said driven element and said output shaft, a fluid pressure operated clutch for connecting said driving and driven elements for locking up said hydrodynamic device, a source of fluid pressure, a valve for connecting said fluid pressure source and said second-named clutch, a piston for actuating said valve, a second valve for connecting said fluid pressure source with said first-named clutch for engaging the clutch in one position of the valve and in another position connecting said fluid pressure source with said first-named clutch and with said piston for moving said first-named valve to connect said fluid pressure source and said second-named clutch, plunger means for moving said first-named valve to a position disconnecting said fluid pressure source and said second-named clutch, plunger means for moving said second-named valve to its first-named position, a governor responsive to the speed of the vehicle, and a valve controlled by said governor, said last-named valve connecting said fluid pressure source with both of said plunger means on the speed of the vehicle decreasing below a predetermined value.

41. In power transmission mechanism, the combination of an input shaft, an output shaft, a hydrodynamic coupling device having a driving element and a driven element, said driving element being adapted to be driven by said input shaft, a gear train for connecting said driven element and said output shaft, a fluid pressure operated clutch for connecting directly said driven element and said output shaft, a fluid pressure operated clutch for connecting said driving and driven elements for locking up said hydrodynamic device, a source of fluid pressure, a valve adapted to be manually operated for connecting said fluid pressure source and said second named clutch for engaging the clutch, a valve for connecting said fluid pressure source and said first named clutch for engaging the clutch, a throttle control, and means interconnecting said throttle control and said first named valve whereby said valve may be moved to connect said fluid pressure source and said second named clutch only when said throttle control is moved to its throttle closing position.

42. In power transmission mechanism, the combination of an input shaft, an output shaft, means for providing a plurality of speed ratios between said shafts, a manual throttle control, an accelerator, means interconnecting said first-named means and said throttle control whereby the throttle control on being moved to one of the limits of its travel changes the speed ratio of the transmission mechanism, and means under the control of said accelerator for preventing such a change in speed ratio by means of said manual control except when the accelerator is at one of the limits of its movement.

43. In power transmission mechanism, the combination of an input shaft, an output shaft, means for providing a plurality of speed ratios between said shafts, a manual throttle control, an accelerator, a movable control for increasing the speed ratio through the transmission, means interconnecting said controls whereby the speed ratio through the transmission is increased on a movement of the manual throttle control to closed throttle position, and means actuated by said accelerator for preventing a movement of said second-named control for increasing the speed ratio through the transmission except when the accelerator is in closed throttle position.

44. In power transmission mechanism for an automotive vehicle having a throttle, the combination of an input shaft, an output shaft, means for providing a plurality of power trains of different speed ratios between said shafts, means for controlling said first-named means and including a source of power and a power control having a plurality of different positions each corresponding to one of said power trains and in which the power control connects the source of power and said first-named means to complete the respective power trains between the shafts, a control for the throttle, means actuated by said throttle control and effective on said power control to move the power control from lower to higher speed ratio positions on movements of the throttle control toward its closed throttle position, and means for limiting said movements of said throttle control so that said power control can be moved only from one relatively low speed ratio position to the next higher speed position on a single such movement of the throttle control.

45. In power transmission mechanism for an automotive vehicle having a throttle, the combination of an input shaft, an output shaft, means for providing a plurality of power trains of different speed ratios between said shafts, means for controlling said first-named means and including a source of power and a power control having a plurality of different positions each corresponding to one of said power trains and in which the power control connects the source of power and said first-named means to complete the respective power trains between the shafts, a control for the throttle, means actuated by said throttle control and effective on said power control to move the power control from higher to lower speed ratio positions on movements of the throttle control toward its open throttle position, and means for limiting said movements of said throttle control so that said power control can be moved only from one relatively high speed ratio position to the next lower speed position on a single such movement of the throttle control.

46. In power transmission mechanism for an automotive vehicle having a throttle, the combination of an input shaft, an output shaft, means for providing a plurality of power trains of different speed ratios between said shafts, means for controlling said first-named means and including a source of hydraulic power and valve means having a plurality of different positions each corresponding to one of said power trains and in which the valve means connects the source of power and said first-named means to complete the respective power trains between the shafts, a control for the throttle, means actuated by the throttle control and effective on said valve means to move the valve means from lower to higher speed ratio positions on movements of the throttle control toward its closed throttle position, means actuated by the throttle control and effective on said valve means to move the valve means from higher to lower speed ratio positions on movements of the throttle control toward its open throttle position, and means for limiting the said movements of said throttle control towards its open and closed throttle positions so that said valve means can be moved only from one relatively low speed ratio position to the next higher speed position or from one relatively high speed position to the next lower speed position on single such movements of the throttle control toward its closed and open throttle positions respectively.

47. In power transmission mechanism, the combination of an input shaft, an output shaft, means providing a plurality of power trains between said shafts of different speed ratios, a pair of hydraulically operated clutches arranged to complete different ones of said power trains, a source of hydraulic power, a valve for connecting said power source with one of said clutches for engaging the clutch, a second valve in one position thereof connecting said power source with the other of said clutches for engaging the latter clutch, and a piston means for actuating said first-named valve, said second-named valve in another position connecting said power source with said piston means for moving said first-named valve to connect said power source with the clutch connected with said first-named valve.

HAROLD E. CARNAGUA.

REFERENCES CITED

The following references are of record in the file of this patent:

UNITED STATES PATENTS

| Number | Name | Date |
|---|---|---|
| 1,953,568 | Rose | Apr. 3, 1934 |
| 2,028,152 | Gray | Jan. 21, 1936 |
| 2,051,553 | Fleischel | Aug. 18, 1936 |
| 2,055,300 | Maurer | Sept. 22, 1936 |
| 2,055,970 | Fippard | Sept. 29, 1936 |
| 2,071,292 | Woolson | Feb. 16, 1937 |
| 2,084,219 | Salerni | June 15, 1937 |
| 2,089,590 | Walti | Aug. 10, 1937 |
| 2,104,608 | Cox et al. | Jan. 4, 1938 |
| 2,109,443 | Hill et al. | Feb. 22, 1938 |
| 2,115,097 | Durham | Apr. 26, 1938 |
| 2,120,104 | Livermore | June 7, 1938 |
| 2,140,502 | Banker | Dec. 20, 1938 |
| 2,181,647 | Wheaton | Nov. 28, 1939 |
| 2,212,278 | Sinclair | Aug. 20, 1940 |
| 2,242,515 | Dodge | May 20, 1941 |
| 2,261,898 | Barkeij | Nov. 4, 1941 |
| 2,276,862 | Peterson | Mar. 17, 1942 |
| 2,282,591 | Orr | May 12, 1942 |
| 2,284,233 | Schotz | May 26, 1942 |

(Other references on following page)

UNITED STATES PATENTS

| Number | Name | Date |
|---|---|---|
| 2,288,631 | Linderman | July 7, 1942 |
| 2,296,642 | Huebner, Jr. | Sept. 22, 1942 |
| 2,314,554 | Pennington | Mar. 23, 1943 |
| 2,320,960 | Wheaton | June 1, 1943 |
| 2,328,291 | Osborne | Aug. 31, 1943 |
| 2,332,593 | Nutt et al. | Oct. 26, 1943 |
| 2,333,682 | Schneider | Nov. 9, 1943 |
| 2,343,304 | LaBrie | Mar. 7, 1944 |
| 2,351,483 | Carnagua | June 13, 1944 |
| 2,355,709 | Dodge | Aug. 15, 1944 |
| 2,430,799 | Aspinwall | Nov. 11, 1947 |

FOREIGN PATENTS

| Number | Country | Date |
|---|---|---|
| 334,131 | Italy | Jan. 22, 1936 |
| 452,922 | Great Britain | Sept. 1, 1936 |
| 468,422 | Great Britain | Sept. 28, 1935 |
| 696,226 | Germany | Sept. 14, 1940 |